United States Patent
Su et al.

(10) Patent No.: US 12,459,931 B2
(45) Date of Patent: Nov. 4, 2025

(54) BENZOTHIOPHENE DERIVATIVE REGULATOR, PREPARATION METHOD THEREFOR AND USE THEREOF

(71) Applicants: Shanghai Hansoh Biomedical Co., Ltd., Shanghai (CN); Jiangsu Hansoh Pharmaceutical Group Co., Ltd., Lianyungang (CN)

(72) Inventors: Yidong Su, Shanghai (CN); Song Li, Shanghai (CN); Xiaopo Chen, Shanghai (CN); Jun Wang, Shanghai (CN)

(73) Assignees: Shanghai Hansoh Biomedical Co., Ltd., Shanghai (CN); Jiangsu Hansoh Pharmaceutical Group Co., Ltd., Lianyungang (CN)

( * ) Notice: Subject to any disclaimer, the term of this patent is extended or adjusted under 35 U.S.C. 154(b) by 686 days.

(21) Appl. No.: 17/755,711

(22) PCT Filed: Nov. 5, 2020

(86) PCT No.: PCT/CN2020/126735
§ 371 (c)(1),
(2) Date: May 5, 2022

(87) PCT Pub. No.: WO2021/088920
PCT Pub. Date: May 14, 2021

(65) Prior Publication Data
US 2023/0002364 A1    Jan. 5, 2023

(30) Foreign Application Priority Data

Nov. 5, 2019 (CN) .......................... 201911073071.3
Jan. 16, 2020 (CN) .......................... 202010048473.4
Jul. 24, 2020 (CN) .......................... 202010725973.7

(51) Int. Cl.
*C07D 409/04*    (2006.01)
*C07D 405/04*    (2006.01)
*C07D 409/14*    (2006.01)
*C07D 413/04*    (2006.01)

(52) U.S. Cl.
CPC ......... *C07D 409/04* (2013.01); *C07D 405/04* (2013.01); *C07D 409/14* (2013.01); *C07D 413/04* (2013.01)

(58) Field of Classification Search
CPC .................................................. C07D 409/04
See application file for complete search history.

(56) References Cited

U.S. PATENT DOCUMENTS

| | | | |
|---|---|---|---|
| 4,957,921 A * | 9/1990 | Caprathe | C07D 409/12 548/950 |
| 7,705,003 B2 | 4/2010 | Againe Csongor et al. | |
| 7,737,142 B2 | 6/2010 | Againe Csongor et al. | |
| 8,765,765 B2 | 7/2014 | Csongor et al. | |
| 9,550,741 B2 * | 1/2017 | Li | A61P 25/28 |
| 10,301,277 B2 * | 5/2019 | Huang | A61K 9/2018 |
| 2006/0229297 A1 | 10/2006 | Csongor et al. | |
| 2008/0103140 A1 | 5/2008 | Againe et al. | |
| 2010/0137335 A1 | 6/2010 | Csongor et al. | |
| 2010/0240640 A1 | 9/2010 | Csongor et al. | |

FOREIGN PATENT DOCUMENTS

| | | |
|---|---|---|
| CN | 1829703 A | 9/2006 |
| CN | 101107236 A | 1/2008 |
| CN | 101679330 A | 3/2010 |
| CN | 110372557 A | 10/2019 |
| CN | 110818676 A | 2/2020 |
| CN | 110818680 A | 2/2020 |
| WO | WO-2005012266 A1 | 2/2005 |
| WO | WO-2007093540 A1 | 8/2007 |
| WO | WO-2009013212 A2 | 1/2009 |
| WO | WO-2010031735 A1 | 3/2010 |

(Continued)

OTHER PUBLICATIONS

Huang et al (2017) : STN International, CAPLUS database, Accession No. 2017 : 467581.*
Li et al (2014) : STN International, CAPLUS database, Accession No. 2014 : 1898669.*
Caprathe et al (1991) : STN International, CAPLUS database, Accession No. 1991 : 583110.*

(Continued)

*Primary Examiner* — Golam M Shameem
(74) *Attorney, Agent, or Firm* — Schwegman Lundberg & Woessner, P.A.

(57) ABSTRACT

A nitrogen-containing ring derivative regulator, a preparation method therefor and use thereof. In particular, the present invention relates to a compound as represented by general formula (I), a preparation method therefor, a pharmaceutical composition containing the compound, and use thereof as a G protein-coupled receptor regulator in the treatment or prevention of central nervous system diseases and/or mental diseases.

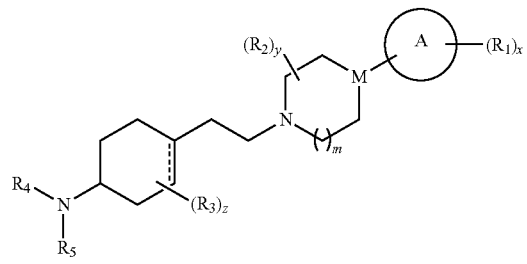

(I)

16 Claims, No Drawings

(56) References Cited

FOREIGN PATENT DOCUMENTS

| WO | WO-2012117001 A1 | 9/2012 |
| WO | WO-2014086098 A1 | 6/2014 |
| WO | WO-2015056164 A1 | 4/2015 |
| WO | WO-2017045599 A1 | 3/2017 |
| WO | WO-2020034946 A1 | 2/2020 |
| WO | WO-2021088920 A1 | 5/2021 |

OTHER PUBLICATIONS

"International Application No. PCT/CN2020/126735, International Search Report and Written Opinion mailed Feb. 5, 2021", (Feb. 5, 2021), 19 pgs.

* cited by examiner

BENZOTHIOPHENE DERIVATIVE REGULATOR, PREPARATION METHOD THEREFOR AND USE THEREOF

PRIORITY CLAIM TO RELATED APPLICATIONS

This application is a U.S. national stage filing under 35 U.S.C. § 371 from International Application No. PCT/CN2020/126735, filed on 5 Nov. 2020, which claims priority to Chinese Application No. 201911073071.3, filed on 5 Nov. 2019, and claims priority to Chinese Application No. 202010048473.4, filed 16 Jan. 2020, and claims priority to Chinese Application No. 202010725973.7, filed 24 Jul. 2020. This application incorporates by reference the entirety of International Application No. PCT/CN2020/126735 and its published version WO2021/088920 (published 14 May 2021).

FIELD OF THE INVENTION

The present invention belongs to the field of pharmaceutical synthesis, and specifically relates to a regulator of nitrogen-containing ring derivatives, a method for preparing the same, and a use thereof.

BACKGROUND OF THE INVENTION

Dopamine D3 receptor is a member of the G protein-coupled receptor family, and is a subtype of the dopamine receptor. It belongs to D2-like inhibitory receptor along with dopamine D2 and D4 receptors. Upon binding to DA, it reduces cAMP level by inhibiting G-protein. D3 receptors are mainly distributed in the mesolimbic system, especially the nucleus accumbens, olfactory tubercle and calleja's islets which are not related to motor function. Highly active modulators of D3 receptor may have good anti-schizophrenia activity. D3 receptor is closely related to mood, cognition, spirit, addiction, etc., and can improve the negative symptoms of schizophrenia patients. D3 receptor may play a regulatory role in cognition by regulating the release of acetylcholine and regulating glutamate receptor. Partial agonism of the D3 receptor can improve cognition.

5-Hydroxytryptamine 2A (5-HT2A) receptor is a member of the G protein-coupled receptor family, and is a major excitatory receptor subtype of the 5-HT receptor. They are distributed in the center and periphery, and are closely related to spirit, emotion, learning, memory, etc. Highly active inhibitors of 5-HT2A receptor have significant anti-schizophrenia effects, and can reduce the side effects of extrapyramidal tract.

Schizophrenia is a mental illness with the highest prevalence, with a slow course of disease, is prone to repeated attacks, aggravation or exacerbation, resulting in serious burden and adverse consequences for patients and their families. Psychopaths may experience positive symptoms such as delusion, hallucination and disturbance in thought, language and behavior, negative symptoms such as lack of emotion and expression, poor speech and lack of pleasure, and other symptoms such as cognitive disorder. Although the research, development and clinical application of anti-schizophrenia drugs have developed greatly in the past few decades, both traditional antipsychotics (first-generation) (haloperidol, droperidol, thioridazine, etc.) and atypical antipsychotics (second-generation) (clozapine, risperidone, olanzapine, aripiprazole, etc.) are effective in treating positive symptoms, while poor in improving negative symptoms and cognitive disorder. Therefore, there is an urgent need to develop anti-schizophrenia drugs that can improve not only positive symptoms but also negative symptoms and cognitive disorder. Highly active modulators of dopamine D3 receptor can improve negative symptoms, positive symptoms and cognitive disorder in patients with schizophrenia, without the side effects of the first- and second-generation antipsychotics such as extrapyramidal symptoms and weight gain.

Antagonists or partial agonists of D3 receptor have a good efficacy on improving the positive symptoms, negative symptoms and cognitive disorder of schizophrenia. International patent applications WO2007093540A, WO2009013212A2, WO2010031735A1 and WO2012117001A1 report D3 receptor and 5HT2A dual modulator compounds, but most of the binding activities Ki of the compounds to D3 receptor and 5HT2A are above 10 nM. Patent application WO2014086098A1 filed by Jiangsu Hengyi Pharmaceutical Co., LTD reports D3 selective inhibitors, but no study on the binding activity to 5HT2A is reported. Cariprazine, a D3 antagonist developed by Gedeon Richter Plc., has been listed in the market in 2015 and an international patent application WO2005012266A1 has been filed for it. Cariprazine has a potent D3 receptor agonist activity, and its use in the treatment of schizophrenia for negative symptoms has significant advantages over existing drugs. However, Cariprazine has weak inhibitory activity on 5-HT2A receptor, resulting in severe side effects of extrapyramidal symptoms (ESP). Therefore, there is an urgent need to develop highly active modulators of D3 receptor with optimized 5HT2A binding activity to reduce the side effects of extrapyramidal symptoms and improve the effects on negative symptoms and cognitive improvement in schizophrenia.

SUMMARY OF THE INVENTION

The object of the present invention is to provide a compound of formula (I), a stereoisomer thereof or a pharmaceutically acceptable salt thereof, wherein the structure of the compound of formula (I) is shown as following:

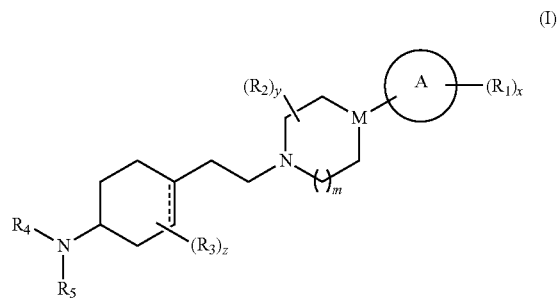

wherein:
--- is selected from the group consisting of a single bond and a double bond;
M is selected from the group consisting of N and $CR_{aa}$;
ring A is selected from the group consisting of aryl and heteroaryl;
$R_1$ is selected from the group consisting of hydrogen, deuterium, alkyl, deuterated alkyl, haloalkyl, alkoxy, haloalkoxy, halogen, amino, nitro, hydroxy, cyano, alkenyl, alkynyl, cycloalkyl, heterocyclyl, oxoheterocyclyl, thioheterocyclyl, aryl, heteroaryl, —(CH$_2$)$_{n1}$R$_{aa}$, —(CH$_2$)$_{n1}$OR$_{aa}$, —NR$_{aa}$C(O)(CH$_2$)$_{n1}$OR$_{aa}$, —NR$_{aa}$C(=S)(CH$_2$)$_{n1}$OR$_{bb}$, —(CH$_2$)$_{n1}$SR$_{aa}$, —(CH$_2$)$_{n1}$C(O)R$_{aa}$, —(CH$_2$)$_{n1}$C(O)OR$_{aa}$, —(CH$_2$)$_{n1}$S(O)$_{m1}$R$_{aa}$, —(CH$_2$)$_{n1}$NR$_{aa}$R$_{bb}$, —(CH$_2$)$_{n1}$C(O)NR$_{aa}$R$_{bb}$, —P(O)R$_{aa}$R$_{bb}$, —(CH$_2$)$_{n1}$NR$_{aa}$C(O)R$_{bb}$ and —(CH$_2$)$_{n1}$NR$_{aa}$S(O)$_{m1}$R$_{bb}$;

R$_2$ is selected from the group consisting of hydrogen, deuterium, alkyl, deuterated alkyl, haloalkyl, alkoxy, haloalkoxy, halogen, amino, nitro, hydroxy, cyano, alkenyl, alkynyl, cycloalkyl, heterocyclyl, oxoheterocyclyl, thioheterocyclyl, aryl, heteroaryl, —(CH$_2$)$_{n1}$R$_{aa}$, —(CH$_2$)$_{n1}$OR$_{aa}$, —NR$_{aa}$C(O)(CH$_2$)$_{n1}$OR$_{aa}$, —NR$_{aa}$C(=S)(CH$_2$)$_{n1}$OR$_{bb}$, —(CH$_2$)$_{n1}$SR$_{aa}$, —(CH$_2$)$_{n1}$C(O)R$_{aa}$, —(CH$_2$)$_{n1}$C(O)OR$_{aa}$, —(CH$_2$)$_{n1}$S(O)$_{m1}$R$_{aa}$, —(CH$_2$)$_{n1}$NR$_{aa}$R$_{bb}$, —(CH$_2$)$_{n1}$C(O)NR$_{aa}$R$_{bb}$, —P(O)R$_{aa}$R$_{bb}$, —(CH$_2$)$_{n1}$NR$_{aa}$C(O)R$_{bb}$ and —(CH$_2$)$_{n1}$NR$_{aa}$S(O)$_{m1}$R$_{bb}$;

or, two R$_2$ on the same or different carbon atoms are bonded to form a cycloalkyl, heterocyclyl, aryl or heteroaryl, wherein the cycloalkyl, heterocyclyl, aryl or heteroaryl is optionally further substituted by one or more substituents selected from the group consisting of hydrogen, deuterium, substituted or unsubstituted alkyl, substituted or unsubstituted cycloalkyl, substituted or unsubstituted haloalkyl, halogen, substituted or unsubstituted amino, oxo, thioxo, nitro, cyano, hydroxy, ester group, substituted or unsubstituted alkenyl, substituted or unsubstituted alkynyl, substituted or unsubstituted alkoxy, substituted or unsubstituted haloalkoxy, substituted or unsubstituted hydroxyalkyl, substituted or unsubstituted heterocyclyl, substituted or unsubstituted aryl, substituted or unsubstituted heteroaryl, —(CH$_2$)$_{n1}$R$_{cc}$, —(CH$_2$)$_{n1}$OR$_{cc}$, —(CH$_2$)$_{n1}$SR$_{cc}$, —(CH$_2$)$_{n1}$C(O)R$_{cc}$, —(CH$_2$)$_{n1}$C(O)OR$_{cc}$, —(CH$_2$)$_{n1}$S(O)$_{m1}$R$_{cc}$, —(CH$_2$)$_{n1}$NR$_{cc}$R$_{dd}$, —(CH$_2$)$_{n1}$C(O)NR$_{cc}$R$_{dd}$, —(CH$_2$)$_{n1}$C(O)NHR$_{cc}$, —(CH$_2$)$_{n1}$NR$_{cc}$C(O)R$_{dd}$ and —(CH$_2$)$_{n1}$NR$_{cc}$S(O)$_{m1}$R$_{dd}$;

R$_3$ is selected from the group consisting of hydrogen, deuterium, alkyl, deuterated alkyl, haloalkyl, alkoxy, haloalkoxy, halogen, amino, nitro, hydroxy, cyano, alkenyl, alkynyl, cycloalkyl, heterocyclyl, oxoheterocyclyl, thioheterocyclyl, aryl, heteroaryl, —(CH$_2$)$_{n1}$R$_{aa}$, —(CH$_2$)$_{n1}$OR$_{aa}$, —NR$_{aa}$C(O)(CH$_2$)$_{n1}$OR$_{aa}$, —NR$_{aa}$C(=S)(CH$_2$)$_{n1}$OR$_{bb}$, —(CH$_2$)$_{n1}$SR$_{aa}$, —(CH$_2$)$_{n1}$C(O)R$_{aa}$, —(CH$_2$)$_{n1}$C(O)OR$_{aa}$, —(CH$_2$)$_{n1}$S(O)$_{m1}$R$_{aa}$, —(CH$_2$)$_{n1}$NR$_{aa}$R$_{bb}$, —(CH$_2$)$_{n1}$S(O)(=NR$_{aa}$)R$_{bb}$, —(CH$_2$)$_{n1}$S(O)$_{m1}$NR$_{aa}$R$_{bb}$, —(CH$_2$)$_{n1}$C(O)NR$_{aa}$R$_{bb}$, —P(O)R$_{aa}$R$_{bb}$, —(CH$_2$)$_{n1}$NR$_{aa}$C(O)R$_{bb}$ and —(CH$_2$)$_{n1}$NR$_{aa}$S(O)$_{m1}$R$_{bb}$;

or, two R$_3$ on the same or different carbon atoms are bonded to form a cycloalkyl, heterocyclyl, aryl or heteroaryl, wherein the cycloalkyl, heterocyclyl, aryl or heteroaryl is optionally further substituted by one or more substituents selected from the group consisting of hydrogen, deuterium, substituted or unsubstituted alkyl, substituted or unsubstituted cycloalkyl, substituted or unsubstituted haloalkyl, halogen, substituted or unsubstituted amino, oxo, thioxo, nitro, cyano, hydroxy, ester group, substituted or unsubstituted alkenyl, substituted or unsubstituted alkynyl, substituted or unsubstituted alkoxy, substituted or unsubstituted haloalkoxy, substituted or unsubstituted hydroxyalkyl, substituted or unsubstituted heterocyclyl, substituted or unsubstituted aryl, substituted or unsubstituted heteroaryl, —(CH$_2$)$_{n1}$R$_{cc}$, —(CH$_2$)$_{n1}$OR$_{cc}$, —(CH$_2$)$_{n1}$SR$_{cc}$, —(CH$_2$)$_{n1}$C(O)R$_{cc}$, —(CH$_2$)$_{n1}$C(O)OR$_{cc}$, —(CH$_2$)$_{n1}$S(O)$_{m1}$R$_{cc}$, —(CH$_2$)$_{n1}$NR$_{cc}$R$_{dd}$, —(CH$_2$)$_{n1}$C(O)NR$_{cc}$R$_{dd}$, —(CH$_2$)$_{n1}$C(O)NHR$_{cc}$, —(CH$_2$)$_{n1}$NR$_{cc}$C(O)R$_{dd}$ and —(CH$_2$)$_{n1}$NR$_{cc}$S(O)$_{m1}$R$_{dd}$;

R$_4$ and R$_5$ are each independently selected from the group consisting of hydrogen, deuterium, alkyl, deuterated alkyl, haloalkyl, alkoxy, haloalkoxy, halogen, amino, nitro, hydroxy, cyano, alkenyl, alkynyl, cycloalkyl, heterocyclyl, oxoheterocyclyl, thioheterocyclyl, aryl, heteroaryl, —(CH$_2$)$_{n1}$R$_{aa}$, —(CH$_2$)$_{n1}$C(O)R$_{aa}$, —C(O)(CH$_2$)$_{n1}$R$_{aa}$, —(CH$_2$)$_{n1}$C(O)NR$_{aa}$R$_{bb}$, —(CH$_2$)$_{n1}$S(O)$_{m1}$R$_{aa}$, —(CH$_2$)$_{n1}$S(O)$_{m1}$NR$_{aa}$R$_{bb}$, —(CH$_2$)$_{n1}$OR$_{aa}$, —C(O)NR$_{aa}$(CH$_2$)$_{n1}$R$_{bb}$, —NR$_{aa}$C(=S)(CH$_2$)$_{n1}$OR$_{bb}$, —(CH$_2$)$_{n1}$SR$_{aa}$, —(CH$_2$)$_{n1}$C(O)OR$_{aa}$, —(CH$_2$)$_{n1}$S(O)(=NR$_{aa}$)R$_{bb}$, —P(O)R$_{aa}$R$_{bb}$, —(CH$_2$)$_{n1}$NR$_{aa}$C(O)R$_{bb}$ and —(CH$_2$)$_{n1}$NR$_{aa}$S(O)$_{m1}$R$_{bb}$, wherein the alkyl, deuterated alkyl, haloalkyl, alkoxy, haloalkoxy, amino, hydroxy, alkenyl, alkynyl, cycloalkyl, heterocyclyl, oxoheterocyclyl, thioheterocyclyl, aryl and heteroaryl are each optionally further substituted by one or more substituents selected from the group consisting of hydrogen, deuterium, substituted or unsubstituted alkyl, substituted or unsubstituted cycloalkyl, substituted or unsubstituted haloalkyl, halogen, substituted or unsubstituted amino, oxo, thioxo, nitro, cyano, hydroxy, ester group, substituted or unsubstituted alkenyl, substituted or unsubstituted alkynyl, substituted or unsubstituted alkoxy, substituted or unsubstituted haloalkoxy, substituted or unsubstituted hydroxyalkyl, substituted or unsubstituted heterocyclyl, substituted or unsubstituted aryl, substituted or unsubstituted heteroaryl, —(CH$_2$)$_{n1}$R$_{cc}$, —(CH$_2$)$_{n1}$OR$_{cc}$, —(CH$_2$)$_{n1}$SR$_{cc}$, —(CH$_2$)$_{n1}$C(O)R$_{cc}$, —(CH$_2$)$_{n1}$C(O)OR$_{cc}$, —(CH$_2$)$_{n1}$S(O)$_{m1}$R$_{cc}$, —(CH$_2$)$_{n1}$NR$_{cc}$R$_{dd}$, —(CH$_2$)$_{n1}$C(O)NR$_{cc}$R$_{dd}$, —(CH$_2$)$_{n1}$C(O)NHR$_{cc}$, —(CH$_2$)$_{n1}$NR$_{cc}$C(O)R$_{dd}$ and —(CH$_2$)$_{n1}$NR$_{cc}$S(O)$_{m1}$R$_{dd}$;

or, R$_4$ and R$_5$ are bonded to form a cycloalkyl, heterocyclyl, aryl or heteroaryl, wherein the cycloalkyl, heterocyclyl, aryl or heteroaryl is optionally further substituted by one or more substituents selected from the group consisting of hydrogen, deuterium, substituted or unsubstituted alkyl, substituted or unsubstituted cycloalkyl, substituted or unsubstituted haloalkyl, halogen, substituted or unsubstituted amino, oxo, thioxo, nitro, cyano, hydroxy, ester group, substituted or unsubstituted alkenyl, substituted or unsubstituted alkynyl, substituted or unsubstituted alkoxy, substituted or unsubstituted haloalkoxy, substituted or unsubstituted hydroxyalkyl, substituted or unsubstituted heterocyclyl, substituted or unsubstituted aryl, substituted or unsubstituted heteroaryl, —(CH$_2$)$_{n1}$R$_{cc}$, —(CH$_2$)$_{n1}$OR$_{cc}$, —(CH$_2$)$_{n1}$SR$_{cc}$, —(CH$_2$)$_{n1}$C(O)R$_{cc}$, —(CH$_2$)$_{n1}$C(O)OR$_{cc}$, —(CH$_2$)$_{n1}$S(O)$_{m1}$R$_{cc}$, —(CH$_2$)$_{n1}$NR$_{cc}$R$_{dd}$, —(CH$_2$)$_{n1}$C(O)NR$_{cc}$R$_{dd}$, —(CH$_2$)$_{n1}$C(O)NHR$_{cc}$, —(CH$_2$)$_{n1}$NR$_{cc}$C(O)R$_{dd}$ and —(CH$_2$)$_{n1}$NR$_{cc}$S(O)$_{m1}$R$_{dd}$;

R$_{aa}$, R$_{bb}$, R$_{cc}$ and R$_{dd}$ are each independently selected from the group consisting of hydrogen, deuterium, alkyl, deuterated alkyl, haloalkyl, alkoxy, hydroxyalkyl, haloalkoxy, halogen, cyano, nitro, hydroxy, amino, alkenyl, alkynyl, cycloalkyl, heterocyclyl, aryl and heteroaryl, wherein the alkyl, deuterated alkyl, haloalkyl, alkoxy, hydroxyalkyl, haloalkoxy, alkenyl, alkynyl, cycloalkyl, heterocyclyl, aryl and heteroaryl are each optionally further substituted by one or more substituents selected from the group consisting of hydrogen, deuterium, substituted or unsubstituted alkyl, substituted or unsubstituted haloalkyl, halogen, hydroxy, substituted or unsubstituted amino, oxo, nitro, cyano, substituted or unsubstituted alkenyl, substituted or unsubstituted alkynyl, substituted or unsubstituted alkoxy, substituted or unsubstituted hydroxyalkyl, substituted or unsubstituted cycloalkyl, substituted or unsubstituted heterocyclyl, substituted or unsubstituted aryl and substituted or unsubstituted heteroaryl;

or, $R_{aa}$ and $R_{bb}$ are bonded to form a cycloalkyl, heterocyclyl, aryl or heteroaryl, wherein the cycloalkyl, heterocyclyl, aryl or heteroaryl is optionally further substituted by one or more substituents selected from the group consisting of hydrogen, deuterium, substituted or unsubstituted alkyl, substituted or unsubstituted cycloalkyl, substituted or unsubstituted haloalkyl, halogen, substituted or unsubstituted amino, oxo, thioxo, nitro, cyano, hydroxy, substituted or unsubstituted alkenyl, substituted or unsubstituted alkynyl, substituted or unsubstituted alkoxy, substituted or unsubstituted haloalkoxy, substituted or unsubstituted hydroxyalkyl, substituted or unsubstituted heterocyclyl, substituted or unsubstituted aryl and substituted or unsubstituted heteroaryl;

m is 0, 1 or 2;
x is 0, 1, 2, 3 or 4;
y is 0, 1, 2, 3 or 4;
z is 0, 1, 2, 3 or 4;
m1 is 0, 1 or 2; and
n1 is 0, 1, 2, 3, 4 or 5;
wherein the compound of formula (I) does not comprise compounds acceptable salt thereof, ring A is selected from the group consisting of $C_{6-10}$ aryl and 5 to 10 membered heteroaryl, and preferably phenyl, 5 to 6 membered monocyclic heteroaryl, benzo-5~6 membered heteroaryl and benzo-3~6 membered heterocyclyl.

In a preferred embodiment of the present invention, in the compound, the stereoisomer thereof or the pharmaceutically acceptable salt thereof,

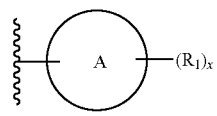

is selected from the group consisting of

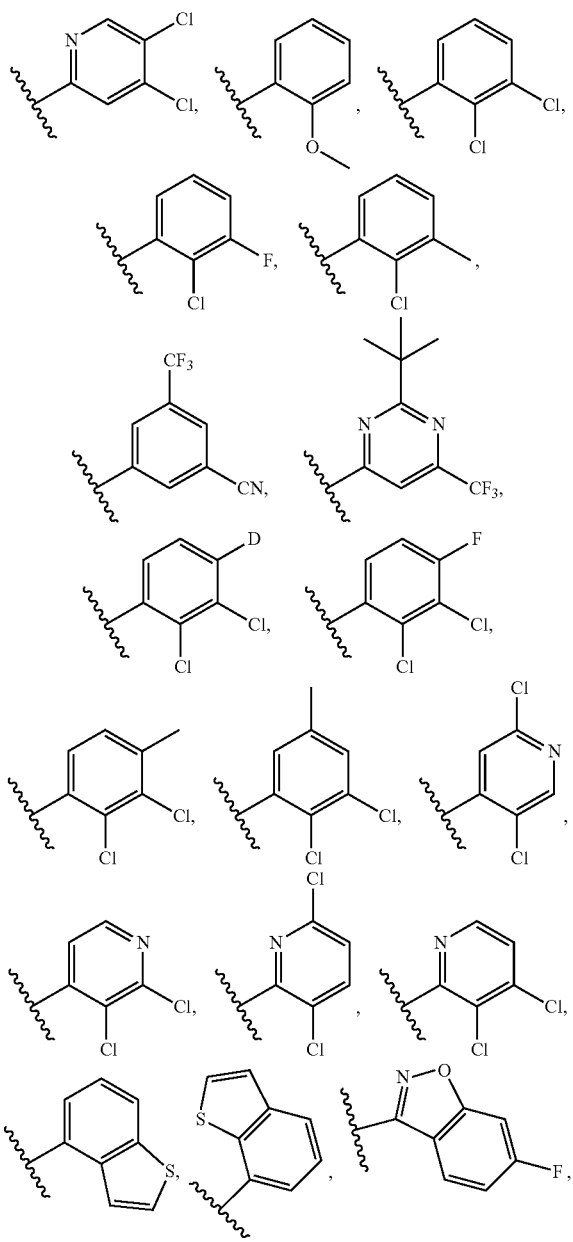

In a preferred embodiment of the present invention, in the compound, the stereoisomer thereof or the pharmaceutically -continued

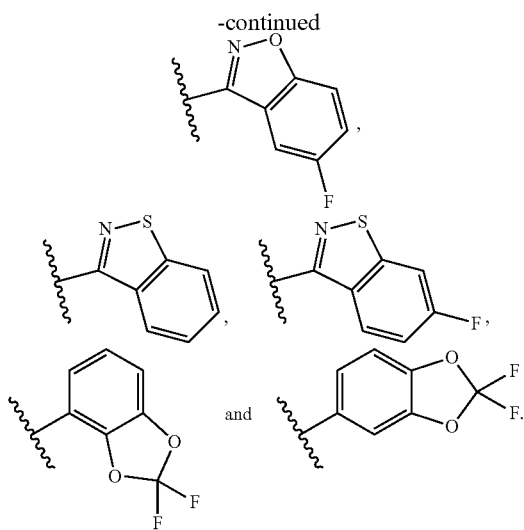

In a preferred embodiment of the present invention, in the compound, the stereoisomer thereof or the pharmaceutically acceptable salt thereof, $R_4$ is selected from the group consisting of hydrogen and $C_{1-6}$ alkyl, and preferably hydrogen and methyl;

$R_5$ is selected from the group consisting of hydrogen, $C_{1-6}$ alkyl, $C_{3-8}$ cycloalkyl, 3 to 8 membered heterocyclyl, $C_{6-14}$ aryl, 5 to 14 membered heteroaryl, —$(CH_2)_{n1}R_{aa}$, —$C(O)R_{aa}$, —$C(O)NR_{aa}R_{bb}$, —$C(O)(CH_2)_{n1}R_{aa}$, —$C(O)NR_{aa}(CH_2)_{n1}R_{bb}$, —$S(O)_2R_{aa}$, —$(CH_2)_{n1}S(O)$ (=$NR_{aa})R_{bb}$, —$S(O)_{m1}NR_{aa}R_{bb}$ and —$C(O)OR_{aa}$, wherein the $C_{1-6}$ alkyl, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of hydrogen, cyano, halogen, $C_{1-6}$ alkyl and $C_{1-6}$ alkoxy;

and preferably selected from the group consisting of —$R_{aa}$, —$C(O)(CH_2)_{n1}R_{aa}$, —$C(O)NR_{aa}(CH_2)_{n1}R_{bb}$ and —$S(O)_2R_{aa}$;

or, $R_4$ and $R_5$ are bonded to form a 3 to 8 membered heterocyclyl or 5 to 14 membered heteroaryl, wherein the 3 to 8 membered heterocyclyl or 5 to 14 membered heteroaryl is optionally further substituted by one or more substituents selected from the group consisting of hydrogen, $C_{1-6}$ alkyl, halogen, amino, oxo, thioxo, cyano, hydroxy, $C_{3-8}$ alkoxy, $C_{3-8}$ haloalkoxy, $C_{3-8}$ hydroxyalkyl, —$C(O)R_{cc}$ and —$C(O)NR_{cc}R_{dd}$;

wherein the heterocyclyl or heteroaryl is selected from the group consisting of heterocyclyl containing 1 to 2 nitrogen, oxygen or sulfur atoms and heteroaryl containing 1 to 2 nitrogen, oxygen or sulfur atoms;

$R_{aa}$ and $R_{bb}$ are each independently selected from the group consisting of hydrogen, amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl, wherein the amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of halogen, hydroxy, cyano, oxo, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl;

preferably, $R_{aa}$ and $R_{bb}$ are each independently selected from the group consisting of hydrogen, amino, $C_{1-4}$ alkyl, $C_{1-4}$ haloalkyl, $C_{1-4}$ alkoxy, $C_{3-6}$ cycloalkyl, 3 to 6 membered heterocyclyl, phenyl and 5 to 6 membered heteroaryl, wherein the amino, $C_{1-3}$ alkyl, $C_{1-3}$ haloalkyl, $C_{1-3}$ alkoxy, $C_{3-6}$ cycloalkyl, 3 to 6 membered heterocyclyl, phenyl and 5 to 6 membered heteroaryl are each optionally further substituted by one or more substituents selected from the group consisting of halogen, hydroxy, cyano, oxo, $C_{1-3}$ alkyl, $C_{1-3}$ haloalkyl, $C_{1-3}$ alkoxy, $C_{3-6}$ cycloalkyl, 3 to 6 membered heterocyclyl, phenyl and 5 to 6 membered heteroaryl;

$R_{cc}$ and $R_{dd}$ are each independently selected from the group consisting of hydrogen, amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl, wherein the amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of hydrogen, halogen, hydroxy, cyano, oxo, $C_{1-6}$ alkyl, $C_{1-6}$ haloalkyl and $C_{1-6}$ alkoxy; and n1 is 0, 1, 2 or 3.

In a preferred embodiment of the present invention, in the compound, the stereoisomer thereof or the pharmaceutically acceptable salt thereof, a compound of formula (IV) is a compound of formula (IV-A):

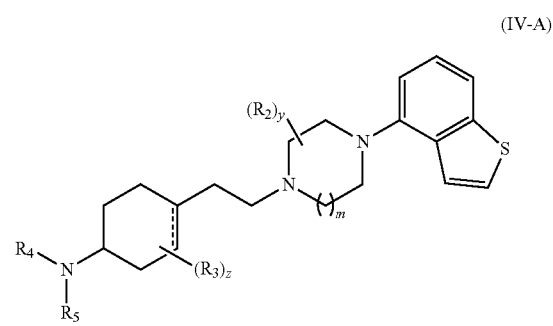

(IV-A)

$R_2$ is selected from the group consisting of hydrogen, cyano, halogen, $C_{1-6}$ alkyl, $C_{1-6}$ haloalkyl and $C_{3-6}$ cycloalkyl;

or, two $R_2$ on the same or different carbon atoms are bonded to form a $C_{3-8}$ cycloalkyl or 3 to 8 membered heterocyclyl, wherein the $C_{3-8}$ cycloalkyl or 3 to 8 membered heterocyclyl is optionally further substituted by one or more substituents selected from the group consisting of deuterium atom, $C_{1-6}$ alkyl, halogen, amino, oxo, thioxo, cyano, hydroxy, $C_{3-8}$ alkoxy, $C_{3-8}$ haloalkoxy and $C_{3-8}$ hydroxyalkyl;

$R_3$ is selected from the group consisting of hydrogen, halogen, $C_{1-6}$ alkyl, $C_{1-6}$ haloalkyl, $C_{1-6}$ alkoxy, $C_{1-6}$ haloalkoxy, hydroxy, cyano, $C_{2-6}$ alkenyl and $C_{2-6}$ alkynyl;

$R_4$ is selected from the group consisting of hydrogen and $C_{1-6}$ alkyl;

$R_5$ is selected from the group consisting of hydrogen, $C_{1-6}$ alkyl, $C_{3-8}$ cycloalkyl, 3 to 8 membered heterocyclyl, $C_{6-14}$ aryl, 5 to 14 membered heteroaryl, —$(CH_2)_{n1}R_{aa}$, —$C(O)R_{aa}$, —$C(O)NR_{aa}R_{bb}$, —$C(O)(CH_2)_{n1}R_{aa}$, —$C(O)NR_{aa}(CH_2)_{n1}R_{bb}$, —$S(O)_2R_{aa}$, —$(CH_2)_{n1}S(O)$ (=$NR_{aa})R_{bb}$, —$S(O)_{m1}NR_{aa}R_{bb}$ and —$C(O)OR_{aa}$, wherein the $C_{1-6}$ alkyl, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of cyano, halogen, $C_{1-6}$ alkyl and $C_{1-6}$ alkoxy;

or, $R_4$ and $R_5$ are bonded to form a 3 to 8 membered heterocyclyl or 5 to 14 membered heteroaryl, which is optionally further substituted by one or more substituents selected from the group consisting of $C_{1-6}$ alkyl, halogen, amino, oxo, thioxo, cyano, hydroxy, $C_{3-8}$ alkoxy, $C_{3-8}$ haloalkoxy, $C_{3-8}$ hydroxyalkyl, —C(O)$R_{cc}$ and —C(O)N$R_{cc}R_{dd}$;

$R_{aa}$ and $R_{bb}$ are each independently selected from the group consisting of hydrogen, amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl, wherein the amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of halogen, hydroxy, cyano, oxo, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl;

or, $R_{aa}$ and $R_{bb}$ together with the adjacent nitrogen atom are bonded to form a 4 to 10 membered heterocyclyl, which is optionally further substituted by one or more substituents selected from the group consisting of halogen, hydroxy, cyano, oxo, $C_{1-6}$ alkyl, $C_{1-6}$ haloalkyl, $C_{1-6}$ alkoxy and $C_{1-6}$ hydroxyalkyl;

$R_{cc}$ and $R_{dd}$ are each independently selected from the group consisting of hydrogen, amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl, wherein the amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of halogen, hydroxy, cyano, oxo, $C_{1-6}$ alkyl, $C_{1-6}$ haloalkyl and $C_{1-6}$ alkoxy;

m is 1 or 2; and n1 is 0, 1, 2 or 3.

In a preferred embodiment of the present invention, in the compound, the stereoisomer thereof or the pharmaceutically acceptable salt thereof, a compound of formula (IV-A) is a compound of formula (IX-B):

(IX-B)

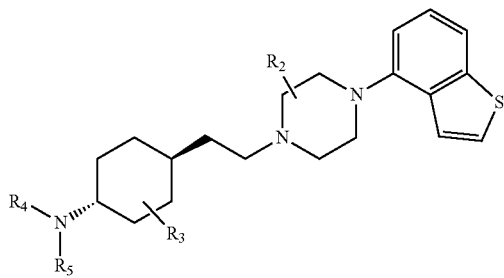

$R_2$ is selected from the group consisting of hydrogen, cyano, halogen, $C_{1-6}$ alkyl, $C_{1-6}$ haloalkyl and $C_{3-6}$ cycloalkyl;

$R_3$ is selected from the group consisting of hydrogen, halogen, hydroxy, cyano, $C_{1-6}$ alkyl, $C_{1-6}$ haloalkyl, $C_{1-6}$ alkoxy and $C_{1-6}$ haloalkoxy;

$R_4$ is selected from the group consisting of hydrogen and $C_{1-6}$ alkyl;

$R_5$ is selected from the group consisting of hydrogen, $C_{1-6}$ alkyl, $C_{3-8}$ cycloalkyl, 3 to 8 membered heterocyclyl, $C_{6-14}$ aryl, 5 to 14 membered heteroaryl, —(CH$_2$)$_{n1}R_{aa}$, —C(O)$R_{aa}$, —C(O)N$R_{aa}R_{bb}$, —C(O)(CH$_2$)$_{n1}R_{aa}$, —C(O)N$R_{aa}$(CH$_2$)$_{n1}R_{bb}$, —S(O)$_2R_{aa}$, —(CH$_2$)$_{n1}$S(O)(=N$R_{aa}$)$R_{bb}$, —S(O)$_{m1}$N$R_{aa}R_{bb}$ and —C(O)O$R_{aa}$, wherein the $C_{1-6}$ alkyl, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of cyano, halogen, $C_{1-6}$ alkyl and $C_{1-6}$ alkoxy;

or, $R_4$ and $R_5$ are bonded to form a 3 to 8 membered heterocyclyl or 5 to 10 membered heteroaryl, which is optionally further substituted by one or more substituents selected from the group consisting of $C_{1-6}$ alkyl, halogen, amino, oxo, thioxo, cyano, hydroxy, $C_{3-8}$ alkoxy, $C_{3-8}$ haloalkoxy and $C_{3-8}$ hydroxyalkyl;

$R_{aa}$ and $R_{bb}$ are each independently selected from the group consisting of hydrogen, amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 10 membered heteroaryl containing 1 to 2 heteroatom selected from the group consisting of N, O and S, which are each optionally further substituted by one or more substituents selected from the group consisting of halogen, hydroxy, cyano, oxo, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl;

or, $R_{aa}$ and $R_{bb}$ together with the adjacent nitrogen atom are bonded to form a 4 to 6 membered heterocyclyl, which is optionally further substituted by one or more substituents selected from the group consisting of halogen, hydroxy, cyano, oxo, $C_{1-6}$ alkyl, $C_{1-6}$ haloalkyl, $C_{1-6}$ alkoxy and $C_{1-6}$ hydroxyalkyl.

In another preferred embodiment of the present invention, in the compound of formula (IX-B), the stereoisomer thereof or the pharmaceutically acceptable salt thereof, $R_2$ is selected from the group consisting of hydrogen, cyano, halogen, $C_{1-3}$ alkyl, $C_{1-3}$ haloalkyl and $C_{3-6}$ cycloalkyl;

$R_3$ is selected from the group consisting of hydrogen, halogen and $C_{1-3}$ alkyl;

$R_4$ is selected from the group consisting of hydrogen and $C_{1-3}$ alkyl;

$R_5$ is selected from the group consisting of —(CH$_2$)$_{n1}R_{aa}$, —C(O)$R_{aa}$, —C(O)N$R_{aa}R_{bb}$, —S(O)$_2R_{aa}$ and —S(O)$_{m1}$N$R_{aa}R_{bb}$;

$R_{aa}$ and $R_{bb}$ are each independently selected from the group consisting of hydrogen, amino, $C_{1-3}$ alkyl, $C_{1-3}$ haloalkyl, $C_{1-3}$ alkoxy, $C_{3-6}$ cycloalkyl and 5 to 6 membered heteroaryl containing 1 to 2 heteroatom selected from the group consisting of N, O and S, which are each optionally further substituted by one or more substituents selected from the group consisting of halogen, hydroxy, cyano, oxo, $C_{1-3}$ alkyl, $C_{1-3}$ haloalkyl, $C_{1-3}$ alkoxy and $C_{3-6}$ cycloalkyl;

or, $R_{aa}$ and $R_{bb}$ together with the adjacent nitrogen atom are bonded to form a 4 to 6 membered nitrogen-containing heterocyclyl, which is optionally further substituted by one or more substituents selected from the group consisting of halogen, hydroxy, $C_{1-3}$ alkyl, $C_{1-3}$ haloalkyl and $C_{1-3}$ alkoxy;

when $R_2$, $R_3$ and $R_4$ are hydrogen, $R_5$ is not hydrogen or butyloxycarbonyl;

when $R_2$, $R_3$ and $R_4$ are methyl, $R_5$ is not methyl.

In another preferred embodiment of the present invention, in the compound of formula (IX-B), the stereoisomer thereof or the pharmaceutically acceptable salt thereof, $R_2$ is selected from the group consisting of hydrogen, cyano, fluorine, chlorine, bromine, methyl, ethyl, trifluoromethyl, trifluoromethyl and cyclopropyl;

$R_3$ is selected from the group consisting of hydrogen, fluorine, chlorine, bromine, methyl and ethyl;

$R_4$ is selected from the group consisting of hydrogen and methyl;

$R_5$ is selected from the group consisting of —$R_{aa}$, —C(O)$R_{aa}$ and —C(O)$NR_{aa}R_{bb}$;

$R_{aa}$ and $R_{bb}$ are each independently selected from the group consisting of hydrogen, $C_{1-3}$ alkyl, $C_{1-3}$ fluoroalkyl, $C_{1-3}$ alkoxy, cyclopropyl, cyclobutyl, cyclopentyl, furyl, oxazolyl and isoxazolyl, which are each optionally further substituted by one or more substituents selected from the group consisting of halogen, hydroxy, cyano, $C_{1-3}$ alkyl and $C_{1-3}$ alkoxy;

or, $R_{aa}$ and $R_{bb}$ together with the adjacent nitrogen atom are bonded to form an azetidinyl, pyrrolidinyl or piperidinyl, which is optionally further substituted by one or more substituents selected from the group consisting of halogen, hydroxy, $C_{1-3}$ alkyl, $C_{1-3}$ haloalkyl and $C_{1-3}$ alkoxy.

In another preferred embodiment of the present invention, in the compound, the stereoisomer thereof or the pharmaceutically acceptable salt thereof, the specific structure thereof is as shown in formula (XII):

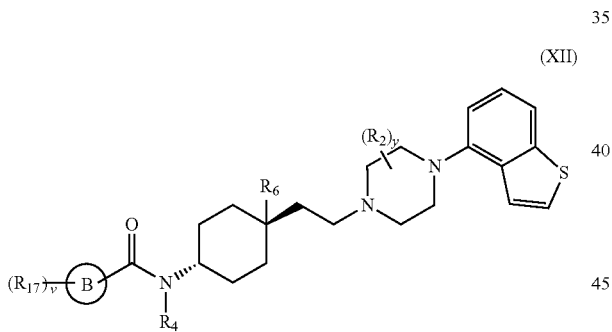

(XII)

wherein:

ring B is selected from the group consisting of $C_{3-8}$ cycloalkyl, 3 to 8 membered heterocyclyl and 5 to 10 membered heteroaryl; and preferably selected from the group consisting of cyclopropyl, azetidinyl, pyrrolidonyl, furyl, oxazolyl and isoxazolyl;

$R_2$ is selected from the group consisting of hydrogen, cyano, halogen, $C_{1-6}$ alkyl, $C_{1-6}$ haloalkyl and $C_{3-6}$ cycloalkyl; and preferably selected from the group consisting of hydrogen and $C_{1-6}$ haloalkyl; more preferably selected from the group consisting of hydrogen and trifluoromethyl;

$R_4$ is selected from the group consisting of hydrogen and $C_{1-6}$ alkyl; and preferably selected from the group consisting of hydrogen and methyl;

$R_6$ is selected from the group consisting of hydrogen, halogen, $C_{1-6}$ alkyl, $C_{1-6}$ haloalkyl, $C_{1-6}$ alkoxy, $C_{1-6}$ haloalkoxy, hydroxy, cyano, $C_{2-6}$ alkenyl and $C_{2-6}$ alkynyl; and preferably selected from the group consisting of hydrogen and halogen; and more preferably selected from the group consisting of hydrogen and fluorine;

$R_{17}$ is selected from the group consisting of hydrogen, halogen, amino, hydroxy, cyano, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl, wherein the amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-10}$ aryl and 5 to 10 membered heteroaryl are each optionally further substituted by one or more substituents selected from the group consisting of hydrogen, halogen, hydroxy, cyano, oxo, $C_{1-6}$ alkyl, $C_{1-6}$ haloalkyl and $C_{1-6}$ alkoxy; and preferably selected from the group consisting of hydrogen, amino, halogen, amino, hydroxy, cyano, $C_{1-3}$ alkyl, $C_{1-3}$ haloalkyl and $C_{1-3}$ alkoxy; more preferably selected from the group consisting of hydrogen, fluorine, chlorine, hydroxy, cyano, methyl and methoxy; and v is an integer of 0 to 5, and preferably 0, 1, 2 or 3.

In another preferred embodiment of the present invention, in any one of the compounds, the stereoisomer thereof or the pharmaceutically acceptable salt thereof,

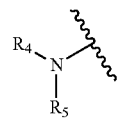

is selected from the group consisting of

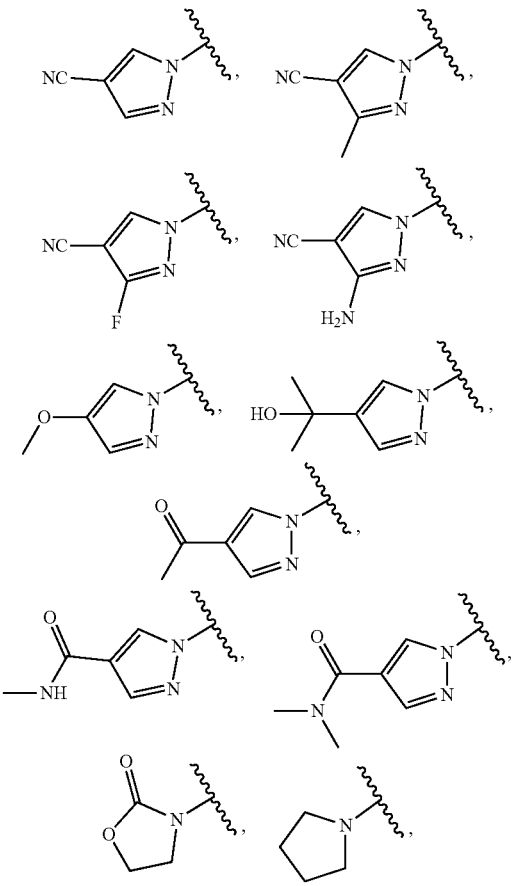

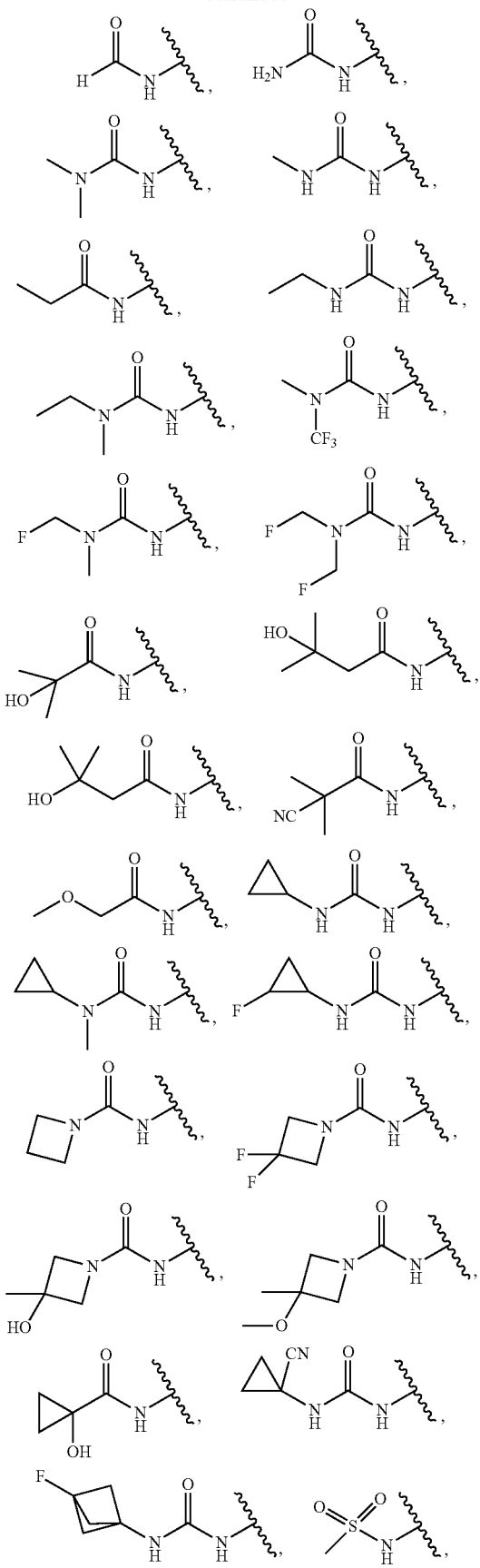
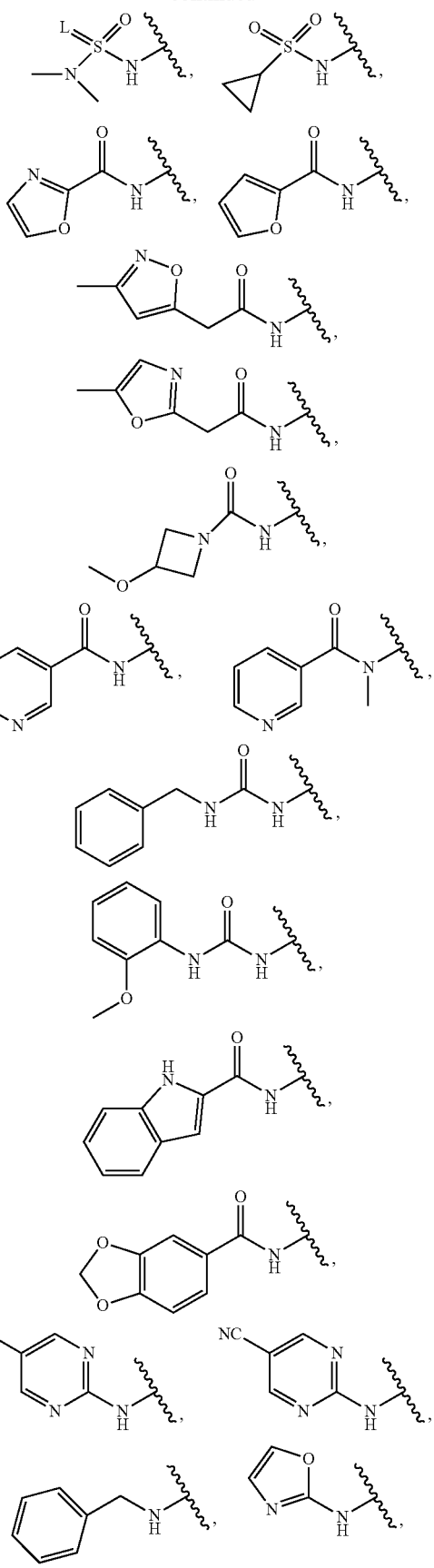

-continued

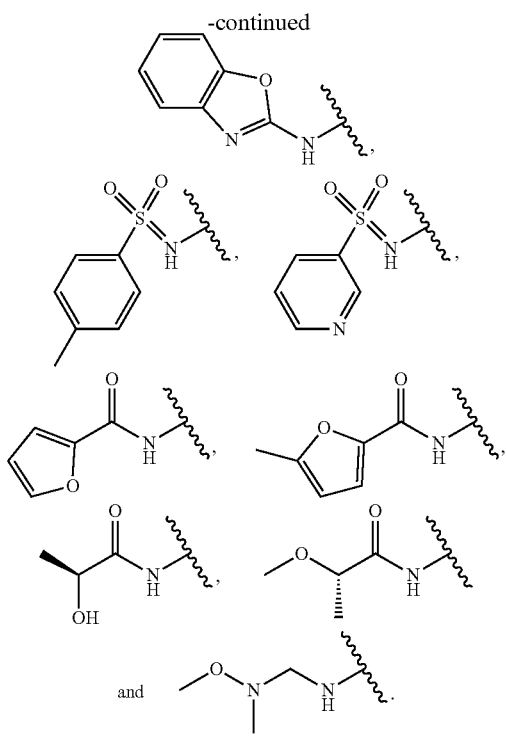

In another preferred embodiment of the present invention, in any one of the compounds, the stereoisomer thereof or the pharmaceutically acceptable salt thereof, ring A is

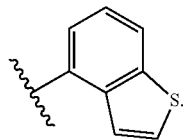 [SMILES: *c1cccc2sccc12]

In another preferred embodiment of the present invention, in any one of the compounds, the stereoisomer thereof or the pharmaceutically acceptable salt thereof, $R_1$ is selected from the group consisting of hydrogen, cyano, halogen, $C_{1-6}$ alkyl, $C_{1-6}$ haloalkyl, $C_{1-6}$ alkoxy and $C_{3-6}$ cycloalkyl;

$R_2$ is selected from the group consisting of hydrogen, cyano, halogen, $C_{1-6}$ alkyl, $C_{1-6}$ haloalkyl and $C_{3-6}$ cycloalkyl;

or, two $R_2$ on the same or different carbon atoms are bonded to form a $C_{3-8}$ cycloalkyl or 3 to 8 membered heterocyclyl, wherein the $C_{3-8}$ cycloalkyl or 3 to 8 membered heterocyclyl is optionally further substituted by one or more substituents selected from the group consisting of hydrogen, deuterium atom, $C_{1-6}$ alkyl, halogen, amino, oxo, thioxo, cyano, hydroxy, $C_{3-8}$ alkoxy, $C_{3-8}$ haloalkoxy and $C_{3-8}$ hydroxyalkyl;

$R_3$ is selected from the group consisting of hydrogen atom, halogen, hydroxy, $C_{1-6}$ alkyl and $C_{1-6}$ alkoxy;

or, two $R_3$ on the same or different carbon atoms are bonded to form a $C_{3-8}$ cycloalkyl or 3 to 8 membered heterocyclyl, wherein the $C_{3-8}$ cycloalkyl or 3 to 8 membered heterocyclyl is optionally further substituted by one or more substituents selected from the group consisting of hydrogen, deuterium, $C_{1-6}$ alkyl, halogen, amino, oxo, thioxo, cyano, hydroxy, $C_{3-8}$ alkoxy, $C_{3-8}$ haloalkoxy and $C_{3-8}$ hydroxyalkyl;

$R_4$ is selected from the group consisting of hydrogen and $C_{1-6}$ alkyl;

$R_5$ is selected from the group consisting of hydrogen, $C_{1-6}$ alkyl, $C_{3-8}$ cycloalkyl, 3 to 8 membered heterocyclyl, $C_{6-14}$ aryl, 5 to 14 membered heteroaryl, $—(CH_2)_{n1}R_{aa}$, $—C(O)R_{aa}$, $—C(O)NR_{aa}R_{bb}$, $—C(O)(CH_2)_{n1}R_{aa}$, $—C(O)NR_{aa}(CH_2)_{n1}R_{bb}$, $—S(O)_2R_{aa}$, $—(CH_2)_{n1}S(O)(=NR_{aa})R_{bb}$, $—S(O)_{m1}NR_{aa}R_{bb}$ and $—C(O)OR_{aa}$, wherein the $C_{1-6}$ alkyl, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of hydrogen, cyano, halogen, $C_{1-6}$ alkyl and $C_{1-6}$ alkoxy;

or, $R_4$ and $R_5$ are bonded to form a 3 to 8 membered heterocyclyl or 5 to 14 membered heteroaryl, which is optionally further substituted by one or more substituents selected from the group consisting of hydrogen, $C_{1-6}$ alkyl, halogen, amino, oxo, thioxo, cyano, hydroxy, $C_{3-8}$ alkoxy, $C_{3-8}$ haloalkoxy, $C_{3-8}$ hydroxyalkyl, $—C(O)Rec$ and $—C(O)NR_{cc}R_{dd}$;

$R_{aa}$ is selected from the group consisting of hydrogen, amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl, wherein the amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of hydrogen, halogen, hydroxy, cyano, oxo, $C_{1-6}$ alkyl, $C_{1-6}$ haloalkyl, $C_{1-6}$ alkoxy and 5 to 14 membered heteroaryl;

$R_{bb}$ is selected from the group consisting of hydrogen, amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl, wherein the amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of hydrogen atom, halogen, hydroxy, cyano, oxo, $C_{1-6}$ alkyl, $C_{1-6}$ haloalkyl and $C_{1-6}$ alkoxy;

or, $R_{aa}$ and $R_{bb}$ are bonded to form a heterocyclyl, wherein the heterocyclyl is optionally further substituted by one or more substituents selected from the group consisting of hydrogen atom, $C_{1-6}$ alkyl, halogen, amino, oxo, thioxo, cyano, hydroxy, $C_{3-8}$ alkoxy, $C_{3-8}$ haloalkoxy and $C_{3-8}$ hydroxyalkyl;

$R_{cc}$ and $R_{dd}$ are each independently selected from the group consisting of hydrogen, amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl, wherein the amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of hydrogen, halogen, hydroxy, cyano, oxo, $C_{1-6}$ alkyl, $C_{1-6}$ haloalkyl and $C_{1-6}$ alkoxy.

In another aspect, the present invention provides a method for preparing the compound of formula (IX-B), the stereoisomer thereof or the pharmaceutically acceptable salt thereof, characterized by comprising the following steps of,

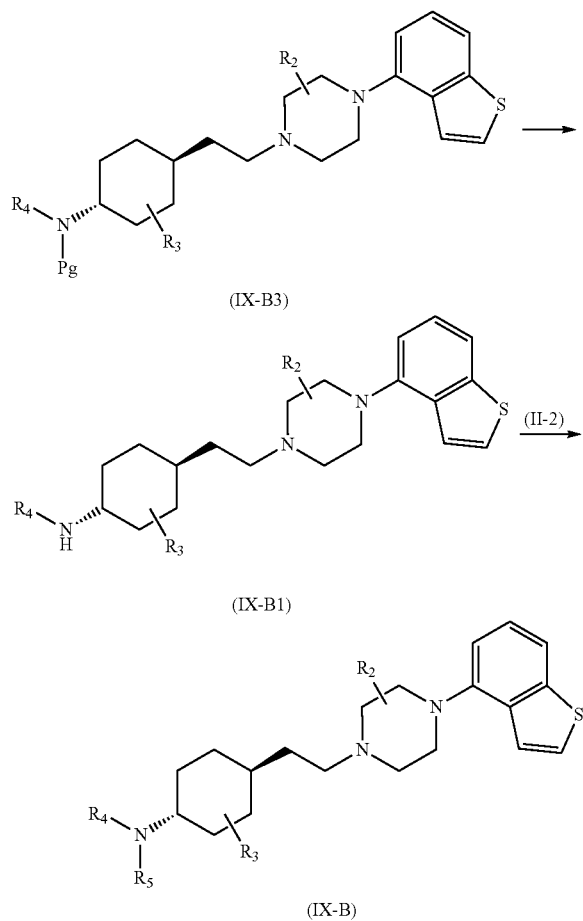

(IX-B3)

(IX-B1)

(IX-B)

deprotecting a compound of formula (IX-B3) to obtain a compound of formula (IX-B1), a stereoisomer thereof or a pharmaceutically acceptable salt thereof;

reacting the compound of formula (IX-B1) with an acyl chloride, amine, carboxylic acid or sulfonyl chloride of formula (II-2) to obtain the compound of formula (VIII), the stereoisomer thereof or the pharmaceutically acceptable salt thereof;

the compound of formula (II-2) represents $R_5X$, $R_5OH$ or $R_5NH_2$;

X is a halogen, and preferably fluorine, chlorine or bromine;

Pg is a hydrogen or amino protecting group selected from the group consisting of allyloxycarbonyl, trifluoroacetyl, 2,4-dimethoxybenzyl, nitrobenzenesulfonyl, trityl, fluorenylmethyloxycarbonyl, p-toluenesulfonyl, formate, acetyl, benzyloxycarbonyl, t-butoxycarbonyl, benzyl and p-methoxyphenyl, and preferably t-butoxycarbonyl.

The present invention also relates to a pharmaceutical composition comprising a therapeutically effective dose of any one of the compound of formula (I), any one of the compound of the general formula, the stereoisomer thereof or the pharmaceutically acceptable salt thereof, and one or more pharmaceutically acceptable carriers, diluents or excipients.

The present invention also relates to a use of any one of the compound of formula (I), any one of the compound of the general formula, the stereoisomer thereof or the pharmaceutically acceptable salt thereof, or the pharmaceutical composition in the preparation of a modulator of G protein-coupled receptor, particularly a modulator of dopamine D3 receptor and a modulator of 5-HT2A receptor.

The present invention further relates to a method for treating an inflammatory disease by the compound of formula (I), the stereoisomer thereof or the pharmaceutically acceptable salt thereof or the pharmaceutical composition thereof.

The present invention also relates to a method for preventing and/or treating a central nervous system disease and/or psychiatric disease or disorder, comprising a step of administration of a therapeutically effective dose of the compound of formula (I), the stereoisomer thereof or the pharmaceutically acceptable salt thereof or the pharmaceutical composition thereof to a patient.

The present invention also provides a method for treating a disease condition by using the compound or pharmaceutical composition according to the present invention, wherein the disease condition includes, but is not limited to a condition related to a modulator of G protein-coupled receptor.

The present invention also relates to a method for treating a nervous system disease and/or psychiatric disease in a mammal, comprising a step of administration of a therapeutically effective amount of the compound or the pharmaceutically acceptable salt, ester, prodrug, solvate, hydrate or derivative thereof according to the present invention to the mammal.

In some embodiments, the method involves the treatment of conditions such as cancer, bone disease, inflammatory disease, immune disease, nervous system disease, metabolic disease, respiratory disease and heart disease.

In some embodiments, the method involves the treatment and/or prevention of a central nervous system disease and/or psychiatric disease or disorder selected from the group consisting of schizophrenia, sleep disorder, mood disorder, schizophrenia spectrum disorder, spastic disorder, memory disorder and/or cognitive disorder, movement disorder, personality disorder, autism spectrum disorder, pain, traumatic brain injury, vascular disease, substance abuse disorder and/or withdrawal syndrome, tinnitus, depression, autism, dementia, Alzheimer's disease, seizures, neuralgia, drug withdrawal symptom, major depressive disorder and mania.

The treating method provided herein comprises a step of administration of a therapeutically effective amount of the compound of the present invention to a subject. In an embodiment, the present invention provides a method for treating a central nervous system disease and/or psychiatric disease in a mammal. The method comprises a step of administration of a therapeutically effective amount of the compound or the pharmaceutically acceptable salt, ester, prodrug, solvate, hydrate or derivative thereof according to the present invention to the mammal.

The compound or pharmaceutical composition thereof according to the present invention not only has a potent D3 receptor agonistic activity, but also has significantly better inhibitory activity on 5-HT2A than Cariprazine, and is expected to have a good clinical efficacy in treating negative symptoms of schizophrenia and significant reduction of the risk of EPS side effects.

Definitions

Unless otherwise stated, the terms used in the specification and claims have the meanings described below.

The term "alkyl" refers to a saturated aliphatic hydrocarbon group, which is a straight or branched chain group comprising 1 to 20 carbon atoms, preferably an alkyl having 1 to 8 carbon atoms, more preferably an alkyl having 1 to 6 carbon atoms, and most preferably an alkyl having 1 to 3 carbon atoms. Non-limiting examples include methyl, ethyl, n-propyl, isopropyl, n-butyl, isobutyl, tert-butyl, sec-butyl, n-pentyl, 1,1-dimethylpropyl, 1,2-dimethylpropyl, 2,2-dimethylpropyl, 1-ethylpropyl, 2-methylbutyl, 3-methylbutyl, n-hexyl, 1-ethyl-2-methylpropyl, 1,1,2-trimethylpropyl, 1,1-dimethylbutyl, 1,2-dimethylbutyl, 2,2-dimethylbutyl, 1,3-dimethylbutyl, 2-ethylbutyl, 2-methylpentyl, 3-methylpentyl, 4-methylpentyl, 2,3-dimethylbutyl, n-heptyl, 2-methylhexyl, 3-methylhexyl, 4-methylhexyl, 5-methylhexyl, 2,3-dimethylpentyl, 2,4-dimethylpentyl, 2,2-dimethylpentyl, 3,3-dimethylpentyl, 2-ethylpentyl, 3-ethylpentyl, n-octyl, 2,3-dimethylhexyl, 2,4-dimethylhexyl, 2,5-dimethylhexyl, 2,2-dimethylhexyl, 3,3-dimethylhexyl, 4,4-dimethylhexyl, 2-ethylhexyl, 3-ethylhexyl, 4-ethylhexyl, 2-methyl-2-ethylpentyl, 2-methyl-3-ethylpentyl, n-nonyl, 2-methyl-2-ethylhexyl, 2-methyl-3-ethylhexyl, 2,2-diethylpentyl, n-decyl, 3,3-diethylhexyl, 2,2-diethylhexyl, and various branched isomers thereof. More preferably, the alkyl group is a lower alkyl having 1 to 6 carbon atoms, and non-limiting examples include methyl, ethyl, n-propyl, isopropyl, n-butyl, isobutyl, tert-butyl, sec-butyl, n-pentyl, 1,1-dimethylpropyl, 1,2-dimethylpropyl, 2,2-dimethylpropyl, 1-ethylpropyl, 2-methylbutyl, 3-methylbutyl, n-hexyl, 1-ethyl-2-methylpropyl, 1,1,2-trimethylpropyl, 1,1-dimethylbutyl, 1,2-dimethylbutyl, 2,2-dimethylbutyl, 1,3-dimethylbutyl, 2-ethylbutyl, 2-methylpentyl, 3-methylpentyl, 4-methylpentyl, 2,3-dimethylbutyl and the like. The alkyl group can be substituted or unsubstituted. When substituted, the substituent group(s) can be substituted at any available connection point. The substituent group(s) is preferably one or more group(s) independently selected from the group consisting of alkyl, alkenyl, alkynyl, alkoxy, alkylthio, alkylamino, halogen, thiol, hydroxy, nitro, cyano, cycloalkyl, heterocyclyl, aryl, heteroaryl, cycloalkoxy, heterocycloalkoxy, cycloalkylthio, heterocyclylthio, oxo, carboxy and alkoxycarbonyl. The alkyl of the present invention is preferably selected from the group consisting of methyl, ethyl, isopropyl, tert-butyl, haloalkyl, deuterated alkyl, alkoxy-substituted alkyl and hydroxy-substituted alkyl.

The term "alkylene" refers to an alkyl of which a hydrogen atom is further substituted, for example, "methylene" refers to —$CH_2$—, "ethylene" refers to —$(CH_2)_2$—, "propylene" refers to —$(CH_2)_3$—, "butylene" refers to —$(CH_2)_4$— and the like. The term "alkenyl" refers to an alkyl as defined above that consists of at least two carbon atoms and at least one carbon-carbon double bond, for example, ethenyl, 1-propenyl, 2-propenyl, 1-, 2- or 3-butenyl and the like. The alkenyl group can be substituted or unsubstituted. When substituted, the substituent group(s) is preferably one or more groups independently selected from the group consisting of alkyl, alkenyl, alkynyl, alkoxy, alkylthio, alkylamino, halogen, thiol, hydroxy, nitro, cyano, cycloalkyl, heterocyclyl, aryl, heteroaryl, cycloalkoxy, heterocycloalkoxy, cycloalkylthio and heterocyclylthio.

The term "cycloalkyl" refers to a saturated or partially unsaturated monocyclic or polycyclic hydrocarbon substituent group having 3 to 20 carbon atoms, preferably 3 to 12 carbon atoms, more preferably 3 to 8 carbon atoms, and most preferably 3 to 6 carbon atoms. Non-limiting examples of monocyclic cycloalkyl include cyclopropyl, cyclobutyl, cyclopentyl, cyclopentenyl, cyclohexyl, cyclohexenyl, cyclohexadienyl, cycloheptyl, cycloheptatrienyl, cyclooctyl and the like. Polycyclic cycloalkyl includes a cycloalkyl having a spiro ring, fused ring or bridged ring. The cycloalkyl is preferably cyclopropyl, cyclobutyl, cyclohexyl, cyclopentyl and cycloheptyl, and more preferably cyclopropyl, cyclobutyl and cyclohexyl.

The term "spiro cycloalkyl" refers to a 5 to 20 membered polycyclic group with individual rings connected through one shared carbon atom (called a spiro atom), wherein the rings can contain one or more double bonds, but none of the rings has a completely conjugated 7-electron system. The spiro cycloalkyl is preferably a 6 to 14 membered spiro cycloalkyl, and more preferably a 7 to 10 membered spiro cycloalkyl. According to the number of the spiro atoms shared between the rings, the spiro cycloalkyl can be divided into a mono-spiro cycloalkyl, a di-spiro cycloalkyl, or a poly-spiro cycloalkyl, and the spiro cycloalkyl is preferably a mono-spiro cycloalkyl or di-spiro cycloalkyl, and more preferably a 4-membered/4-membered, 4-membered/5-membered, 4-membered/6-membered, 5-membered/5-membered, or 5-membered/6-membered mono-spiro cycloalkyl. Non-limiting examples of spiro cycloalkyl include:

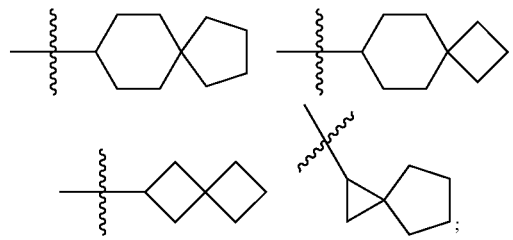

and also include spiro cycloalkyl in which a cycloalkyl and a heterocyclyl are connected through one spiro atom, non-limiting examples thereof include:

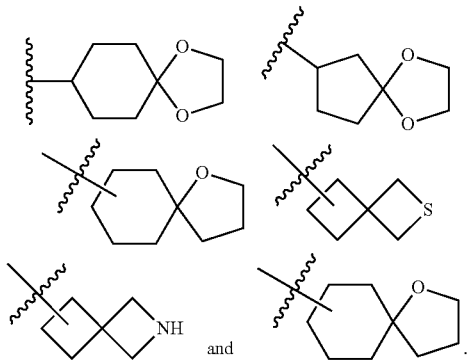

The term "fused cycloalkyl" refers to a 5 to 20 membered all-carbon polycyclic group, wherein each ring in the system shares an adjacent pair of carbon atoms with another ring, one or more rings can contain one or more double bonds, but none of the rings has a completely conjugated π-electron system. The fused cycloalkyl is preferably a 6 to 14 membered fused cycloalkyl, and more preferably a 7 to 10 membered fused cycloalkyl. According to the number of membered rings, the fused cycloalkyl can be divided into a bicyclic, tricyclic, tetracyclic or polycyclic fused cycloalkyl, and the fused cycloalkyl is preferably a bicyclic or tricyclic fused cycloalkyl, and more preferably a 4-membered/4-membered, 5-membered/5-membered or 5-membered/6-membered bicyclic fused cycloalkyl. Non-limiting examples of fused cycloalkyl include:

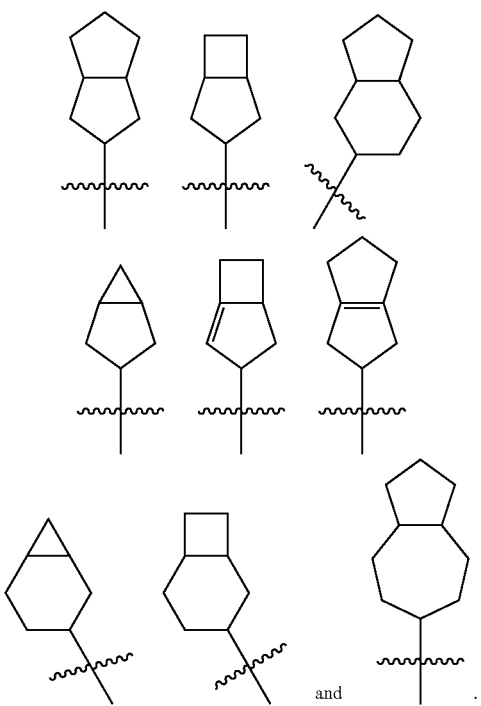

The term "bridged cycloalkyl" refers to a 5 to 20 membered all-carbon polycyclic group, wherein every two rings in the system share two disconnected carbon atoms, the rings can have one or more double bonds, but none of the rings has a completely conjugated π-electron system. The bridged cycloalkyl is preferably a 6 to 14 membered bridged cycloalkyl, and more preferably a 7 to 10 membered bridged cycloalkyl. According to the number of membered rings, the bridged cycloalkyl can be divided into a bicyclic, tricyclic, tetracyclic or polycyclic bridged cycloalkyl, and the bridged cycloalkyl is preferably a bicyclic, tricyclic or tetracyclic bridged cycloalkyl, and more preferably a bicyclic or tricyclic bridged cycloalkyl. Non-limiting examples of bridged cycloalkyl include:

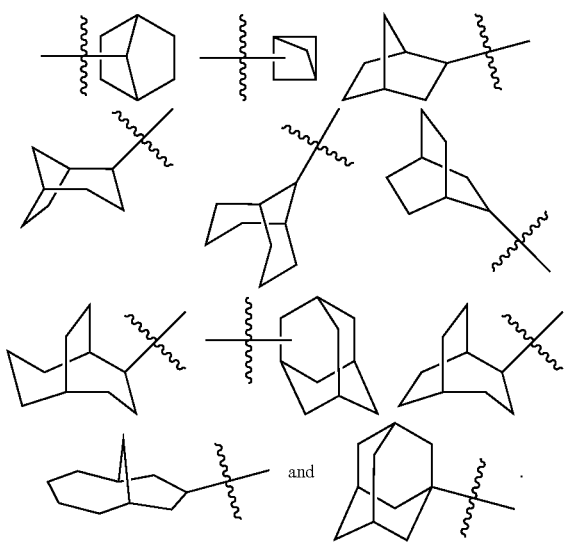

The cycloalkyl ring can be fused to the ring of aryl, heteroaryl or heterocyclyl, wherein the ring bound to the parent structure is cycloalkyl. Non-limiting examples include indanyl, tetrahydronaphthyl, benzocycloheptyl and the like. The cycloalkyl can be optionally substituted or unsubstituted. When substituted, the substituent group(s) is preferably one or more group(s) independently selected from the group consisting of alkyl, alkenyl, alkynyl, alkoxy, alkylthio, alkylamino, halogen, thiol, hydroxy, nitro, cyano, cycloalkyl, heterocyclyl, aryl, heteroaryl, cycloalkoxy, heterocycloalkoxy, cycloalkylthio, heterocyclylthio, oxo, carboxy and alkoxycarbonyl.

The term "heterocyclyl" refers to a 3 to 20 membered saturated or partially unsaturated monocyclic or polycyclic hydrocarbon group, wherein one or more ring atoms are heteroatoms selected from the group consisting of nitrogen, oxygen, boron, phosphorus, $S(O)_m$ (wherein m is an integer of 0 to 2) and $P(O)_n$ (wherein n is an integer of 0 to 2), but excluding —O—O—, —O—S— or —S—S— in the ring, with the remaining ring atoms being carbon atoms. Preferably, the heterocyclyl has 3 to 12 ring atoms wherein 1 to 4 atoms are heteroatoms; more preferably, 3 to 8 ring atoms; and most preferably 3 to 8 ring atoms. Non-limiting examples of monocyclic heterocyclyl include oxatanyl, oxatanyl, pyrrolidinyl, oxazolidin-2-one group, azepinyl, imidazolidinyl, tetrahydrofuranyl, tetrahydrothienyl, dihydroimidazolyl, dihydrofuranyl, dihydropyrazolyl, dihydropyrrolyl, piperidinyl, piperazinyl, morpholinyl, thiomorpholinyl, homopiperazinyl, pyranyl and the like, preferably oxatanyl, tetrahydrofuranyl, pyrrolidinyl, pyrazolidinyl, piperazinyl, oxazolidin-2-one group, morpholinyl, piperazinyl and azepinyl, and more preferably oxatanyl, pyrrolidinyl, piperidinyl, piperazinyl, azepinyl and oxazolidin-2-one group. Polycyclic heterocyclyl includes a heterocyclyl having a spiro ring, fused ring or bridged ring. The heterocyclyl having a spiro ring, fused ring or bridged ring is optionally bonded to other group via a single bond, or further bonded to other cycloalkyl, heterocyclyl, aryl and heteroaryl via any two or more atoms on the ring.

The term "spiro heterocyclyl" refers to a 3 to 20 membered polycyclic heterocyclyl group with individual rings connected through one shared atom (called a spiro atom), wherein one or more ring atoms are heteroatoms selected from the group consisting of nitrogen, oxygen, boron, phosphorus, $S(O)_m$ (wherein m is an integer of 0 to 2) and $P(O)_n$ (wherein n is an integer of 0 to 2), with the remaining ring atoms being carbon atoms, and the rings can contain one or more double bonds, but none of the rings has a completely conjugated π-electron system. The spiro heterocyclyl is preferably a 6 to 14 membered spiro heterocyclyl, and more preferably a 7 to 10 membered spiro heterocyclyl. According to the number of the spiro atoms shared between the rings, the spiro heterocyclyl can be divided into a mono-spiro heterocyclyl, di-spiro heterocyclyl, or poly-spiro heterocyclyl, and the spiro heterocyclyl is preferably a mono-spiro heterocyclyl or di-spiro heterocyclyl, and more preferably a 3-membered/5-membered, 4-membered/5-membered, 4-membered/6-membered, 5-membered/5-membered, or 5-membered/6-membered mono-spiro heterocyclyl. Non-limiting examples of spiro heterocyclyl include:

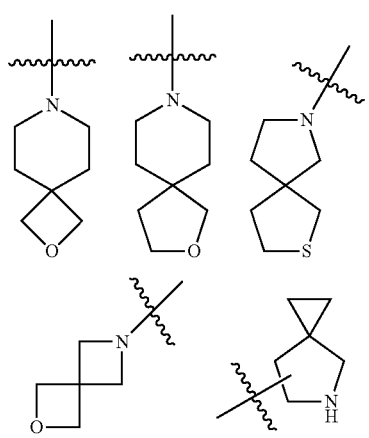

and the like.

The term "fused heterocyclyl" refers to a 5 to 20 membered polycyclic heterocyclyl group, wherein each ring in the system shares an adjacent pair of atoms with another ring, one or more rings can contain one or more double bonds, but none of the rings has a completely conjugated π-electron system, and one or more ring atoms are heteroatoms selected from the group consisting of nitrogen, oxygen and $S(O)_m$ (wherein m is an integer of 0 to 2), with the remaining ring atoms being carbon atoms. The fused heterocyclyl is preferably a 6 to 14 membered fused heterocyclyl, and more preferably a 7 to 10 membered fused heterocyclyl. According to the number of membered rings, the fused heterocyclyl can be divided into a bicyclic, tricyclic, tetracyclic or polycyclic fused heterocyclyl, and preferably a bicyclic or tricyclic fused heterocyclyl, and more preferably a 3-membered/5-membered, 4-membered/5-membered or 5-membered/6-membered bicyclic fused heterocyclyl. Non-limiting examples of fused heterocyclyl include:

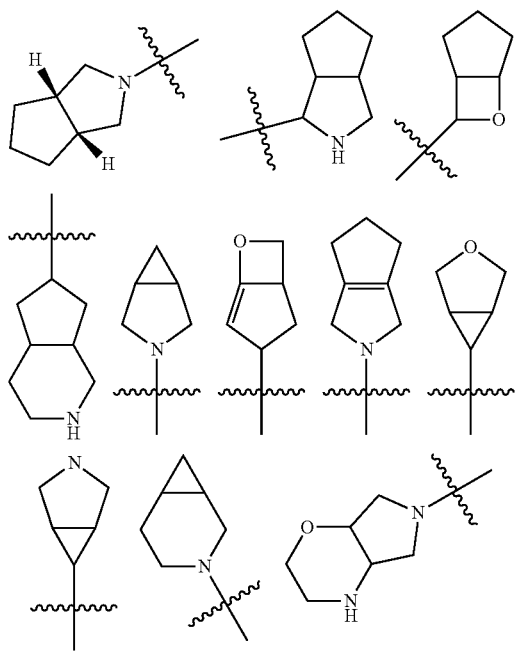

-continued

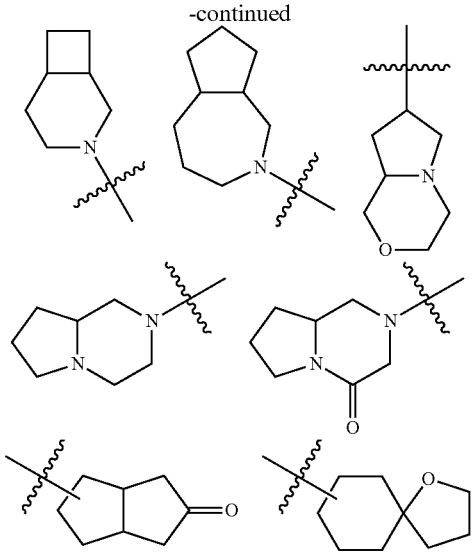

and the like.

The term "bridged heterocyclyl" refers to a 5 to 14 membered polycyclic heterocyclyl group, wherein every two rings in the system share two disconnected atoms, wherein the rings can have one or more double bond(s), but none of the rings has a completely conjugated π-electron system, and one or more ring atoms are heteroatoms selected from the group consisting of nitrogen, oxygen and $S(O)_m$ (wherein m is an integer of 0 to 2), with the remaining ring atoms being carbon atoms. The bridged heterocyclyl is preferably a 6 to 14 membered bridged heterocyclyl, and more preferably a 7 to 10 membered bridged heterocyclyl. According to the number of membered rings, the bridged heterocyclyl can be divided into a bicyclic, tricyclic, tetracyclic or polycyclic bridged heterocyclyl, and the bridged heterocyclyl is preferably a bicyclic, tricyclic or tetracyclic bridged heterocyclyl, and more preferably a bicyclic or tricyclic bridged heterocyclyl. Non-limiting examples of bridged heterocyclyl include:

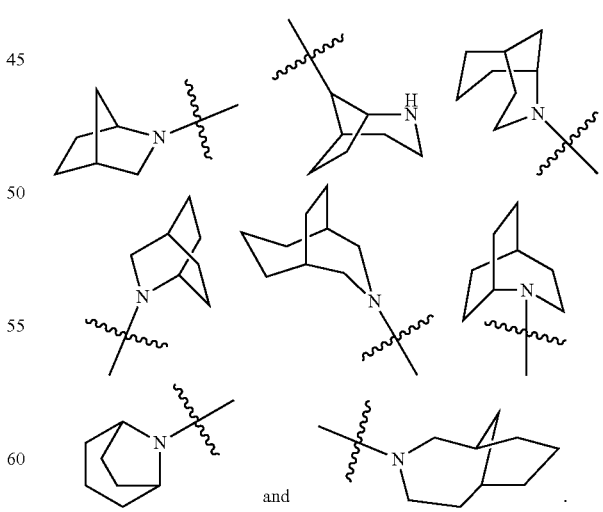

The heterocyclyl ring can be fused to the ring of aryl, heteroaryl or cycloalkyl, wherein the ring bound to the parent structure is heterocyclyl. Non-limiting examples include:

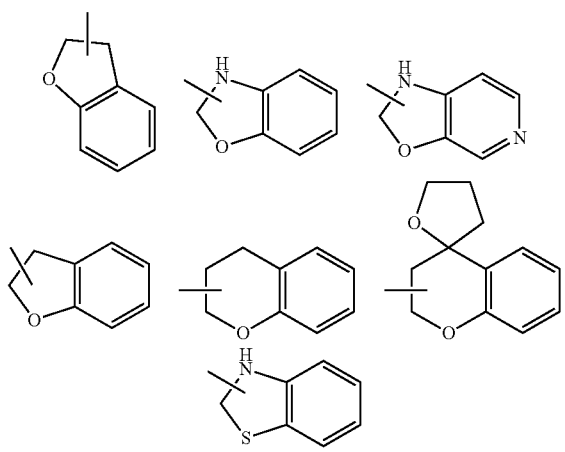

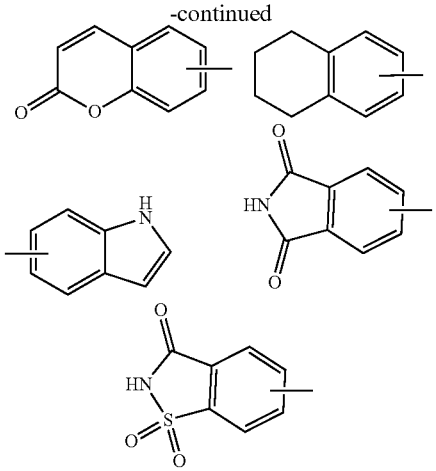

and the like.

The heterocyclyl can be optionally substituted or unsubstituted. When substituted, the substituent group(s) is preferably one or more group(s) independently selected from the group consisting of alkyl, alkenyl, alkynyl, alkoxy, alkylthio, alkylamino, halogen, thiol, hydroxy, nitro, cyano, cycloalkyl, heterocyclyl, aryl, heteroaryl, cycloalkoxy, heterocycloalkoxy, cycloalkylthio, heterocyclylthio, oxo, carboxy and alkoxycarbonyl.

The term "aryl" refers to a 6 to 14 membered all-carbon monocyclic ring or polycyclic fused ring (i.e. each ring in the system shares an adjacent pair of carbon atoms with another ring in the system) having a conjugated π-electron system, preferably a 6 to 10 membered aryl, for example, phenyl and naphthyl. The aryl is more preferably phenyl. The aryl ring can be fused to the ring of heteroaryl, heterocyclyl or cycloalkyl, wherein the ring bound to the parent structure is aryl ring. Non-limiting examples thereof include:

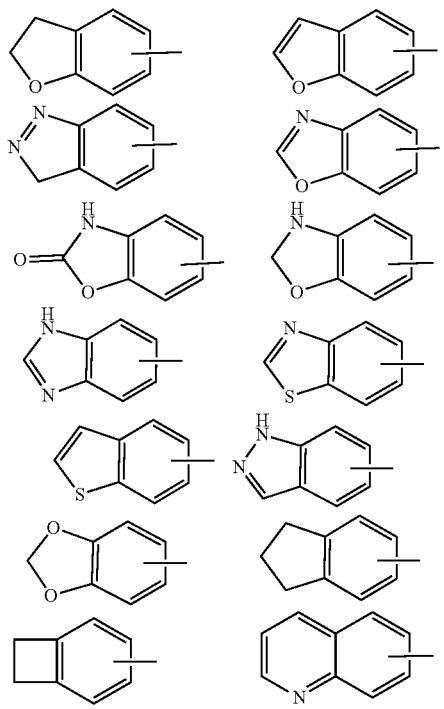

The aryl can be substituted or unsubstituted. When substituted, the substituent group(s) is preferably one or more group(s) independently selected from the group consisting of alkyl, alkenyl, alkynyl, alkoxy, alkylthio, alkylamino, halogen, thiol, hydroxy, nitro, cyano, cycloalkyl, heterocyclyl, aryl, heteroaryl, cycloalkoxy, heterocycloalkoxy, cycloalkylthio, heterocyclylthio, carboxy and alkoxycarbonyl.

The term "heteroaryl" refers to a 5 to 14 membered heteroaromatic system having 1 to 4 heteroatoms selected from the group consisting of oxygen, sulfur and nitrogen. The heteroaryl is preferably a 5 to 10 membered heteroaryl, and more preferably a 5 or 6 membered heteroaryl, for example imidazolyl, furanyl, thienyl, thiazolyl, pyrazolyl, oxazolyl, pyrrolyl, triazolyl, tetrazolyl, pyridyl, pyrimidinyl, thiadiazolyl, isoxazolyl, oxadiazolyl, pyrazinyl and the like, preferably pyridyl, oxazolyl, isoxazolyl, oxadiazolyl, tetrazolyl, triazolyl, thienyl, imidazolyl, pyrazolyl, pyrimidinyl and thiazolyl, and more preferably pyrazolyl, furanyl, pyridyl, oxazolyl, isoxazole, furanyl and pyrimidinyl. The heteroaryl ring can be fused to the ring of aryl, heterocyclyl or cycloalkyl, wherein the ring bound to the parent structure is heteroaryl ring. Non-limiting examples thereof include:

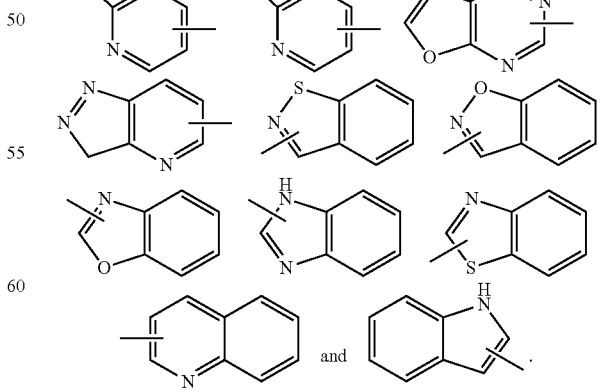

The heteroaryl can be optionally substituted or unsubstituted. When substituted, the substituent group(s) is preferably one or more group(s) independently selected from the group consisting of alkyl, alkenyl, alkynyl, alkoxy, alkylthio, alkylamino, halogen, thiol, hydroxy, nitro, cyano, cycloalkyl, heterocyclyl, aryl, heteroaryl, cycloalkoxy, heterocycloalkoxy, cycloalkylthio, heterocyclylthio, carboxy and alkoxycarbonyl.

The term "alkoxy" refers to an —O-(alkyl) or an —O-(unsubstituted cycloalkyl) group, wherein the alkyl is as defined above. Non-limiting examples of alkoxy include methoxy, ethoxy, propoxy, butoxy, cyclopropyloxy, cyclobutyloxy, cyclopentyloxy, cyclohexyloxy. The alkoxy can be optionally substituted or unsubstituted. When substituted, the substituent group(s) is preferably one or more group(s) independently selected from the group consisting of alkyl, alkenyl, alkynyl, alkoxy, alkylthio, alkylamino, halogen, thiol, hydroxy, nitro, cyano, cycloalkyl, heterocyclyl, aryl, heteroaryl, cycloalkoxy, heterocycloalkoxy, cycloalkylthio, heterocyclylthio, carboxy and alkoxycarbonyl.

"Haloalkyl" refers to an alkyl group substituted by one or more halogen(s), wherein the alkyl is as defined above.

"Haloalkoxy" refers to an alkoxy group substituted by one or more halogen(s), wherein the alkoxy is as defined above.

"Hydroxyalkyl" refers to an alkyl group substituted by hydroxy(s), wherein the alkyl is as defined above.

"Alkenyl" refers to a chain olefin, also known as alkene group. The alkenyl can be further substituted by other related group, for example alkyl, alkenyl, alkynyl, alkoxy, alkylthio, alkylamino, halogen, thiol, hydroxy, nitro, cyano, cycloalkyl, heterocyclyl, aryl, heteroaryl, cycloalkoxy, heterocycloalkoxy, cycloalkylthio, heterocyclylthio, carboxy or alkoxycarbonyl.

"Alkynyl" refers to (CH≡C—). The alkynyl can be further substituted by other related group, for example alkyl, alkenyl, alkynyl, alkoxy, alkylthio, alkylamino, halogen, thiol, hydroxy, nitro, cyano, cycloalkyl, heterocyclyl, aryl, heteroaryl, cycloalkoxy, heterocycloalkoxy, cycloalkylthio, heterocyclylthio, carboxy or alkoxycarbonyl.

"Hydroxy" refers to an —OH group.
"Halogen" refers to fluorine, chlorine, bromine or iodine.
"Amino" refers to a —NH$_2$ group.
"Cyano" refers to a —CN group.
"Nitro" refers to a —NO$_2$ group.
"Carboxy" refers to a —C(O)OH group.
"THF" refers to tetrahydrofuran.
"EtOAc" refers to ethyl acetate.
"MeOH" refers to methanol.
"DMF" refers to N,N-dimethylformamide.
"DIPEA" refers to diisopropylethylamine.
"TFA" refers to trifluoroacetic acid.
"MeCN" refers to acetonitrile.
"DMA" refers to N,N-dimethylacetamide.
"Et$_2$O" refers to diethyl ether.
"DCE" refers to 1,2-dichloroethane.
"DIPEA" refers to N,N-diisopropylethylamine.
"NBS" refers to N-bromosuccinimide.
"NIS" refers to N-iodosuccinimide.
"Cbz-Cl" refers to benzyl chloroformate.
"Pd$_2$(dba)$_3$" refers to tris(dibenzylideneacetone)dipalladium.
"Dppf" refers to 1,1'-bisdiphenylphosphinoferrocene.
"HATU" refers to 2-(7-azabenzotriazol-1-yl)-N,N,N',N'-tetramethyluronium hexafluorophosphate.
"KHMDS" refers to potassium hexamethyldisilazide.
"LiHMDS" refers to lithium bis(trimethylsilyl)amide.
"MeLi" refers to methyl lithium.
"n-BuLi" refers to n-butyl lithium.
"NaBH(OAc)$_3$" refers to sodium triacetoxyborohydride.

Different expressions such as "X is selected from the group consisting of A, B or C", "X is selected from the group consisting of A, B and C", "X is A, B or C", "X is A, B and C" are the same meaning, that is, X can be any one or more of A, B and C.

The hydrogen atom of the present invention can be replaced by its isotope deuterium. Any of the hydrogen atoms in the compounds of the examples of the present invention can also be substituted by deuterium atom.

"Optional" or "optionally" means that the event or circumstance described subsequently can, but need not, occur, and such a description includes the situation in which the event or circumstance does or does not occur. For example, "the heterocyclyl optionally substituted by an alkyl" means that an alkyl group can be, but need not be, present, and such a description includes the situation of the heterocyclyl being substituted by an alkyl and the heterocyclyl being not substituted by an alkyl.

"Substituted" refers to one or more hydrogen atoms in a group, preferably up to 5, and more preferably 1 to 3 hydrogen atoms, independently substituted by a corresponding number of substituents. It goes without saying that the substituents only exist in their possible chemical position. The person skilled in the art is able to determine whether the substitution is possible or impossible by experiments or theory without excessive efforts. For example, the combination of amino or hydroxy having free hydrogen and carbon atoms having unsaturated bonds (such as olefinic) may be unstable.

A "pharmaceutical composition" refers to a mixture of one or more of the compounds according to the present invention or physiologically/pharmaceutically acceptable salts or prodrugs thereof with other chemical components such as physiologically/pharmaceutically acceptable carriers and excipients. The purpose of the pharmaceutical composition is to facilitate administration of a compound to an organism, which is conducive to the absorption of the active ingredient so as to exert biological activity.

A "pharmaceutically acceptable salt" refers to a salt of the compound of the present invention, which is safe and effective in mammals and has the desired biological activity.

DETAILED DESCRIPTION OF THE INVENTION

The present invention will be further described with reference to the following examples, but the examples should not be considered as limiting the scope of the present invention.

EXAMPLES

The structures of the compounds of the present invention were identified by nuclear magnetic resonance (NMR) and/or liquid chromatography-mass spectrometry (LC-MS). NMR shifts (δ) are given in parts per million (ppm). NMR is determined by a Bruker AVANCE-400 instrument. The solvents for determination are deuterated-dimethyl sulfoxide (DMSO-d$_6$), deuterated-methanol (CD$_3$OD) and deuterated-chloroform (CDCl$_3$), and the internal standard is tetramethylsilane (TMS).

Liquid chromatography-mass spectrometry (LC-MS) is determined on an Agilent 1200 Infinity Series mass spectrometer. High performance liquid chromatography (HPLC) is determined on an Agilent 1200DAD high pressure liquid chromatograph (Sunfire C18 150×4.6 mm column), and a Waters 2695-2996 high pressure liquid chromatograph (Gimini C18 150×4.6 mm column).

Yantai Huanghai HSGF254 or Qingdao GF254 silica gel plate is used as the thin-layer silica gel chromatography (TLC) plate. The dimension of the silica gel plate used in TLC is 0.15 mm to 0.2 mm, and the dimension of the silica gel plate used in product purification is 0.4 mm to 0.5 mm. Yantai Huanghai 200 to 300 mesh silica gel is generally used as a carrier for column chromatography.

The raw materials used in the examples of the present invention are known and commercially available, or can be synthesized by or according to known methods in the art.

Unless otherwise stated, all reactions of the present invention are carried out under continuous magnetic stirring under a dry nitrogen or argon atmosphere. The solvent is dry, and the reaction temperature is in degrees celcius.

Example 1

N-(Trans-4-(2-(4-(2,3-dichlorophenyl)piperazin-1-yl)ethyl)cyclohexyl)-3,3-difluoroazetidine-1-carboxamide

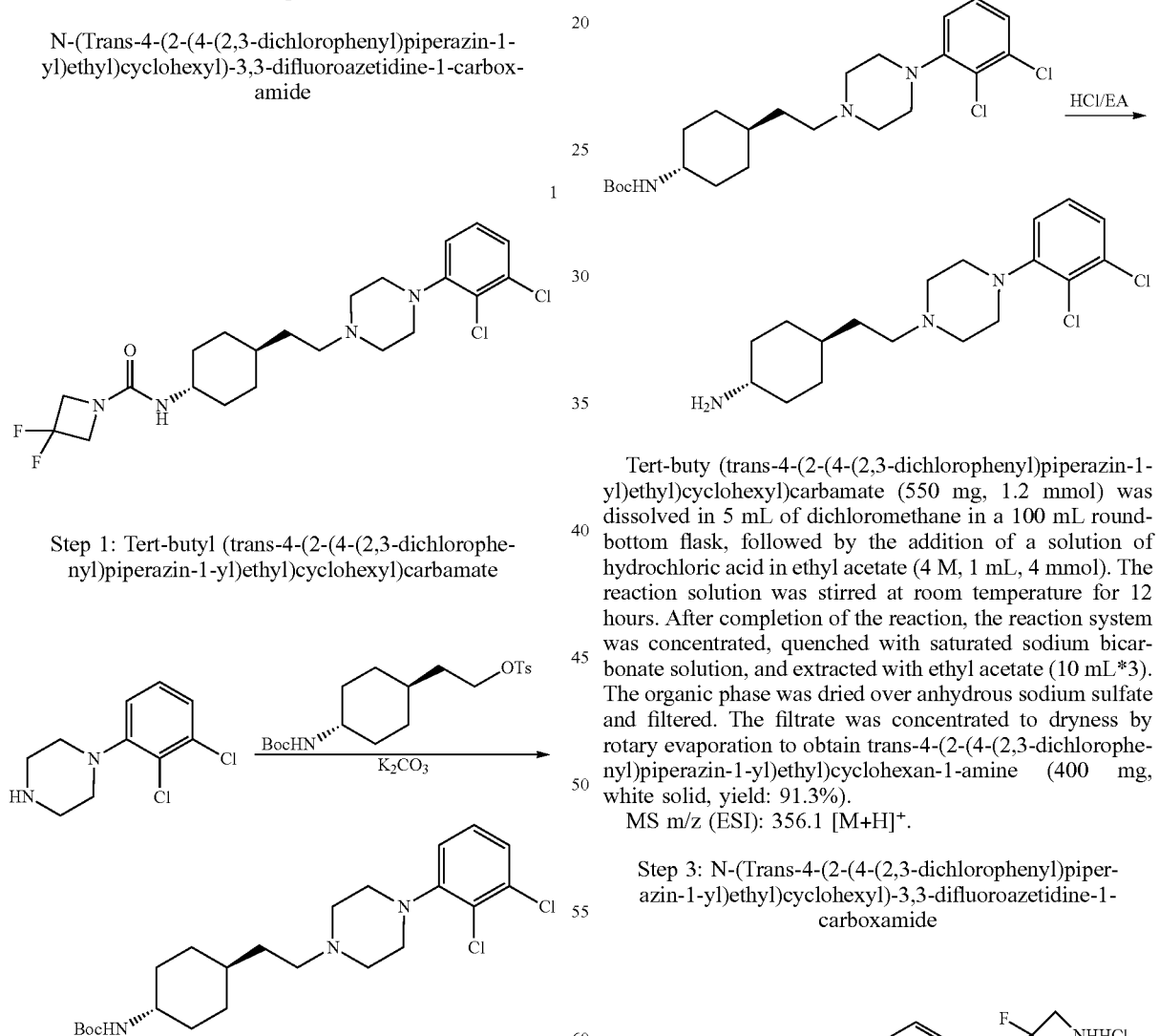

Step 1: Tert-butyl (trans-4-(2-(4-(2,3-dichlorophenyl)piperazin-1-yl)ethyl)cyclohexyl)carbamate

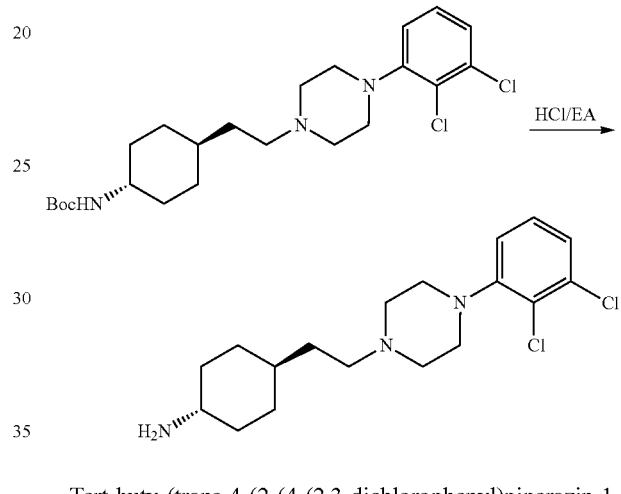

1-(2,3-Dichlorophenyl)piperazine (460 mg, 2 mmol) was dissolved in 10 mL of acetonitrile in a 100 mL round-bottom flask. 2-(Trans-4-((tert-butoxycarbonyl)amino)cyclohexyl) ethyl 4-methylbenzenesulfonate (794 mg, 2 mmol) and potassium carbonate (834 mg, 6 mmol) were added to the reaction system. The reaction solution was stirred at 80° C. for 12 hours. After completion of the reaction, the reaction system was cooled to room temperature, quenched with water, and extracted with ethyl acetate (10 mL*3). The organic phase was washed with water and saturated brine, dried over anhydrous sodium sulfate, and filtered. The filtrate was concentrated to dryness by rotary evaporation. The resulting crude product was purified by column chromatography (eluted with petroleum ether/ethyl acetate=1/1) to obtain tert-butyl (trans-4-(2-(4-(2,3-dichlorophenyl)piperazin-1-yl)ethyl)cyclohexyl)carbamate (550 mg, white solid, yield: 60.5%).

MS m/z (ESI): 456.2 [M+H]$^+$.

Step 2: Trans-4-(2-(4-(2,3-dichlorophenyl)piperazin-1-yl)ethyl)cyclohexan-1-amine Tert-buty (trans-4-(2-(4-(2,3-dichlorophenyl)piperazin-1-yl)ethyl)cyclohexyl)carbamate (550 mg, 1.2 mmol) was dissolved in 5 mL of dichloromethane in a 100 mL round-bottom flask, followed by the addition of a solution of hydrochloric acid in ethyl acetate (4 M, 1 mL, 4 mmol). The reaction solution was stirred at room temperature for 12 hours. After completion of the reaction, the reaction system was concentrated, quenched with saturated sodium bicarbonate solution, and extracted with ethyl acetate (10 mL*3). The organic phase was dried over anhydrous sodium sulfate and filtered. The filtrate was concentrated to dryness by rotary evaporation to obtain trans-4-(2-(4-(2,3-dichlorophenyl)piperazin-1-yl)ethyl)cyclohexan-1-amine (400 mg, white solid, yield: 91.3%).

MS m/z (ESI): 356.1 [M+H]$^+$.

Step 3: N-(Trans-4-(2-(4-(2,3-dichlorophenyl)piperazin-1-yl)ethyl)cyclohexyl)-3,3-difluoroazetidine-1-carboxamide

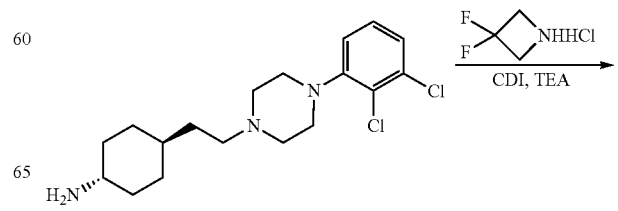

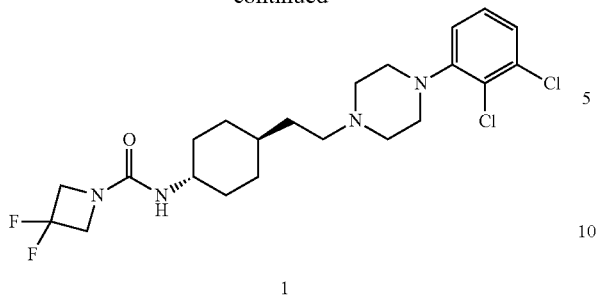

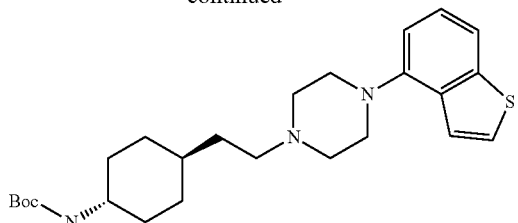

Trans-4-(2-(4-(2,3-dichlorophenyl)piperazin-1-yl)ethyl)cyclohexan-1-amine (80 mg, 0.22 mmol) was dissolved in 3 mL of dichloromethane. Triethylamine (67 mg, 0.66 mmol), N,N'-carbonyldiimidazole (43 mg, 0.27 mmol) were added, and the reaction solution was stirred at room temperature for 3 hours. 3,3-Difluoroazetidine hydrochloride (42 mg, 0.34 mmol) was added, and the reaction solution was reacted at room temperature for 12 hours. The reaction solution was washed with water three times (2 mL*3). The organic phase was concentrated and purified by prep-HPLC to obtain the product N-(trans-4-(2-(4-(2,3-dichlorophenyl)piperazin-1-yl)ethyl)cyclohexyl)-3,3-difluoroazetidine-1-carboxamide (69 mg, white solid, yield: 64.6%).

MS m/z (ESI): 475.1 [M+H]$^+$.

$^1$H NMR (400 MHz, Chloroform-d) δ 7.19-7.11 (m, 2H), 7.00-6.94 (m, 1H), 4.24 (t, J=12.1 Hz, 4H), 3.98 (d, J=8.1 Hz, 1H), 3.63-3.50 (m, 1H), 3.24-3.03 (m, 4H), 2.85-2.61 (m, 4H), 2.56-2.43 (m, 2H), 2.08-1.95 (m, 2H), 1.84-1.75 (m, 2H), 1.56-1.43 (m, 2H), 1.28-1.22 (m, 1H), 1.16-1.01 (m, 4H).

Example 2

N-(Trans-4-(2-(4-(benzo[b]thiophen-4-yl)piperazin-1-yl)ethyl)cyclohexyl)-3,3-difluoro azetidine-1-carboxamide 1-(Benzo[b]thiophen-4-yl)piperazine (440 mg, 2 mmol) was dissolved in 10 mL of acetonitrile in a 100 mL round-bottom flask. 2-(Trans-4-((tert-butoxycarbonyl)amino)cyclohexyl)ethyl 4-methylbenzenesulfonate (794 mg, 2 mmol) and potassium carbonate (834 mg, 6 mmol) were added to the reaction system. The reaction solution was stirred at 80° C. for 12 hours. After completion of the reaction, the reaction system was cooled to room temperature, quenched with water, and extracted with ethyl acetate (10 mL*3). The organic phase was washed with water and saturated brine, dried over anhydrous sodium sulfate, and filtered. The filtrate was concentrated to dryness by rotary evaporation. The resulting crude product was purified by column chromatography (eluted with petroleum ether/ethyl acetate=1/1) to obtain tert-butyl (trans-4-(2-(4-(benzo[b]thiophen-4-yl)piperazin-1-yl)ethyl)cyclohexyl)carbamate (500 mg, white solid, yield: 55.9%).

MS m/z (ESI): 444.2 [M+H]$^+$.

$^1$H NMR (400 MHz, Chloroform-d) δ 7.55 (d, J=8.0 Hz, 1H), 7.41-7.37 (m, 1H), 7.30-7.25 (m, 2H), 6.90 (d, J=7.6 Hz, 1H), 4.44-4.24 (m, 1H), 3.46-3.31 (m, 1H), 3.29-3.19 (m, 4H), 2.95-2.63 (m, 4H), 2.61-2.42 (m, 2H), 2.09-1.94 (m, 2H), 1.87-1.72 (m, 2H), 1.58-1.49 (m, 2H), 1.44 (s, 9H), 1.30-1.20 (m, 1H), 1.16-0.98 (m, 4H).

Step 2: Trans-4-(2-(4-(benzo[b]thiophen-4-yl)piperazin-1-yl)ethyl)cyclohexan-1-amine

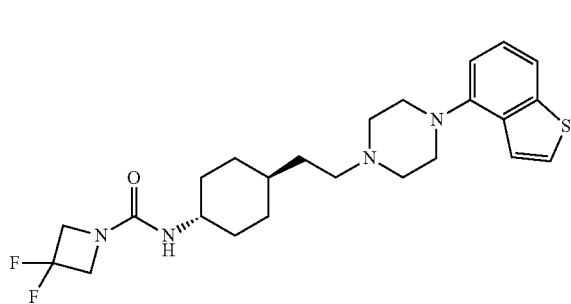 [SMILES: O=C(N[C@H]1CC[C@H](CCN2CCN(c3cccc4sccc34)CC2)CC1)N1CC(F)(F)C1]

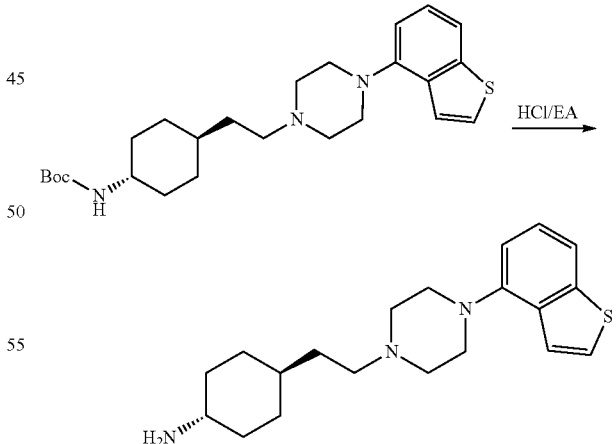

Step 1: Tert-butyl (trans-4-(2-(4-(benzo[b]thiophen-4-yl)piperazin-1-yl)ethyl)cyclohexyl)carbamate

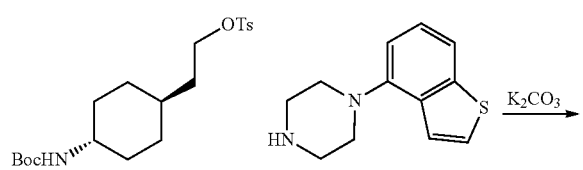

Tert-butyl (trans-4-(2-(4-(benzo[b]thiophen-4-yl)piperazin-1-yl)ethyl)cyclohexyl)carbamate (500 mg, 1.13 mmol) was dissolved in 5 mL of dichloromethane in a 100 mL round-bottom flask, followed by the addition of a solution of hydrochloric acid in ethyl acetate (4 M, 1 mL, 4 mmol). The reaction solution was stirred at room temperature for 12 hours. After completion of the reaction, the reaction system Step 3: N-(Trans-4-(2-(4-(benzo[b]thiophen-4-yl)piperazin-1-yl)ethyl)cyclohexyl)-3,3-difluoro azetidine-1-carboxamide

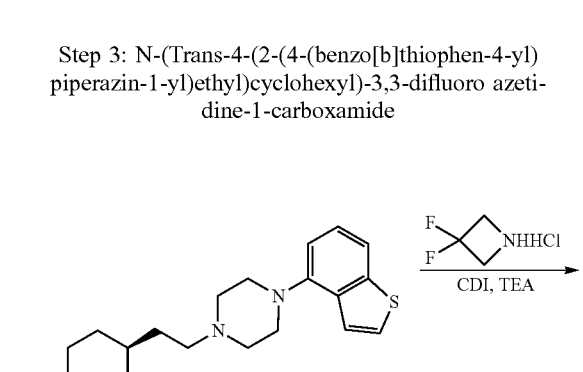

Example 3

N-(Trans-4-(2-(4-(benzo[b]thiophen-4-yl)piperazin-1-yl)ethyl)cyclohexyl)-3-hydroxy-3-methylazetidine-1-carboxamide

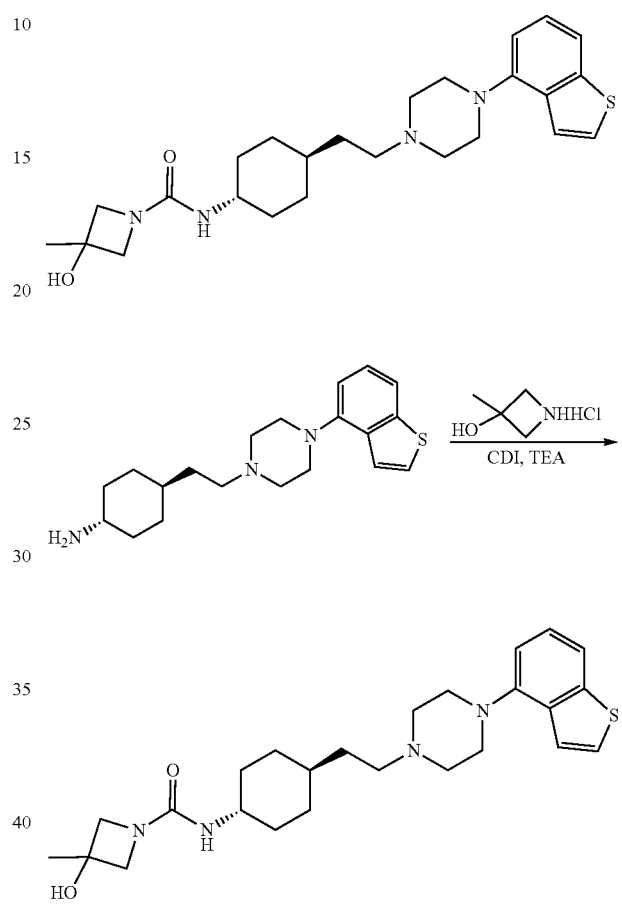

Trans-4-(2-(4-(benzo[b]thiophen-4-yl)piperazin-1-yl) ethyl)cyclohexan-1-amine (50 mg, 0.15 mmol) was dissolved in 3 mL of dichloromethane. Triethylamine (45 mg, 0.45 mmol), N,N'-carbonyldiimidazole (28 mg, 0.17 mmol) were added, and the reaction solution was stirred at room temperature for 3 hours. 3,3-Difluoroazetidine hydrochloride (28 mg, 0.22 mmol) was added, and the reaction solution was reacted at room temperature for 12 hours. The reaction solution was washed with water three times (2 mL*3). The organic phase was concentrated and purified by prep-HPLC to obtain the product N-(trans-4-(2-(4-(benzo[b]thiophen-4-yl)piperazin-1-yl)ethyl)cyclohexyl)-3,3-difluoroazetidine-1-carboxamide (22 mg, white solid, yield: 32.1%).

MS m/z (ESI): 463.2 [M+H]$^+$.

$^1$H NMR (400 MHz, Chloroform-d) δ 7.56 (d, J=8.0 Hz, 1H), 7.45-7.36 (m, 2H), 7.31-7.26 (m, 1H), 6.91 (d, J=7.6 Hz, 1H), 4.24 (t, J=12.1 Hz, 4H), 3.99 (d, J=8.1 Hz, 1H), 3.64-3.51 (m, 1H), 3.37-3.14 (m, 4H), 2.94-2.67 (m, 4H), 2.64-2.51 (m, 2H), 2.08-1.96 (m, 2H), 1.89-1.76 (m, 2H), 1.59-1.48 (m, 2H), 1.29-1.23 (m, 1H), 1.19-1.04 (m, 4H).

Trans-4-(2-(4-(benzo[b]thiophen-4-yl)piperazin-1-yl) ethyl)cyclohexan-1-amine (50 mg, 0.15 mmol) was dissolved in 3 mL of dichloromethane. Triethylamine (45 mg, 0.45 mmol), N,N'-carbonyldiimidazole (28 mg, 0.17 mmol) were added, and the reaction solution was stirred at room temperature for 3 hours. 3-Methylazetidin-3-ol hydrochloride (27 mg, 0.22 mmol) was added, and the reaction solution was reacted at room temperature for 12 hours. The reaction solution was washed with water three times (2 mL*3). The organic phase was concentrated and purified by prep-HPLC to obtain the product N-(trans-4-(2-(4-(benzo[b]thiophen-4-yl)piperazin-1-yl)ethyl)cyclohexyl)-3-hydroxy-3-methylazetidine-1-carboxamide (23.5 mg, white solid, yield: 35.3%).

MS m/z (ESI): 457.3 [M+H]$^+$.

$^1$H NMR (400 MHz, Chloroform-d) δ 7.55 (d, J=8.0 Hz, 1H), 7.44-7.35 (m, 2H), 7.32-7.26 (m, 1H), 6.90 (d, J=7.6 Hz, 1H), 3.93-3.76 (m, 5H), 3.63-3.49 (m, 1H), 3.32-3.13 (m, 4H), 3.00-2.87 (m, 1H), 2.83-2.64 (m, 4H), 2.57-2.44 (m, 2H), 2.05-1.93 (m, 3H), 1.87-1.73 (m, 2H), 1.53 (s, 3H), 1.52-1.43 (m, 2H), 1.16-1.00 (m, 4H).

Example 4

N-(Trans-4-(2-(4-(benzo[b]thiophen-4-yl)piperazin-1-yl)ethyl)cyclohexyl)-3-methoxy-3-methylazetidine-1-carboxamide

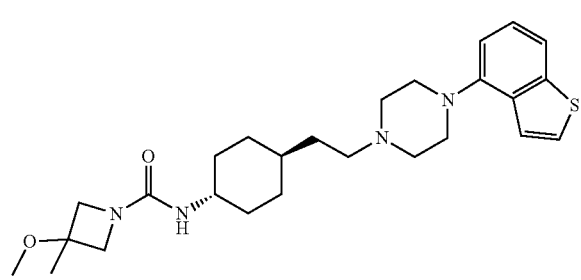

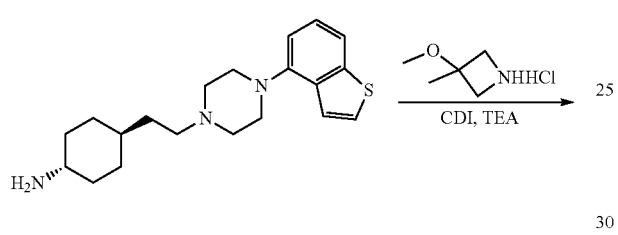

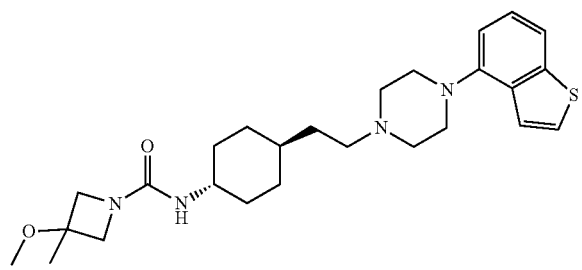

Trans-4-(2-(4-(benzo[b]thiophen-4-yl)piperazin-1-yl)ethyl)cyclohexan-1-amine (50 mg, 0.15 mmol) was dissolved in 3 mL of dichloromethane. Triethylamine (45 mg, 0.45 mmol), N,N'-carbonyldiimidazole (28 mg, 0.17 mmol) were added, and the reaction solution was stirred at room temperature for 3 hours. 3-Methoxy-3-methylazetidine hydrochloride (30 mg, 0.22 mmol) was added, and the reaction solution was reacted at room temperature for 12 hours. The reaction solution was washed with water three times (2 mL*3). The organic phase was concentrated and purified by prep-HPLC to obtain the product N-(trans-4-(2-(4-(benzo[b]thiophen-4-yl)piperazin-1-yl)ethyl)cyclohexyl)-3-methoxy-3-methylazetidine-1-carboxamide (22 mg, white solid, yield: 32.1%).

MS m/z (ESI): 471.2 [M+H]$^+$.

$^1$H NMR (400 MHz, Chloroform-d) δ 7.55 (d, J=8.0 Hz, 1H), 7.44-7.35 (m, 2H), 7.29-7.23 (m, 1H), 6.90 (d, J=7.4 Hz, 1H), 3.88 (dd, J=11.6, 8.0 Hz, 3H), 3.65 (d, J=8.0 Hz, 2H), 3.61-3.51 (m, 1H), 3.33-3.13 (m, 7H), 2.86-2.63 (m, 4H), 2.55-2.42 (m, 2H), 2.07-1.94 (m, 2H), 1.85-1.75 (m, 2H), 1.56-1.42 (m, 5H), 1.30-1.19 (m, 1H), 1.19-0.99 (m, 4H).

Example 5

3-(Trans-4-(2-(4-(benzo[d]isothiazol-3-yl)piperazin-1-yl)ethyl)cyclohexyl)-1,1-bis(fluoromethyl)urea

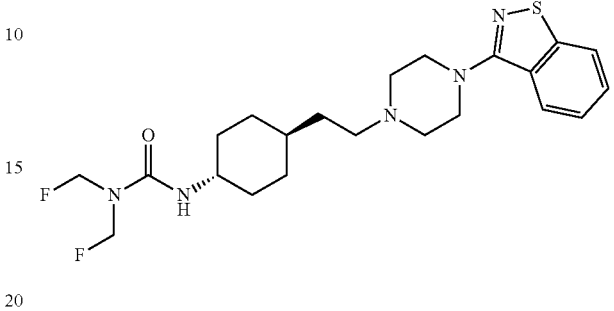

Step 1: Tert-butyl bis(fluoromethyl)carbamate

Tert-butyl carbamate (500 mg, 4.3 mmol) was dissolved in 10 mL DMF. NaH (427 mg, 10.7 mmol) was added at 0° C., and the reaction solution was stirred at 0° C. for 0.5 hour. Fluoroiodomethane (1.7 g, 3.8 mmol) was added, and the reaction solution was stirred at room temperature overnight. The reaction solution was quenched with water, and extracted with ethyl acetate (20 mL*3). The organic phase was washed with water and saturated brine, dried over anhydrous sodium sulfate, and filtered. The filtrate was concentrated to dryness by rotary evaporation. The resulting crude product was purified by column chromatography (eluted with petroleum ether/ethyl acetate=10/1) to obtain tert-butyl bis(fluoromethyl)carbamate (150 mg, colorless liquid, yield: 19%).

Step 2: Bis(fluoromethyl)amine hydrochloride

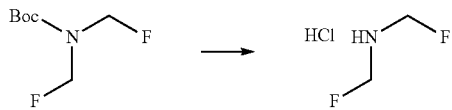 [SMILES: CC(C)(C)OC(=O)N(CF)CF ; Cl ; FCNCF]

Tert-butyl bis(fluoromethyl)carbamate (150 mg) was dissolved in a solution of hydrochloric acid in ethyl acetate (4 M, 2 mL), and stirred at room temperature overnight. The reaction solution was concentrated to dryness by rotary evaporation to obtain the crude product bis(fluoromethyl)amine hydrochloride (97 mg, 99%).

Step 3: 3-(Trans-4-(2-(4-(benzo[d]isothiazol-3-yl)piperazin-1-yl)ethyl)cyclohexyl)-1,1-bis(fluoromethyl)urea

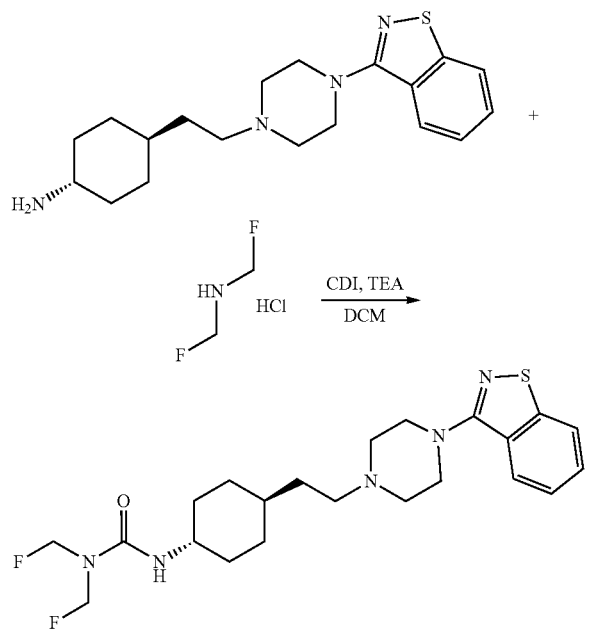

The product 3-(trans-4-(2-(4-(benzo[d]isothiazol-3-yl)piperazin-1-yl)ethyl)cyclohexyl)-1,1-bis(fluoromethyl)urea was obtained according to Example 1.
MS m/z (ESI): 452.2 [M+H]$^+$.

Example 6

3-(Trans-4-(2-(4-(benzo[b]thiophen-4-yl)piperazin-1-yl)ethyl)cyclohexyl)-1-(fluoromethyl)-1-methylurea

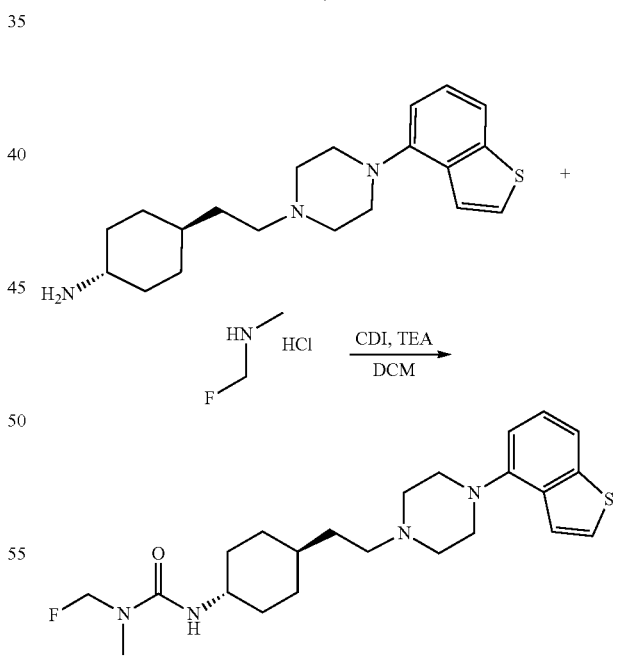

Step 1: Tert-butyl (fluoromethyl)(methyl)carbamate

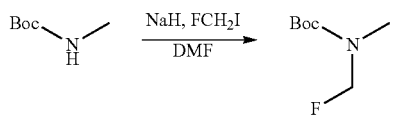

Tert-butyl methylcarbamate (500 mg, 3.8 mmol) was dissolved in 10 mL DMF. NaH (228 mg, 5.7 mmol) was added at 0° C., and the reaction solution was stirred at 0° C. for 0.5 hour. Fluoroiodomethane (610 mg, 3.8 mmol) was added, and the reaction solution was stirred at room temperature overnight. The reaction solution was quenched with water, and extracted with ethyl acetate (20 mL*3). The organic phase was washed with water and saturated brine, dried over anhydrous sodium sulfate, and filtered. The filtrate was concentrated to dryness by rotary evaporation. The resulting crude product was purified by column chromatography (eluted with petroleum ether/ethyl acetate=10/1) to obtain tert-butyl (fluoromethyl)(methyl)carbamate (50 mg, colorless liquid, yield: 8.1%).

Step 2: 1-Fluoro-N-methylmethanamine hydrochloride

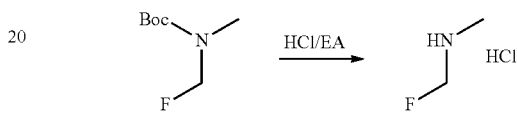

Tert-butyl (fluoromethyl)(methyl)carbamate (50 mg) was dissolved in a solution of hydrochloric acid in ethyl acetate (4 M, 2 mL), and stirred at room temperature overnight. The reaction solution was concentrated to dryness by rotary evaporation to obtain the crude product 1-fluoro-N-methylmethanamine hydrochloride (30 mg, 99%).

Step 3: 3-(Trans-4-(2-(4-(benzo[b]thiophen-4-yl)piperazin-1-yl)ethyl)cyclohexyl)-1-(fluoromethyl)-1-methylurea Trans-4-(2-(4-(benzo[b]thiophen-4-yl)piperazin-1-yl)ethyl)cyclohexan-1-amine (50 mg, 0.15 mmol) was dissolved in 3 mL of dichloromethane. Triethylamine (45 mg, 0.45 mmol), N,N'-carbonyldiimidazole (28 mg, 0.17 mmol) were added, and the reaction solution was stirred at room temperature for 3 hours. 1-Fluoro-N-methylmethanamine hydrochloride (30 mg, 0.3 mmol) was added, and the reaction solution was reacted at room temperature for 12 hours. The reaction solution was washed with water three times (2 mL*3). The organic phase was concentrated and purified by prep-HPLC to obtain the product 3-(trans-4-(2-(4-(benzo[b]thiophen-4-yl)piperazin-1-yl)ethyl)cyclohexyl)-1-(fluoromethyl)-1-methylurea (12 mg, white solid, yield: 18.5%).

MS m/z (ESI): 433.2 [M+H]+.

Example 7

3-(Trans-4-(2-(4-(benzo[b]thiophen-4-yl)piperazin-1-yl)ethyl)cyclohexyl)-1,1-bis(fluoromethyl)urea

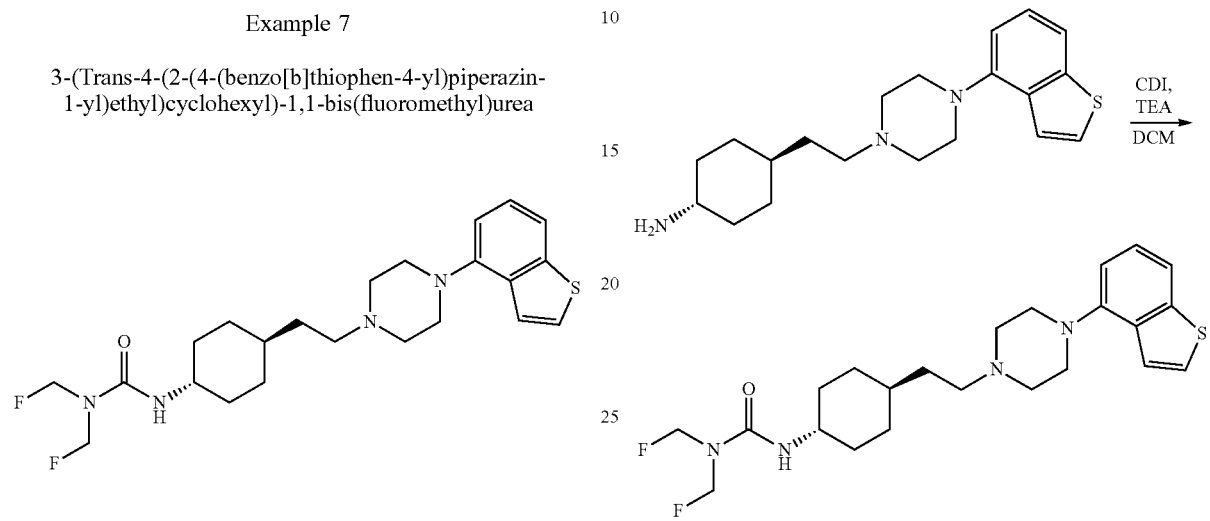

Step 1: Tert-butyl bis(fluoromethyl)carbamate

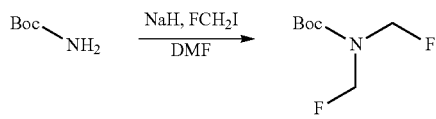

Tert-butyl carbamate (500 mg, 4.3 mmol) was dissolved in 10 mL DMF. NaH (427 mg, 10.7 mmol) was added at 0° C., and the reaction solution was stirred at 0° C. for 0.5 hour. Fluoroiodomethane (1.7 g, 3.8 mmol) was added, and the reaction solution was stirred at room temperature overnight. The reaction solution was quenched with water, and extracted with ethyl acetate (20 mL*3). The organic phase was washed with water and saturated brine, and dried over anhydrous sodium sulfate. The solution was filtered, and the filtrate was concentrated to dryness by rotary evaporation. The resulting crude product was purified by column chromatography (eluted with petroleum ether/ethyl acetate=10/1) to obtain tert-butyl bis(fluoromethyl)carbamate (150 mg, colorless liquid, yield: 19%).

Step 2: Bis(fluoromethyl)amine hydrochloride

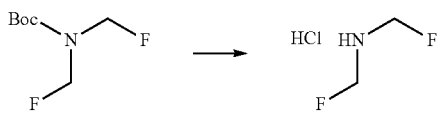

Tert-butyl bis(fluoromethyl)carbamate (150 mg) was dissolved in a solution of hydrochloric acid in ethyl acetate (4 M, 2 mL), and stirred at room temperature overnight. The reaction solution was concentrated to dryness by rotary evaporation to obtain the crude product bis(fluoromethyl)amine hydrochloride (97 mg, 99%).

Step 3: 3-(Trans-4-(2-(4-(benzo[b]thiophen-4-yl)piperazin-1-yl)ethyl)cyclohexyl)-1,1-bis(fluoromethyl)urea

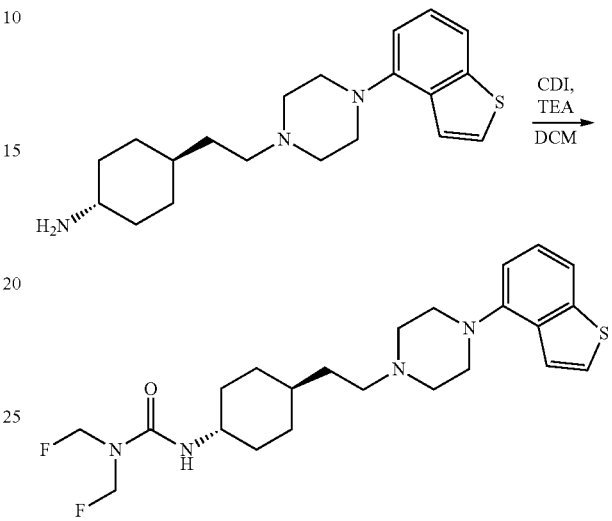

3-(Trans-4-(2-(4-(benzo[b]thiophen-4-yl)piperazin-1-yl)ethyl)cyclohexyl)-1,1-bis(fluoromethyl)urea was obtained according to Example 5.

MS m/z (ESI): 451.2 [M+H]+.

Example 8

3-(Trans-4-(2-(4-(benzo[b]thiophen-4-yl)piperazin-1-yl)ethyl)cyclohexyl)-1-methyl-1-(trifluoromethyl)urea

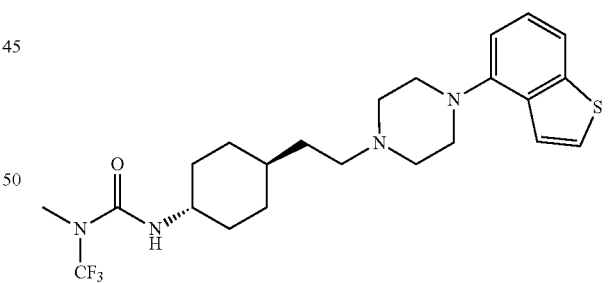

Step 1: Tert-butyl methyl(trifluoromethyl)carbamate

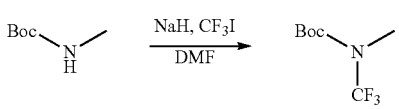

Tert-butyl methylcarbamate (500 mg, 3.8 mmol) was dissolved in 10 mL DMF. NaH (228 mg, 5.7 mmol) was added at 0° C., and the reaction solution was stirred at 0° C. for 0.5 hour. Trifluoroiodomethane (2.98 g, 3.8 mmol, 25% in DMF) was added, and the reaction solution was stirred at room temperature overnight. The reaction solution was quenched with water, and extracted with ethyl acetate (10 mL*3). The organic phase was washed with water and saturated brine, dried over anhydrous sodium sulfate and filtered. The filtrate was concentrated to dryness by rotary evaporation. The resulting crude product was purified by column chromatography (eluted with petroleum ether/ethyl acetate=10/1) to obtain tert-butyl methyl(trifluoromethyl)carbamate (40 mg, colorless liquid, yield: 5.3%).

Step 2: 1,1,1-Trifluoro-N-methylmethanamine hydrochloride

Tert-butyl methyl(trifluoromethyl)carbamate (40 mg) was dissolved in a solution of hydrochloric acid in ethyl acetate (4 M, 2 mL), and stirred at room temperature overnight. The reaction solution was concentrated to dryness by rotary evaporation to obtain the crude product 1,1,1-trifluoro-N-methylmethanamine hydrochloride (25 mg, 99%).

Step 3: 3-(Trans-4-(2-(4-(benzo[b]thiophen-4-yl)piperazin-1-yl)ethyl)cyclohexyl)-1-methyl-1-(trifluoromethyl)urea

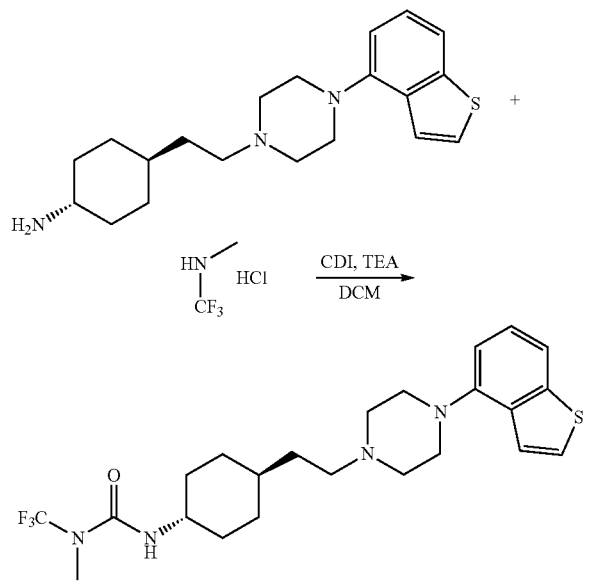

Trans-4-(2-(4-(benzo[b]thiophen-4-yl)piperazin-1-yl)ethyl)cyclohexan-1-amine (50 mg, 0.15 mmol) was dissolved in 3 mL of dichloromethane. Triethylamine (45 mg, 0.45 mmol), N,N'-carbonyldiimidazole (28 mg, 0.17 mmol) were added, and the reaction solution was stirred at room temperature for 3 hours. 1,1,1-Trifluoro-N-methylmethanamine hydrochloride (25 mg, 0.18 mmol) was added, and the reaction solution was reacted at room temperature for 12 hours. The reaction solution was washed with water three times (2 mL*3). The organic phase was concentrated and purified by prep-HPLC to obtain the product 3-(trans-4-(2-(4-(benzo[b]thiophen-4-yl)piperazin-1-yl)ethyl)cyclohexyl)-1-methyl-1-(t rifluoromethyl)urea (8 mg, white solid, yield: 11.3%).

MS m/z (ESI): 469.2 [M+H]+.

Example 8

N-(Trans-4-(2-(4-(benzo[b]thiophen-4-yl)piperazin-1-yl)ethyl)cyclohexyl)dimethylsulfonamide

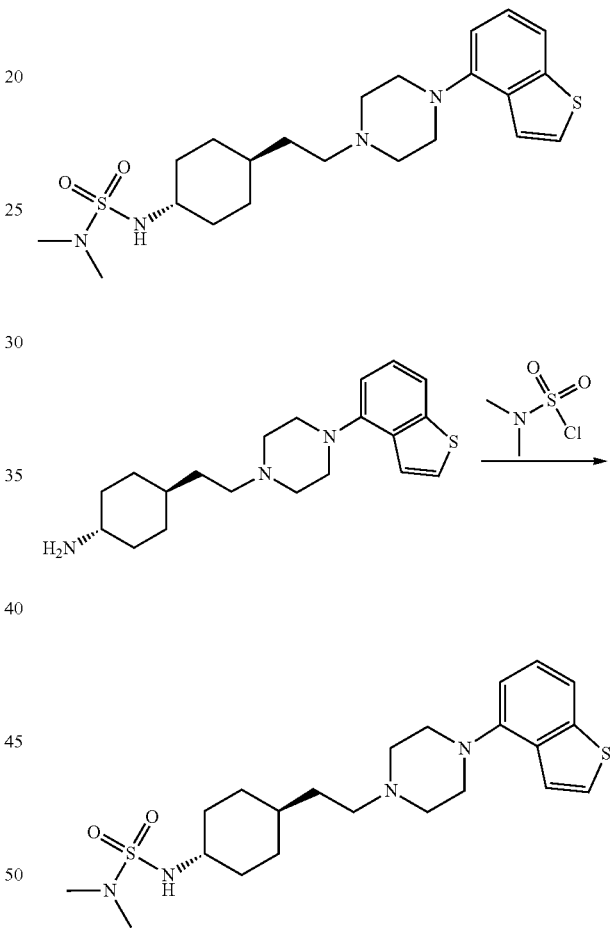

Trans-4-(2-(4-(benzo[b]thiophen-4-yl)piperazin-1-yl)ethyl)cyclohexan-1-amine and triethylamine were dissolved in dichloromethane. Dimethylsulfamoyl chloride was added dropwise, and the reaction solution was stirred at room temperature for 16 hours. Water was added to the reaction solution, which was then extracted with ethyl acetate. The organic phases were combined, washed with saturated brine, dried over anhydrous sodium sulfate and filtered. The filtrate was concentrated under reduced pressure, and purified by preparative chromatography to obtain N-(trans-4-(2-(4-(benzo[b]thiophen-4-yl)piperazin-1-yl)ethyl)cyclohexyl)dimethylsulfonamide as a white solid.

Same as Example 10, MS m/z (ESI): 451.2 [M+H]+.

Example 10

N-(Trans-4-(2-(4-(benzo[d]isothiazol-3-yl)piperazin-1-yl)ethyl)cyclohexyl)dimethylsulfonamide

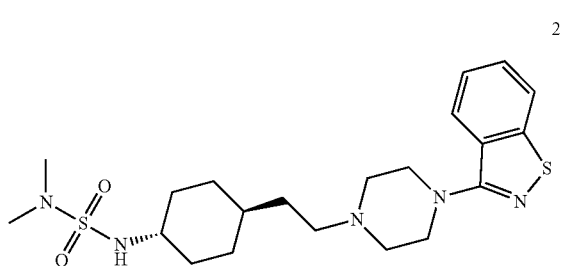

Step 1: N-(Trans-4-(2-(4-(benzo[d]isothiazol-3-yl)piperazin-1-yl)ethyl)cyclohexyl)dimethylsulfonamide

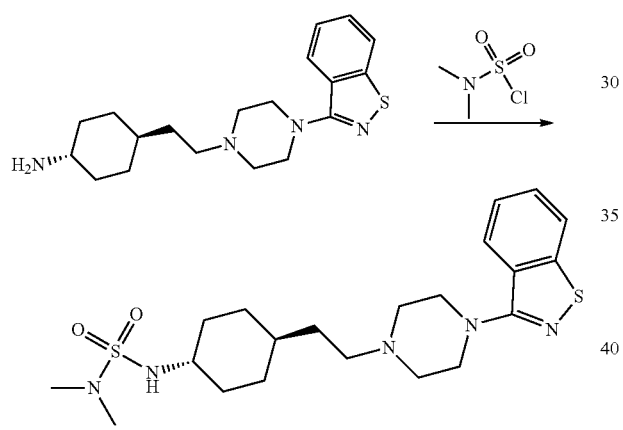

Trans-4-(2-(4-(benzo[d]isothiazol-3-yl)piperazin-1-yl)ethyl)cyclohexane-1-amine (60 mg, 0.17 mmol) and triethylamine (52 mg, 0.51 mmol) were dissolved in dichloromethane (3 mL). Dimethylsulfamoyl chloride (49 mg, 0.34 mmol) was added dropwise, and the reaction solution was stirred at room temperature for 16 hours. Water (20 mL) was added to the reaction solution which was then extracted with ethyl acetate (20 mL×3). The organic phases were combined, washed with saturated brine (30 mL), dried over anhydrous sodium sulfate and filtered. The filtrate was concentrated under reduced pressure, and purified by preparative chromatography to obtain N-(trans-4-(2-(4-(benzo[d]isothiazol-3-yl)piperazin-1-yl)ethyl)cyclohexyl)dimethylsulfonamide as a white solid (33 mg, yield: 43%).

MS m/z (ESI): 452.2 [M+H]$^+$.

$^1$H NMR (400 MHz, CDCl$_3$) δ 7.90 (d, J=8.2 Hz, 1H), 7.81 (d, J=8.1 Hz, 1H), 7.47 (t, J=7.4 Hz, 1H), 7.35 (t, J=7.5 Hz, 1H), 3.97 (d, J=8.0 Hz, 1H), 3.59 (s, 4H), 3.19-3.09 (m, 1H), 2.79 (s, 6H), 2.69 (s, 4H), 2.52-2.39 (m, 2H), 2.10-2.01 (m, 2H), 1.82 (d, J=12.3 Hz, 2H), 1.50-1.44 (m, 2H), 1.34-0.97 (m, 4H).

Example 11

N-(Trans-4-(2-(4-(benzo[b]thiophen-4-yl)piperazin-1-yl)ethyl)cyclohexyl)pyridine-3-sulfonamide

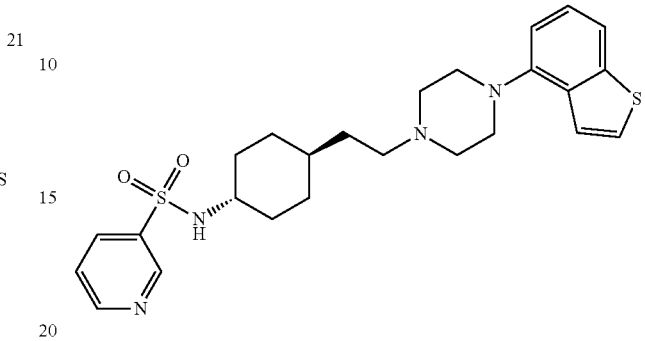

N-(Trans-4-(2-(4-(benzo[b]thiophen-4-yl)piperazin-1-yl)ethyl)cyclohexyl)pyridine-3-sulfonamide was obtained according to Example 10.

MS m/z (ESI): 485.2 [M+H]$^+$.

Example 12

3-(Cis-4-(2-(4-(2,3-dichlorophenyl)piperazin-1-yl)ethyl)-4-fluorocyclohexyl)-1,1-dimethylurea

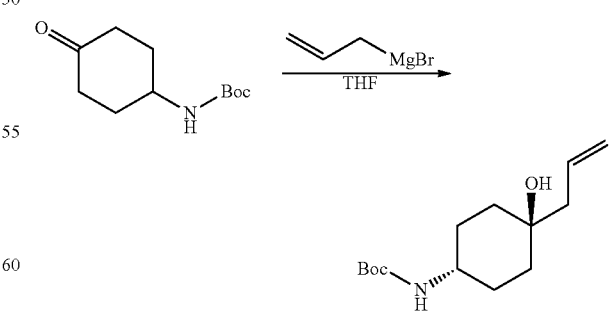

Step 1: Preparation of tert-butyl (trans-4-allyl-4-hydroxycyclohexyl)carbamate

Tert-butyl (4-oxocyclohexyl)carbamate (18.0 g, 84.40 mmol) was dissolved in anhydrous THF (400 mL). Allylmagnesium bromide (254 mL, 254 mmol, 1M in THF) was slowly added dropwise at −70° C. After completion of the addition, the reaction solution was stirred for 1 hour. Water (100 mL) was slowly added dropwise to the reaction solution to quench the reaction, which was then extracted with ethyl acetate (500 mL*2). The organic phase was dried and concentrated. The resulting crude product was purified by column chromatography (petroleum ether/ethyl acetate=55/45) to obtain tert-butyl (trans-4-allyl-4-hydroxycyclohexyl)carbamate (5.4 g, yield: 25%). MS m/z (ESI): 256.2[M+H]⁺.

Step 2: Preparation of tert-butyl (trans-4-hydroxy-4-(2-oxoethyl)cyclohexyl)carbamate

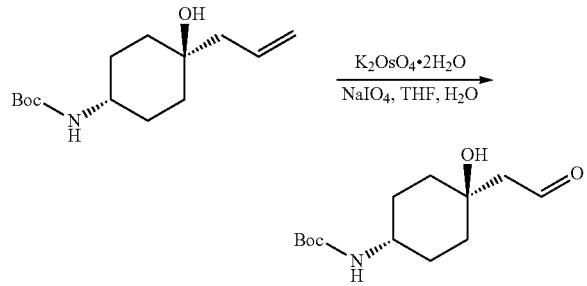

Tert-butyl (trans-4-allyl-4-hydroxycyclohexyl)carbamate (5.4 g, 21.15 mmol) was dissolved in THF (100 mL), followed by the addition of water (100 mL). $K_2OsO_4 \cdot 2 H_2O$ (779 mg, 2.11 mmol) and $NaIO_4$ (18.09 g, 84.59 mmol) were added to the reaction solution, respectively. The reaction solution was stirred at room temperature overnight. Saturated aqueous $Na_2S_2O_4$ solution (50 mL) was added to the reaction solution, followed by the addition of ethyl acetate (400 mL) and stirring for 5 minutes. The organic phase was collected, dried and concentrated to obtain tert-butyl (trans-4-hydroxy-4-(2-oxoethyl)cyclohexyl)carbamate (4.8 g, yield: 88%). MS m/z (ESI): 258.1[M+H]⁺.

Step 3: Preparation of tert-butyl (trans-4-hydroxy-4-(2-hydroxyethyl)cyclohexyl)carbamate

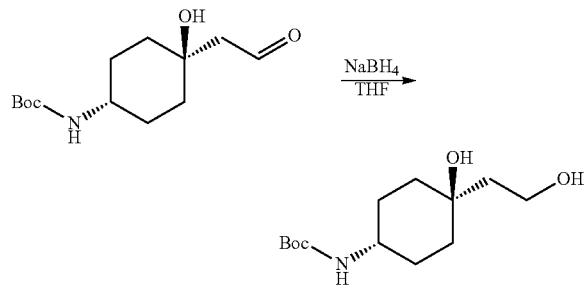

Tert-butyl (trans-4-hydroxy-4-(2-oxoethyl)cyclohexyl) carbamate (4.8 g, 18.65 mmol) was dissolved in anhydrous THF (100 mL), and $NaBH_4$ (1.41 g, 37.31 mmol) was added in batches. After completion of the addition, the reaction solution was stirred at room temperature for 2 hours. Water (50 mL) was slowly added to the reaction solution to quench the reaction, followed by extracting with ethyl acetate (200 mL*2). The organic phase was dried and concentrated. The resulting crude product was purified by column chromatography (ethyl acetate/MeOH=95/5) to obtain tert-butyl (trans-4-hydroxy-4-(2-hydroxyethyl)cyclohexyl)carbamate (3.2 g, yield: 66%).

MS m/z (ESI): 260.2[M+H]⁺.

Step 4: Preparation of 2-(trans-4-((tert-butoxycarbonyl)amino)-1-hydroxycyclohexyl)ethyl 4-methylbenzenesulfonate

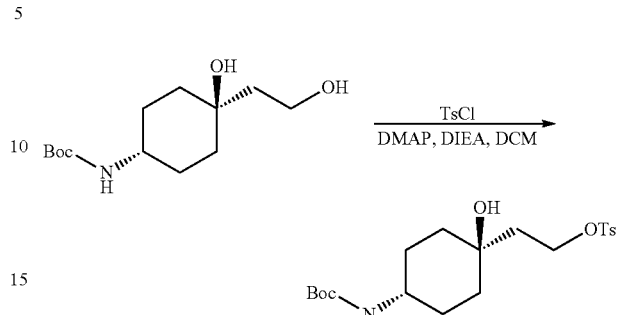

Tert-butyl (trans-4-hydroxy-4-(2-hydroxyethyl)cyclohexyl)carbamate (3.2 g, 12.34 mmol) was dissolved in anhydrous dichloromethane (50 mL), followed by the addition of DMAP (151 mg, 1.23 mmol) and DIPEA (3.19 g, 24.68 mmol). The reaction solution was cooled to 0° C., to which TsCl (2.82 g, 14.81 mmol) was added. The reaction solution was warmed up to 30° C., and stirred overnight. The reaction solution was partitioned between water (50 mL) and dichloromethane (100 mL). The organic phase was dried and concentrated to dryness by rotary evaporation. The resulting crude product was purified by column chromatography (petroleum ether/ethyl acetate=1/2) to obtain 2-(trans-4-((tert-butoxycarbonyl)amino)-1-hydroxycyclohexyl)ethyl 4-methylbenzenesulfonate (2.0 g, yield: 39%).

MS m/z (ESI): 414.1[M+H]⁺.

Step 5: Preparation of 2-(cis-4-((tert-butoxycarbonyl)amino)-1-fluorocyclohexyl)ethyl 4-methylbenzenesulfonate and 2-(4-((tert-butoxycarbonyl)amino)cyclohex-1-en-1-yl)ethyl 4-methylbenzenesulfonate

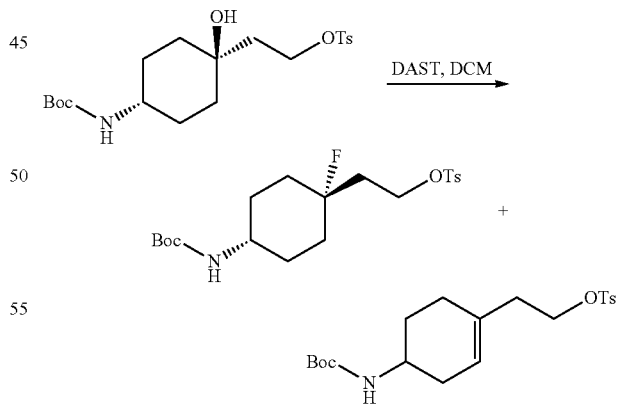

2-(Trans-4-((tert-butoxycarbonyl)amino)-1-hydroxycyclohexyl)ethyl 4-methylbenzenesulfonate (2 g, 4.84 mmol) was dissolved in anhydrous dichloromethane (50 mL), and DAST (4.68 g, 29.02 mmol) was slowly added dropwise at −70° C. After completion of the addition, the reaction solution was stirred at −70° C. for 2 hours. Water (10 mL) was slowly added dropwise to quench the reaction, and saturated NaHCO₃ solution (10 mL) was added to adjust the pH to weakly alkali. The mixed solution was extracted with dichloromethane (100 mL). The organic phase was dried and concentrated to dryness by rotary evaporation. The resulting crude product was purified by column chromatography (petroleum ether/ethyl acetate=3/2) to obtain 2-(cis-4-((tert-butoxycarbonyl)amino)-1-fluorocyclohexyl)ethyl 4-methylbenzenesulfonate (630 mg, yield: 31%) and 2-(4-((tert-butoxycarbonyl)amino)cyclohex-1-en-1-yl)ethyl 4-methylbenzenesulfonate (600 mg, yield: 31%).

2-(Cis-4-((tert-butoxycarbonyl)amino)-1-fluorocyclohexyl)ethyl 4-methylbenzenesulfonate MS m/z (ESI): 416.1[M+H]⁺.
¹H NMR (400 MHz, CDCl₃) δ 7.79 (d, J=8.2 Hz, 2H), 7.36 (d, J=8.0 Hz, 2H), 4.39 (s, 1H), 4.21-4.12 (m, 2H), 3.45-3.30 (m, 1H), 2.45 (s, 3H), 2.06-1.75 (m, 7H), 1.52-1.46 (m, 1H), 1.44 (s, 9H), 1.41-1.31 (m, 2H).

2-(4-((Tert-butoxycarbonyl)amino)cyclohex-1-en-1-yl)ethyl 4-methylbenzenesulfonate MS m/z (ESI): 396.1[M+H]⁺.
¹H NMR (400 MHz, CDCl₃) δ 7.78 (d, J=8.2 Hz, 2H), 7.35 (d, J=8.0 Hz, 2H), 5.32 (s, 1H), 4.49 (s, 1H), 4.13-4.00 (m, 2H), 3.75-3.61 (m, 1H), 2.45 (s, 3H), 2.30-2.27 (m, 2H), 1.99-1.94 (m, 1H), 1.85-1.76 (m, 2H), 1.70-1.64 (m, 1H), 1.56-1.50 (m, 1H), 1.45 (s, 9H).

Step 6: Preparation of tert-butyl (cis-4-(2-(4-(2,3-dichlorophenyl)piperazin-1-yl)ethyl)-4-fluorocyclohexyl)carbamate

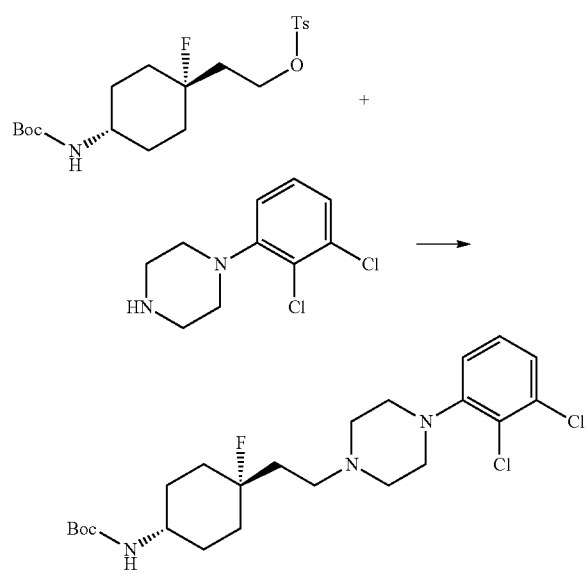

2-(Cis-4-((tert-butoxycarbonyl)amino)-1-fluorocyclohexyl)ethyl 4-methylbenzenesulfonate (390 mg, 0.94 mmol) was dissolved in acetonitrile (20 mL), followed by the addition of 1-(2,3-dichlorophenyl)piperazine (260 mg, 1.13 mmol) and potassium carbonate (389 mg, 2.82 mmol). The reaction solution was stirred at 90° C. overnight. Water (20 mL) was added to the reaction solution, which was then extracted with ethyl acetate (50 mL). The organic phase was dried and concentrated. The resulting crude product was purified by column chromatography (petroleum ether/ethyl acetate=1/9) to obtain tert-butyl (cis-4-(2-(4-(2,3-dichlorophenyl)piperazin-1-yl)ethyl)-4-fluorocyclohexyl)carbamate (210 mg, yield: 47%).
MS m/z (ESI): 474.2[M+H]⁺.

Step 7: Preparation of cis-4-(2-(4-(2,3-dichlorophenyl)piperazin-1-yl)ethyl)-4-fluorocyclohexan-1-amine

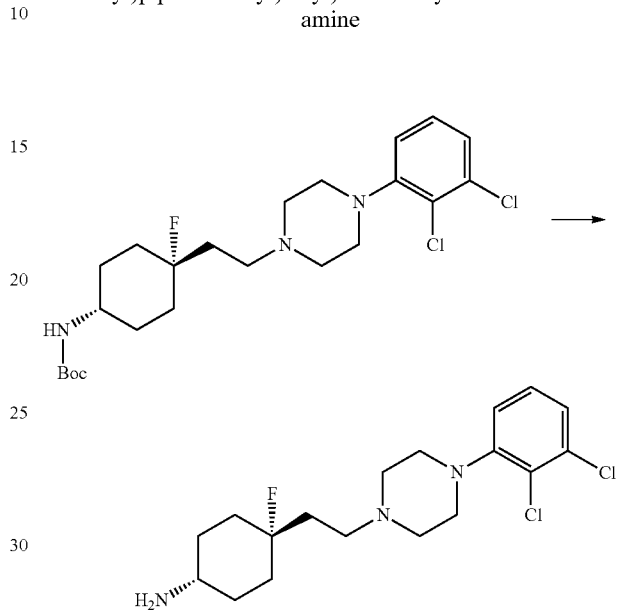

Tert-butyl (cis-4-(2-(4-(2,3-dichlorophenyl)piperazin-1-yl)ethyl)-4-fluorocyclohexyl)carbamate (210 mg, 0.442 mmol) was dissolved in 25% TFA/dichloromethane (10 mL). The reaction solution was stirred at room temperature for 2 hours, and concentrated to dryness to obtain cis-4-(2-(4-(2,3-dichlorophenyl)piperazin-1-yl)ethyl)-4-fluorocyclohexan-1-amine (210 mg, as a TFA salt). MS m/z (ESI): 374.2[M+H]⁺.

Step 8: Preparation of 3-(cis-4-(2-(4-(2,3-dichlorophenyl)piperazin-1-yl)ethyl)-4-fluorocyclohexyl)-1,1-dimethylurea

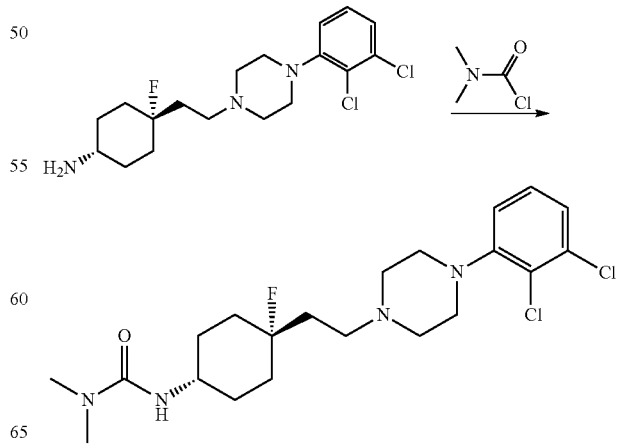

Cis-4-(2-(4-(2,3-dichlorophenyl)piperazin-1-yl)ethyl)-4-fluorocyclohexan-1-amine (210 mg, as a TFA salt, about 0.147 mmol) was dissolved in anhydrous dichloromethane (5 mL), followed by the addition of DIPEA (0.1 mL) and dimethylcarbamic chloride (one drop). The reaction solution was stirred at room temperature overnight. Water (5 mL) was added to the reaction solution, which was then extracted with dichloromethane (10 mL). The organic phase was dried and concentrated to dryness by rotary evaporation. The resulting crude product was purified by prep-HPLC to obtain 3-(cis-4-(2-(4-(2,3-dichlorophenyl)piperazin-1-yl)ethyl)-4-fluorocyclohexyl)-1,1-dimethylurea (21.1 mg, yield: 32%).

MS m/z (ESI): 445.2[M+H]$^+$.

$^1$H NMR (400 MHz, CDCl$_3$) δ 7.20-7.12 (m, 2H), 6.97 (dd, J=7.1, 2.3 Hz, 1H), 4.18 (d, J=7.7 Hz, 1H), 3.75-3.60 (m, 1H), 3.27-3.03 (m, 4H), 2.89 (s, 6H), 2.86-2.51 (m, 6H), 2.04-1.81 (m, 6H), 1.64-1.53 (m, 1H), 1.52-1.40 (m, 3H).

Example 13

N-(Cis-4-(2-(4-(2,3-dichlorophenyl)piperazin-1-yl)ethyl)-4-fluorocyclohexyl)-1H-indole-2-carboxamide

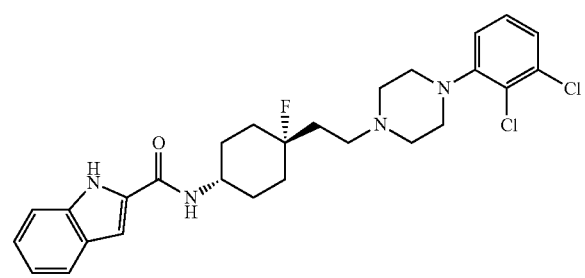 [SMILES: O=C(N[C@H]1CC[C@](F)(CCN2CCN(c3cccc(Cl)c3Cl)CC2)CC1)c1cc2ccccc2[nH]1]

Step 1: Preparation of N-(cis-4-(2-(4-(2,3-dichlorophenyl)piperazin-1-yl)ethyl)-4-fluorocyclohexyl)-1H-indole-2-carboxamide

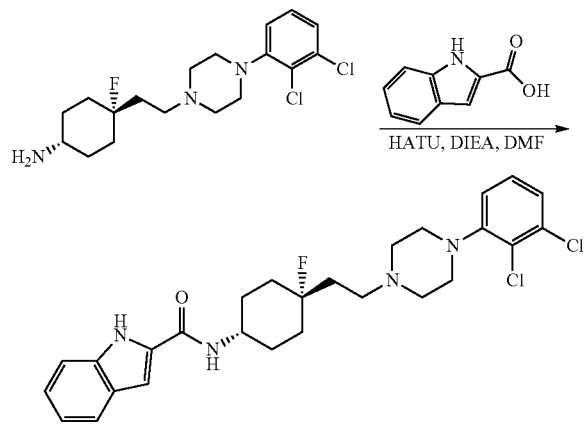

Cis-4-(2-(4-(2,3-dichlorophenyl)piperazin-1-yl)ethyl)-4-fluorocyclohexan-1-amine (100 mg, as a TFA salt, about 0.21 mmol) was dissolved in anhydrous DMF (3 mL), and 1H-indole-2-carboxylic acid (52 mg, 0.32 mmol), HATU (160 mg, 0.42 mmol) and DIEA (0.2 mL) were added respectively. The reaction solution was stirred at room temperature overnight. The reaction solution was filtered and purified by prep-HPLC to obtain N-(cis-4-(2-(4-(2,3-dichlorophenyl)piperazin-1-yl)ethyl)-4-fluorocyclohexyl)-1H-indole-2-carboxamide (25 mg, yield: 23%).

MS m/z (ESI): 517.2[M+H]$^+$.

$^1$H NMR (400 MHz, DMSO-d$_6$) δ 11.52 (s, 1H), 8.28 (d, J=8.0 Hz, 1H), 7.59 (d, J=8.0 Hz, 1H), 7.42 (d, J=8.2 Hz, 1H), 7.35-7.24 (m, 2H), 7.22-7.10 (m, 3H), 7.02 (t, J=7.4 Hz, 1H), 3.95-3.79 (m, 1H), 3.08-2.92 (m, 4H), 2.67-2.51 (m, 6H), 1.99-1.87 (m, 2H), 1.86-1.51 (m, 8H).

Example 14

N-(Cis-4-(2-(4-(2,3-dichlorophenyl)piperazin-1-yl)ethyl)-4-fluorocyclohexyl)furan-2-carboxamide

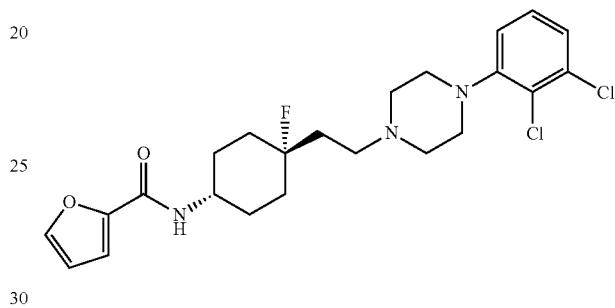

Step 1: Preparation of N-(cis-4-(2-(4-(2,3-dichlorophenyl)piperazin-1-yl)ethyl)-4-fluorocyclohexyl)furan-2-carboxamide

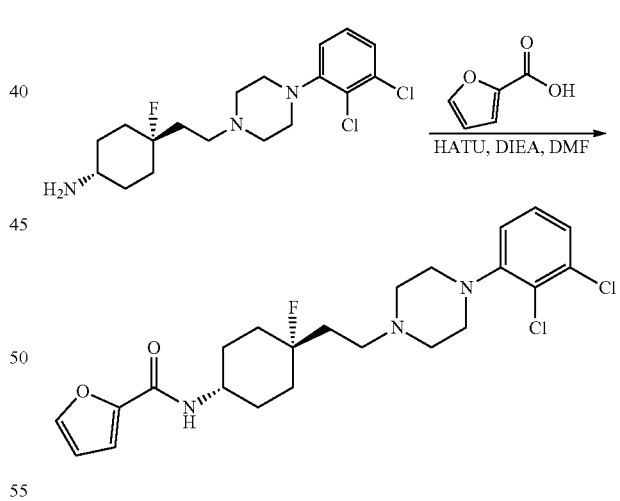

N-(Cis-4-(2-(4-(2,3-dichlorophenyl)piperazin-1-yl)ethyl)-4-fluorocyclohexyl)furan-2-carboxamide (off-white solid, yield: 36%) was obtained according to Step 1 of Example 13 with cis-4-(2-(4-(2,3-dichlorophenyl)piperazin-1-yl)ethyl)-4-fluorocyclohexan-1-amine and furan-2-carboxylic acid as the starting materials.

MS m/z (ESI): 468.2[M+H]$^+$.

$^1$H NMR (400 MHz, DMSO-d$_6$) δ 8.19 (d, J=8.1 Hz, 1H), 7.80 (d, J=1.7 Hz, 1H), 7.63 (d, J=5.6 Hz, 1H), 7.48 (d, J=8.1 Hz, 1H), 7.44 (d, J=5.6 Hz, 1H), 7.21 (t, J=7.9 Hz, 1H), 7.10 (d, J=3.5 Hz, 1H), 6.84 (d, J=7.8 Hz, 1H), 6.60 (dd, J=3.5, 1.7 Hz, 1H), 3.83-3.72 (m, 1H), 3.55-3.38 (m, 4H), 2.98-

2.55 (m, 6H), 2.06-1.92 (m, 2H), 1.92-1.72 (m, 4H), 1.72-1.62 (m, 4H), 1.58-1.48 (m, 1H).

Example 15

3-(Cis-4-(2-(4-(benzo[b]thiophen-4-yl)piperazin-1-yl)ethyl)-4-fluorocyclohexyl)-1,1-dimethylurea

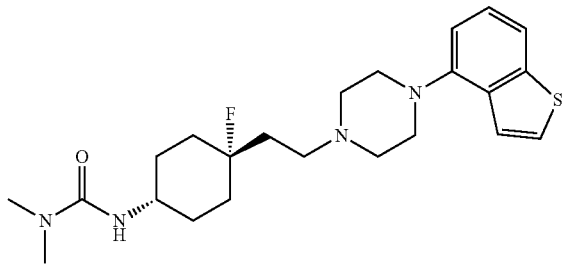 [SMILES: CN(C)C(=O)N[C@H]1CC[C@](F)(CCN2CCN(c3cccc4sccc34)CC2)CC1]

Step 1: Preparation of tert-butyl (trans-4-allyl-4-hydroxycyclohexyl)carbamate

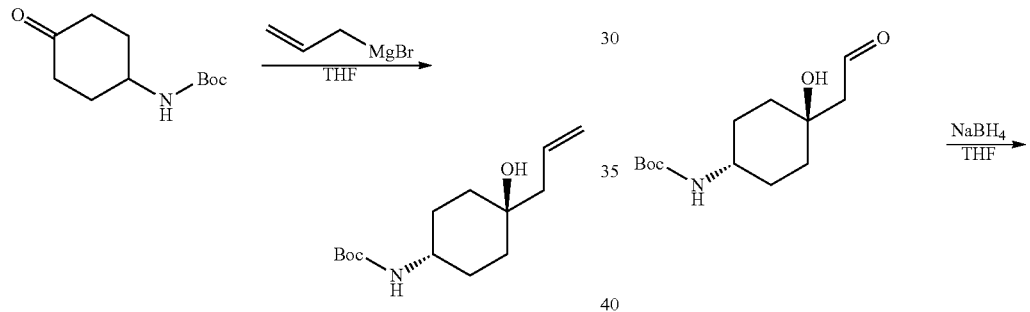

Tert-butyl (4-oxocyclohexyl)carbamate (18.0 g, 84.40 mmol) was dissolved in anhydrous THF (400 mL). Allylmagnesium bromide (254 mL, 254 mmol, 1M in THF) was slowly added dropwise at −70° C. After completion of the addition, the reaction solution was stirred for 1 hour. Water (100 mL) was slowly added dropwise to the reaction solution to quench the reaction, which was then extracted with ethyl acetate (500 mL*2). The organic phase was dried and concentrated. The resulting crude product was purified by column chromatography (petroleum ether/ethyl acetate=55/45) to obtain tert-butyl (trans-4-allyl-4-hydroxycyclohexyl)carbamate (5.4 g, yield: 25%). MS m/z (ESI): 256.2[M+H]⁺.

Step 2: Preparation of tert-butyl (trans-4-hydroxy-4-(2-oxoethyl)cyclohexyl)carbamate

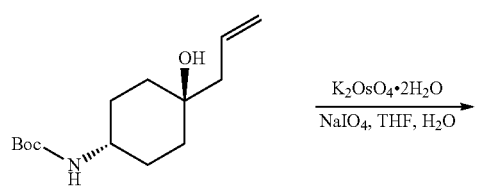

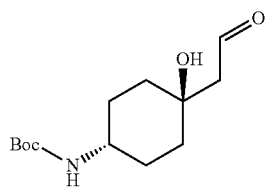

Tert-butyl (trans-4-allyl-4-hydroxycyclohexyl)carbamate (5.4 g, 21.15 mmol) was dissolved in THF (100 mL), followed by the addition of water (100 mL). K₂OsO₄·2 H₂O (779 mg, 2.11 mmol) and NaIO₄ (18.09 g, 84.59 mmol) were added to the reaction solution, respectively. The reaction solution was stirred at room temperature overnight. Saturated aqueous Na₂S₂O₄ solution (50 mL) was added to the reaction solution, followed by the addition of ethyl acetate (400 mL) and stirring for 5 minutes. The organic phase was collected, dried and concentrated to obtain tert-butyl (trans-4-hydroxy-4-(2-oxoethyl)cyclohexyl)carbamate (4.8 g, yield: 88%). MS m/z (ESI): 258.1[M+H]⁺.

Step 3: Preparation of tert-butyl (trans-4-hydroxy-4-(2-hydroxyethyl)cyclohexyl)carbamate Tert-butyl trans-4-hydroxy-4-2-oxoethyl)cyclohexyl)carbamate (4.8 g, 18.65 mmol) was dissolved in anhydrous THF (100 mL), and NaBH₄ (1.41 g, 37.31 mmol) was added in batches. After completion of the addition, the reaction solution was stirred at room temperature for 2 hours. Water (50 mL) was slowly added to the reaction solution to quench the reaction, which was then extracted with ethyl acetate (200 mL*2). The organic phase was dried and concentrated. The resulting crude product was purified by column chromatography (ethyl acetate/MeOH=95/5) to obtain tert-butyl (trans-4-hydroxy-4-(2-hydroxyethyl)cyclohexyl)carbamate (3.2 g, yield: 66%).

MS m/z (ESI): 260.2[M+H]⁺.

Step 4: Preparation of 2-(trans-4-((tert-butoxycarbonyl)amino)-1-hydroxycyclohexyl)ethyl 4-methylbenzenesulfonate

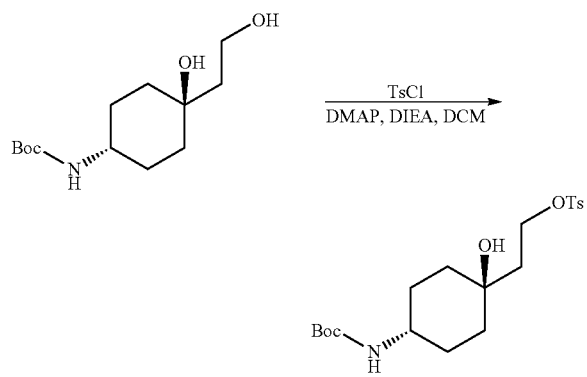

Tert-butyl (trans-4-hydroxy-4-(2-hydroxyethyl)cyclohexyl)carbamate (3.2 g, 12.34 mmol) was dissolved in anhydrous dichloromethane (50 mL), followed by the addition of DMAP (151 mg, 1.23 mmol) and DIPEA (3.19 g, 24.68 mmol). The reaction solution was cooled to 0° C., to which TsCl (2.82 g, 14.81 mmol) was added. The reaction solution was warmed up to 30° C., and stirred overnight. The reaction solution was partitioned between water (50 mL) and dichloromethane (100 mL). The organic phase was dried and concentrated to dryness by rotary evaporation. The resulting crude product was purified by column chromatography (petroleum ether/ethyl acetate=1/2) to obtain 2-(trans-4-((tert-butoxycarbonyl)amino)-1-hydroxycyclohexyl)ethyl 4-methylbenzenesulfonate (2.0 g, yield: 39%).

MS m/z (ESI): 414.1[M+H]$^+$.

Step 5: Preparation of 2-(cis-4-((tert-butoxycarbonyl)amino)-1-fluorocyclohexyl)ethyl 4-methylbenzenesulfonate and 2-(4-((tert-butoxycarbonyl)amino)cyclohex-1-en-1-yl)ethyl 4-methylbenzenesulfonate

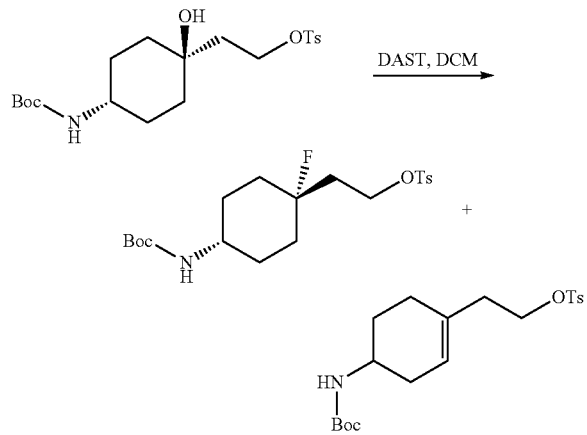

2-(Trans-4-((tert-butoxycarbonyl)amino)-1-hydroxycyclohexyl)ethyl 4-methylbenzenesulfonate (2 g, 4.84 mmol) was dissolved in anhydrous dichloromethane (50 mL), and DAST (4.68 g, 29.02 mmol) was slowly added dropwise at −70° C. After completion of the addition, the reaction solution was stirred at −70° C. for 2 hours. Water (10 mL) was slowly added dropwise to quench the reaction, and saturated NaHCO$_3$ solution (10 mL) was added to adjust the pH to weakly alkali. The mixed solution was extracted with dichloromethane (100 mL). The organic phase was dried and concentrated to dryness by rotary evaporation. The resulting crude product was purified by column chromatography (petroleum ether/ethyl acetate=3/2) to obtain 2-(cis-4-((tert-butoxycarbonyl)amino)-1-fluorocyclohexyl)ethyl 4-methylbenzenesulfonate (630 mg, yield: 31%) and 2-(4-((tert-butoxycarbonyl)amino)cyclohex-1-en-1-yl)ethyl 4-methylbenzenesulfonate (600 mg, yield: 31%).

2-(Cis-4-((tert-butoxycarbonyl)amino)-1-fluorocyclohexyl)ethyl 4-methylbenzenesulfonate MS m/z (ESI): 416.1[M+H]$^+$.
$^1$H NMR (400 MHz, CDCl$_3$) δ 7.79 (d, J=8.2 Hz, 2H), 7.36 (d, J=8.0 Hz, 2H), 4.39 (s, 1H), 4.21-4.12 (m, 2H), 3.45-3.30 (m, 1H), 2.45 (s, 3H), 2.06-1.75 (m, 7H), 1.52-1.46 (m, 1H), 1.44 (s, 9H), 1.41-1.31 (m, 2H).

2-(4-((Tert-butoxycarbonyl)amino)cyclohex-1-en-1-yl)ethyl 4-methylbenzenesulfonate MS m/z (ESI): 396.1[M+H]$^+$.
$^1$H NMR (400 MHz, CDCl$_3$) δ 7.78 (d, J=8.2 Hz, 2H), 7.35 (d, J=8.0 Hz, 2H), 5.32 (s, 1H), 4.49 (s, 1H), 4.13-4.00 (m, 2H), 3.75-3.61 (m, 1H), 2.45 (s, 3H), 2.30-2.27 (m, 2H), 1.99-1.94 (m, 1H), 1.85-1.76 (m, 2H), 1.70-1.64 (m, 1H), 1.56-1.50 (m, 1H), 1.45 (s, 9H).

Step 6: Preparation of tert-butyl (cis-4-(2-(4-(benzo[b]thiophen-4-yl)piperazin-1-yl)ethyl)-4-fluorocyclohexyl)carbamate

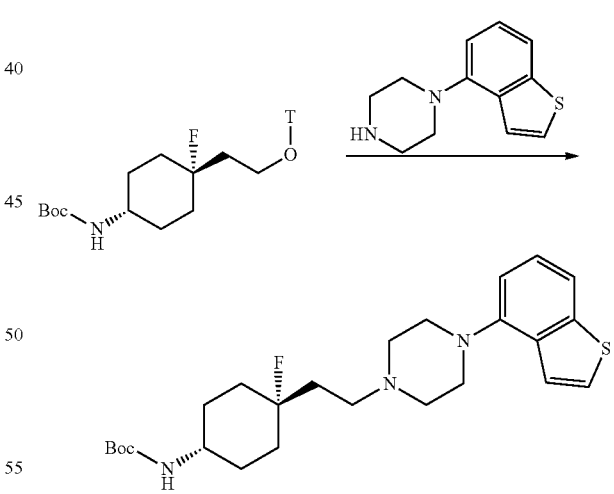

2-(Cis-4-((tert-butoxycarbonyl)amino)-1-fluorocyclohexyl)ethyl 4-methylbenzenesulfonate was dissolved in acetonitrile (20 mL), followed by the addition of 1-(benzo[b]thiophen-4-yl)piperazine and potassium carbonate (389 mg, 2.82 mmol). The reaction solution was stirred at 90° C. overnight. Water (20 mL) was added to the reaction solution, which was then extracted with ethyl acetate (50 mL). The organic phase was dried and concentrated. The resulting crude product was purified by column chromatography (petroleum ether/ethyl acetate=1/9) to obtain tert-butyl (cis- 4-(2-(4-(benzo[b]thiophen-4-yl)piperazin-1-yl)ethyl)-4-fluorocyclohexyl)carbamate (180 mg, yield: 70%).

MS m/z (ESI): 462.2[M+H]⁺.

Step 7: Preparation of cis-4-(2-(4-(benzo[b]thiophen-4-yl)piperazin-1-yl)ethyl)-4-fluorocyclohexan-1-amine

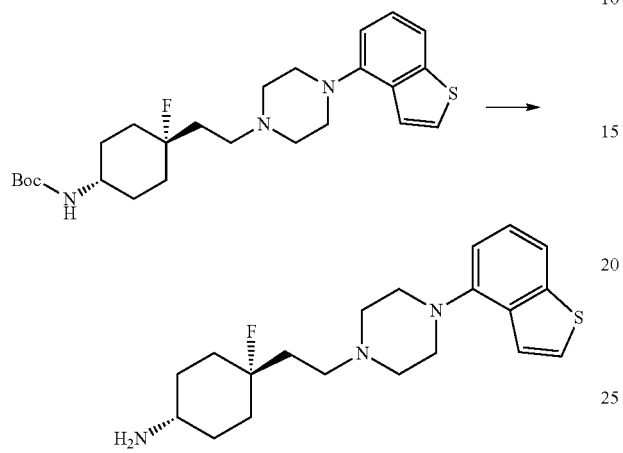

Tert-butyl (cis-4-(2-(4-(benzo[b]thiophen-4-yl)piperazin-1-yl)ethyl)-4-fluorocyclohexyl)carbamate was dissolved in 25% TFA/dichloromethane (10 mL). The reaction solution was stirred at room temperature for 2 hours, and concentrated to dryness to obtain cis-4-(2-(4-(benzo[b]thiophen-4-yl)piperazin-1-yl)ethyl)-4-fluorocyclohexan-1-amine (180 mg, as a TFA salt).

MS m/z (ESI): 362.1[M+H]⁺.

Step 8: Preparation of 3-(cis-4-(2-(4-(benzo[b]thiophen-4-yl)piperazin-1-yl)ethyl)-4-fluorocyclohexyl)-1,1-dimethylurea

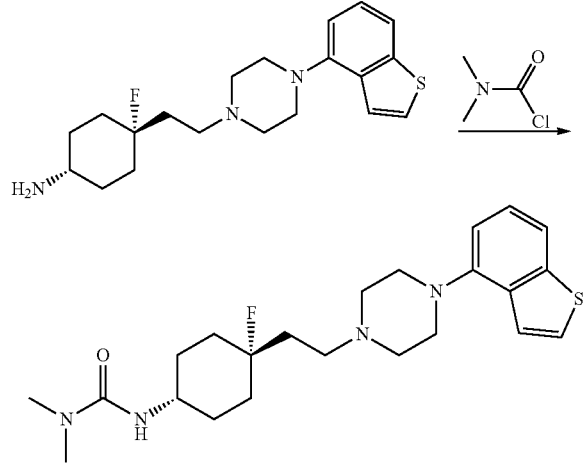

Cis-4-(2-(4-(benzo[b]thiophen-4-yl)piperazin-1-yl)ethyl)-4-fluorocyclohexan-1-am me was dissolved in anhydrous dichloromethane, followed by the addition of DIPEA and dimethylcarbamic chloride. The reaction solution was stirred at room temperature overnight. Water was added to the reaction solution, which was then extracted with dichloromethane. The organic phase was dried and concentrated to dryness by rotary evaporation. The resulting crude product was purified by prep-HPLC to obtain 3-(cis-4-(2-(4-(benzo[b]thiophen-4-yl)piperazin-1-yl)ethyl)-4-fluorocyclohexyl)-1,1-dimethylurea (18.0 mg, yield: 32%).

MS m/z (ESI): 433.2[M+H]⁺.

¹H NMR (400 MHz, DMSO) δ 7.69 (d, J=5.5 Hz, 1H), 7.61 (d, J=8.0 Hz, 1H), 7.40 (d, J=5.5 Hz, 1H), 7.27 (t, J=7.8 Hz, 1H), 6.90 (d, J=7.6 Hz, 1H), 5.96 (d, J=7.9 Hz, 1H), 3.52-3.38 (m, 1H), 3.16-2.98 (m, 4H), 2.76 (s, 6H), 2.70-2.56 (m, 4H), 2.49-2.44 (m, 2H), 1.94-1.72 (m, 4H), 1.67-1.60 (m, 2H), 1.60-1.43 (m, 4H).

Example 16

1-(Cis-4-(2-(4-(benzo[b]thiophen-4-yl)piperazin-1-yl)ethyl)-4-fluorocyclohexyl)-3-ethylurea

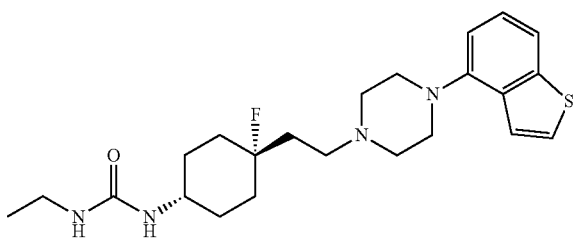 [SMILES: CCNC(=O)N[C@H]1CC[C@](F)(CCN2CCN(c3cccc4sccc34)CC2)CC1]

Step 1: Preparation of 1-(cis-4-(2-(4-(benzo[b]thiophen-4-yl)piperazin-1-yl)ethyl)-4-fluorocyclohexyl)-3-ethyl urea

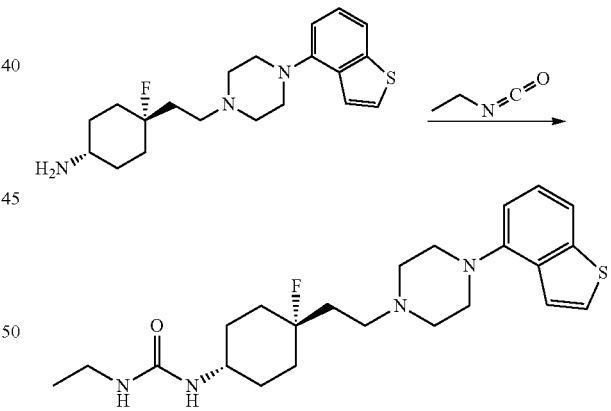

Cis-4-(2-(4-(benzo[b]thiophen-4-yl)piperazin-1-yl)ethyl)-4-fluorocyclohexan-1-am me and triethylamine were dissolved in anhydrous dichloromethane. Isocyanatoethane was added dropwise, and the reaction solution was stirred at room temperature for 1 hour. Water was added to the reaction solution, which was then extracted with ethyl acetate. The organic phases were combined, washed with saturated brine, dried over anhydrous sodium sulfate and filtered. The filtrate was concentrated under reduced pressure, and purified by preparative chromatography to obtain 1-(cis-4-(2-(4-(benzo[b]thiophen-4-yl)piperazin-1-yl)ethyl)-4-fluorocyclohexyl)-3-ethyl urea (37.2 mg, yield: 66%).

MS m/z (ESI): 433.2[M+H]⁺.
¹H NMR (400 MHz, DMSO) δ 7.69 (d, J=5.5 Hz, 1H), 7.61 (d, J=8.0 Hz, 1H), 7.40 (d, J=5.5 Hz, 1H), 7.27 (t, J=7.8 Hz, 1H), 6.94-6.87 (m, 1H), 5.74 (d, J=7.9 Hz, 1H), 5.62 (t, J=5.5 Hz, 1H), 3.44-3.34 (m, 1H), 3.14-3.03 (m, 4H), 3.03-2.94 (m, 2H), 2.71-2.55 (m, 4H), 2.46 (s, 2H), 1.88-1.73 (m, 4H), 1.71-1.61 (m, 2H), 1.61-1.43 (m, 2H), 1.40-1.26 (m, 2H), 0.97 (t, J=7.2 Hz, 3H).

Example 17

N-(Cis-4-(2-(4-(benzo[b]thiophen-4-yl)piperazin-1-yl)ethyl)-4-fluorocyclohexyl)pyrrolidine-1-carboxamide

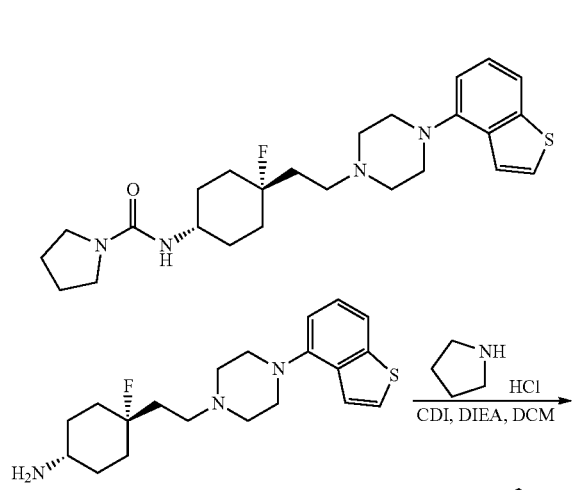

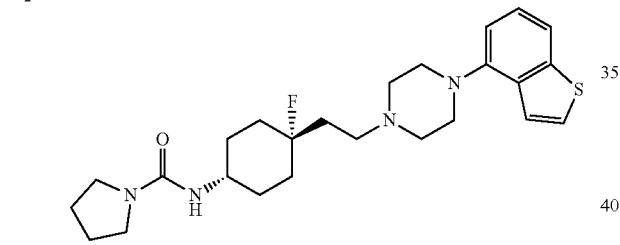

N-(Cis-4-(2-(4-(benzo[b]thiophen-4-yl)piperazin-1-yl)ethyl)-4-fluorocyclohexyl)pyrrolidine-1-carboxamide was obtained according to Step 3 of Example 8 with cis-4-(2-(4-(benzo[b]thiophen-4-yl)piperazin-1-yl)ethyl)-4-fluorocyclohexan-1-amine and pyrrole hydrochloride as the starting materials.

MS m/z (ESI): 459.2[M+H]⁺.

Example 18

1-(Cis-4-(2-(4-(benzo[b]thiophen-4-yl)piperazin-1-yl)ethyl)-4-fluorocyclohexyl)-3-cyclopropylurea

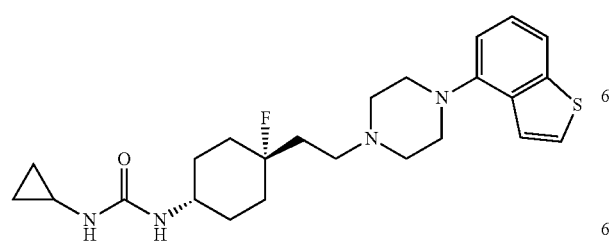

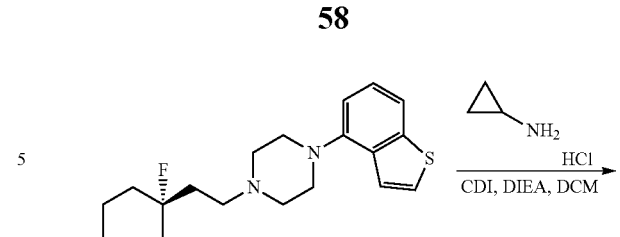

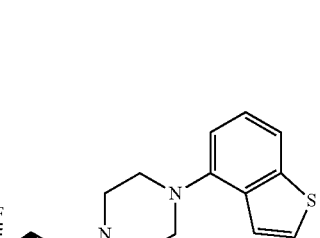

1-(Cis-4-(2-(4-(benzo[b]thiophen-4-yl)piperazin-1-yl)ethyl)-4-fluorocyclohexyl)-3-cyclopropylurea was obtained according to Step 3 of Example 8 with cis-4-(2-(4-(benzo[b]thiophen-4-yl)piperazin-1-yl)ethyl)-4-fluorocyclohexan-1-amine and cyclopropanamine hydrochloride as the starting materials.

MS m/z (ESI): 445.2[M+H]⁺.

Example 19

3-(4-(2-(4-(2,3-Dichlorophenyl)piperazin-1-yl)ethyl)-4-methylcyclohexyl)-1,1-dimethyl urea

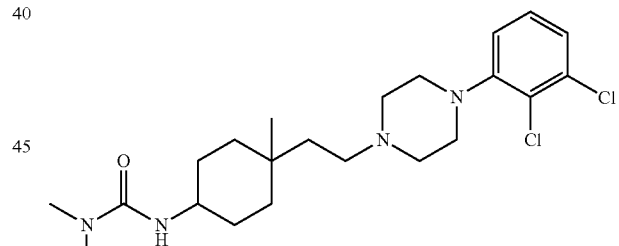

Step 1: Preparation of ethyl (1r,4r)-4-(1,3-dioxoisoindolin-2-yl)cyclohexane-1-carboxylate

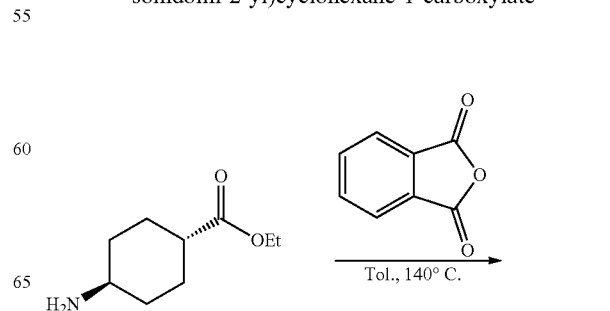

-continued

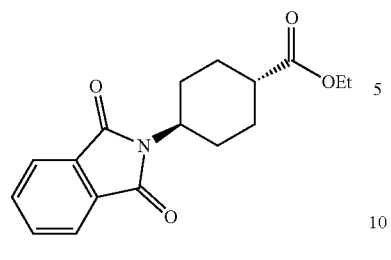

Ethyl (1r,4r)-4-aminocyclohexane-1-carboxylate (5 g, 29 mmol) was dissolved in toluene (200 mL). Triethylamine (8.8 g, 88 mmol) and isobenzofuran-1,3-dione (5.2 g, 35 mmol) were added, and the reaction solution was stirred at 140° C. for 8 hours. The reaction solution was cooled to room temperature, and concentrated to dryness by rotary evaporation. Water (50 mL) was added, and the solution was stirred for half an hour. Solids were precipitated and filtered. The solids were collected, and concentrated to dryness by rotary evaporation to obtain ethyl (1r,4r)-4-(1,3-dioxoisoindolin-2-yl)cyclohexane-1-carboxylate (3 g).

MS m/z (ESI): 302.2 [M+H]$^+$.

Step 2: Preparation of ethyl 4-(1,3-dioxoisoindolin-2-yl)-1-methylcyclohexane-1-carboxylate

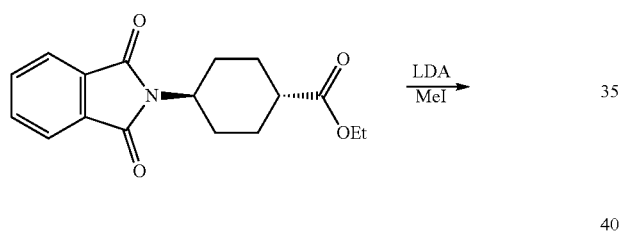

Ethyl (1r,4r)-4-(1,3-dioxoisoindolin-2-yl)cyclohexane-1-carboxylate (3 g, 10 mmol) was dissolved in tetrahydrofuran (50 mL), and cooled to −78° C. Lithium diisopropylamide (11 mL, 11 mmol) was added, and the reaction solution was stirred at −78° C. for half an hour. Iodomethane (1.7 g, 12 mmol) was added, and the reaction solution was slowly warmed up to room temperature and stirred overnight. Aqueous solution of ammonium chloride (50 mL) was added, and the solution was stirred for half an hour. The aqueous phase was extracted with ethyl acetate (100 mL×2). The organic phases were combined, dried over anhydrous sodium sulfate, filtered and concentrated to obtain ethyl 4-(1,3-dioxoisoindolin-2-yl)-1-methylcyclohexane-1-carboxylate (3.0 g, yield: 100%, crude).

Step 3: Preparation of 2-(4-(hydroxymethyl)-4-methylcyclohexyl)isoindoline-1,3-dione

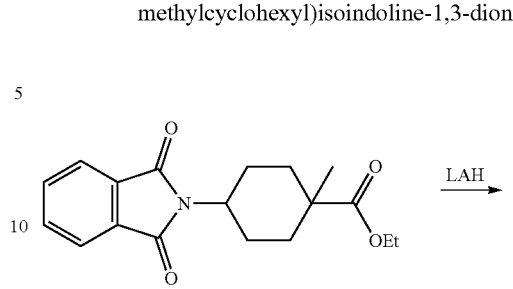

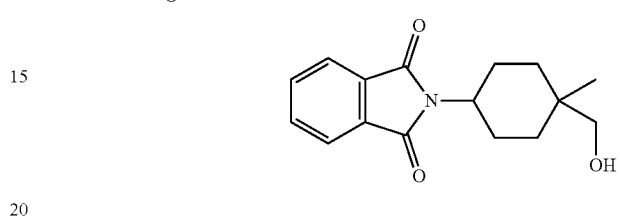

Ethyl 4-(1,3-dioxoisoindolin-2-yl)-1-methylcyclohexane-1-carboxylate (3 g, 9.5 mmol) was dissolved in tetrahydrofuran (30 mL), and cooled to 0° C. Lithium aluminum hydride (0.43 g, 11 mmol) was added, and the reaction solution was stirred at 0° C. for 2 hours. Aqueous solution of sodium hydroxide (3 M, 5 mL) was added to quench the reaction, followed by the addition of water (50 mL). The aqueous phase was extracted with ethyl acetate (100 mL×2). The organic phases were combined, dried over anhydrous sodium sulfate, filtered and concentrated to obtain 2-(4-(hydroxymethyl)-4-methylcyclohexyl)isoindoline-1,3-dione (2.6 g, yield: 100%, crude).

Step 4: Preparation of 4-(1,3-dioxoisoindolin-2-yl)-1-methylcyclohexane-1-carbaldehyde

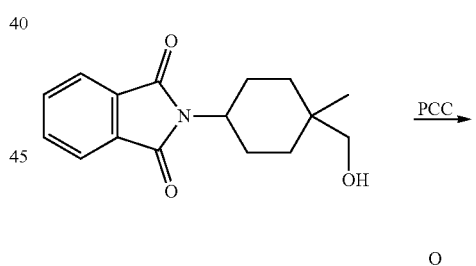

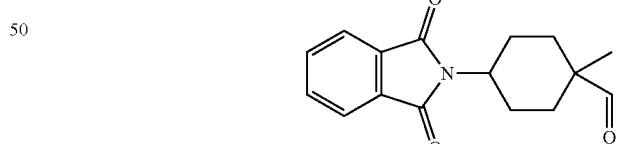

2-(4-(Hydroxymethyl)-4-methylcyclohexyl)isoindoline-1,3-dione (2.6 g, 9.5 mmol) was dissolved in dichloromethane (30 mL). PCC (4.1 g, 19 mmol) was added, and the reaction solution was stirred at room temperature for 2 hours. The reaction solution was concentrated to dryness by rotary evaporation, and the resulting crude product was purified by column chromatography (petroleum ether/ethyl acetate: 50/1~1/1) to obtain 4-(1,3-dioxoisoindolin-2-yl)-1-methylcyclohexane-1-carbaldehyde (1.5 g).

MS m/z (ESI): 272.2 [M+H]$^+$.

Step 5: Preparation of 2-(4-methyl-4-vinylcyclohexyl)isoindoline-1,3-dione

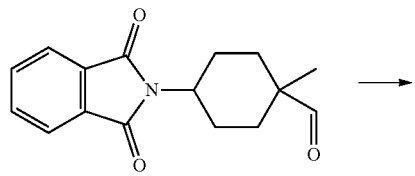

Methyltriphenylphosphonium bromide (2.9 g, 8.3 mmol) was dissolved in tetrahydrofuran (50 mL). The solution was purged with N₂, and cooled to 0° C. Potassium tert-butoxide (1.1 g, 10 mmol) was added, and the reaction solution was stirred at room temperature for 2 hours. The reaction solution was cooled to 0° C., followed by the addition of a solution of 4-(1,3-dioxoisoindolin-2-yl)-1-methylcyclohexane-1-carbaldehyde (1.5 g, 5.5 mmol) in tetrahydrofuran (10 mL). The reaction solution was stirred at room temperature for 2 hours and then at 50° C. overnight. Water (100 mL) was added to quench the reaction, and the aqueous phase was extracted with ethyl acetate (100 mL). The organic phases were combined, dried over anhydrous sodium sulfate, filtered and concentrated. The resulting crude product was purified by column chromatography (petroleum ether/ethyl acetate: 50/1~1/1) to obtain 2-(4-methyl-4-vinylcyclohexyl)isoindoline-1,3-dione (1.2 g).

MS m/z (ESI): 270.2 [M+H]⁺.

Step 6: Preparation of 2-(4-(2-hydroxyethyl)-4-methylcyclohexyl)isoindoline-1,3-dione

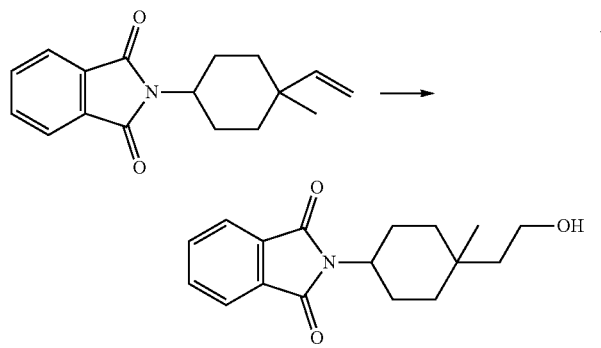

2-(4-Methyl-4-vinylcyclohexyl)isoindoline-1,3-dione (1.2 g, 4.5 mmol) was dissolved in anhydrous tetrahydrofuran (20 mL). The solution was cooled to 0° C., and BH₃/THF (13.5 mL, 13.5 mmol) was added dropwise. The reaction solution was stirred at room temperature for 3 hours, and TLC showed that the reaction was complete. The reaction solution was cooled to 0° C., 3M NaOH aqueous solution (4 mL) was slowly added, followed by the addition of water (3 mL). The reaction solution was stirred at room temperature for 2 hours, and TLC showed that the reaction was complete. Ethyl acetate (50 mL) was added, and the solution was washed with saturated aqueous solution of Na₂S₂O₃ (30 mL) and water (30 mL). The organic phase was dried over anhydrous sodium sulfate, filtered and concentrated to obtain the crude product (1.2 g, yield: 100%, crude), which was directly used in the next step.

MS m/z (ESI): 288.2 [M+H]⁺.

Step 7: Preparation of 2-(4-(1,3-dioxoisoindolin-2-yl)-1-methylcyclohexyl)ethyl 4-methylbenzenesulfonate

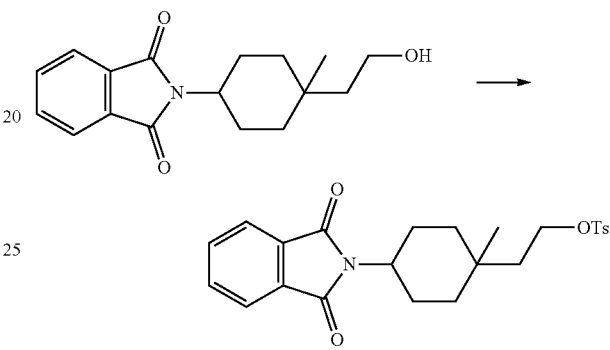

2-(4-(2-Hydroxyethyl)-4-methylcyclohexyl)isoindoline-1,3-dione (1.2 g, 4.5 mmol) was dissolved in dichloromethane (20 mL). Triethylamine (1.4 g, 13.4 mmol) and p-toluenesulfonyl chloride (1.0 g, 5.4 mmol) were added, and the reaction solution was stirred at room temperature overnight. The reaction solution was concentrated to dryness by rotary evaporation, and the resulting crude product was purified by column chromatography (petroleum ether/ethyl acetate: 50/1~1/1) to obtain 2-(4-(1,3-dioxoisoindolin-2-yl)-1-methylcyclohexyl)ethyl 4-methylbenzenesulfonate (1.5 g).

MS m/z (ESI): 442.2 [M+H]⁺.

Step 8: Preparation of 2-(4-(2-(4-(2,3-dichlorophenyl)piperazin-1-yl)ethyl)-4-methylcyclohexyl)isoindoline-1, 3-dione

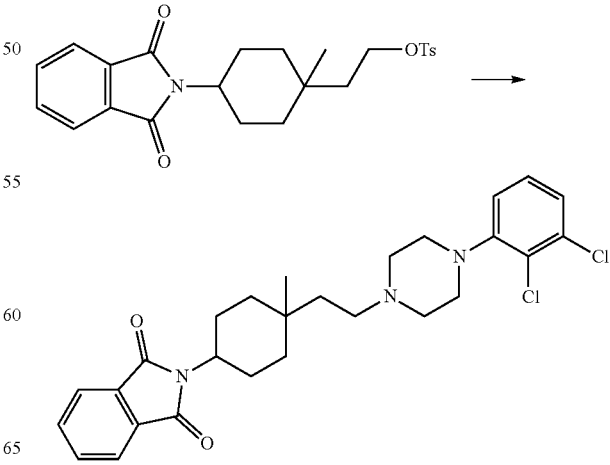

2-(4-(1,3-Dioxoisoindolin-2-yl)-1-methylcyclohexyl) ethyl 4-methylbenzenesulfonate (1.5 g, 3.4 mmol), 1-(2,3-dichlorophenyl)piperazine (0.79 g, 3.4 mmol) and potassium carbonate (1.4 g, 10.2 mmol) were dissolved in acetonitrile (30 mL), and the reaction solution was stirred at 80° C. overnight. The reaction solution was filtered, and concentrated to dryness by rotary evaporation. The resulting crude product was purified by column chromatography (petroleum ether/ethyl acetate: 50/1~1/1) to obtain 2-(4-(2-(4-(2,3-dichlorophenyl)piperazin-1-yl)ethyl)-4-methylcyclohexyl) isoindoline-1,3-dione (1.4 g).

MS m/z (ESI): 500.2 [M+H]⁺.

Step 9: Preparation of 4-(2-(4-(2,3-dichlorophenyl) piperazin-1-yl)ethyl)-4-methylcyclohexan-1-amine

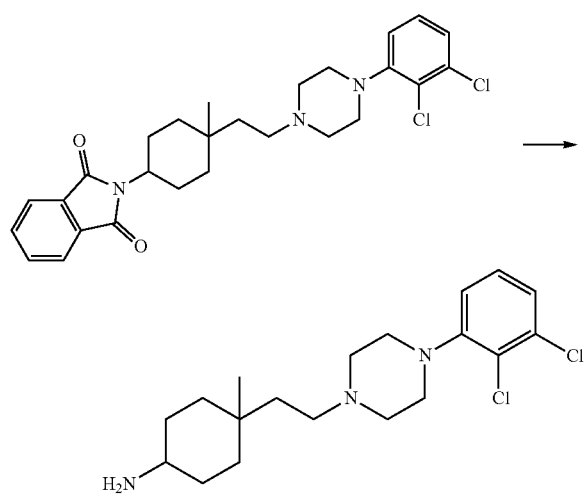

2-(4-(2-(4-(2,3-Dichlorophenyl)piperazin-1-yl)ethyl)-4-methylcyclohexyl)isoindoline-1,3-dione (1.4 g, 2.8 mmol) was dissolved in ethanol (50 mL). Hydrazine hydrate (0.35 mL, 7.0 mmol) was added, and the reaction solution was stirred at 80° C. overnight. The reaction solution was concentrated to dryness by rotary evaporation, followed by the addition of water (50 mL). The aqueous phase was extracted with ethyl acetate (50 mL×2). The organic phases were combined, dried over anhydrous sodium sulfate, filtered and concentrated to obtain 4-(2-(4-(2,3-dichlorophenyl)piperazin-1-yl)ethyl)-4-methylcyclohexan-1-amine (0.6 g).

MS m/z (ESI): 370.2 [M+H]⁺.

Step 10: Preparation of 3-(4-(2-(4-(2,3-dichlorophenyl)piperazin-1-yl)ethyl)-4-methylcyclohexyl)-1,1-dimethyl urea

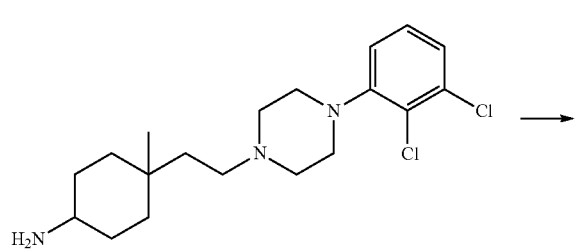

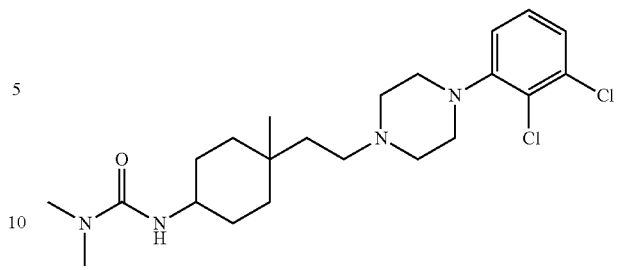

4-(2-(4-(2,3-Dichlorophenyl)piperazin-1-yl)ethyl)-4-methylcyclohexan-1-amine (50 mg, 0.14 mmol) was dissolved in dichloromethane (5 mL). Triethylamine (71 mg, 0.7 mmol) and dimethylcarbamic chloride (299 mg, 2.3 mmol) were added, and the reaction solution was stirred at room temperature overnight. The reaction solution was concentrated to dryness by rotary evaporation, and the resulting crude product was purified by high performance liquid chromatography to obtain 3-(4-(2-(4-(2,3-dichlorophenyl)piperazin-1-yl)ethyl)-4-methylcyclohexyl)-1,1-dimethyl urea (10.0 mg).

MS m/z (ESI): 441.2 [M+H]⁺.

Example 20

3-(4-(2-(4-(Benzo[b]thiophen-4-yl)piperazin-1-yl) ethyl)-4-methylcyclohexyl)-1,1-dimethylurea

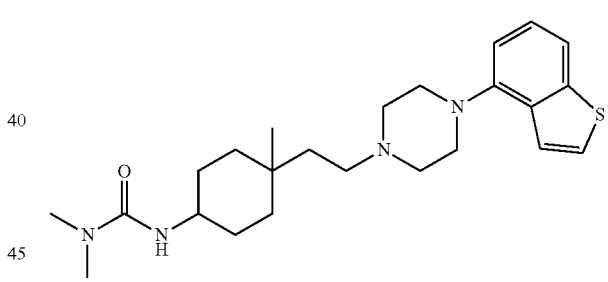

Step 1: Preparation of ethyl (1r,4r)-4-(1,3-dioxoisoindolin-2-yl)cyclohexane-1-carboxylate

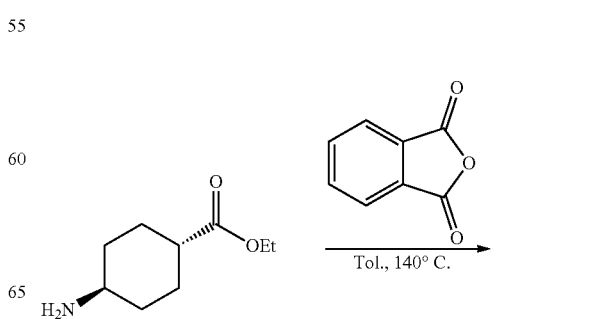

-continued

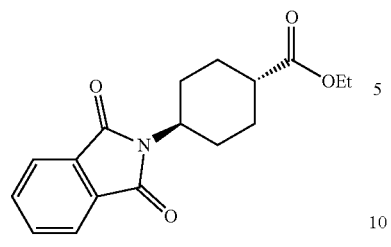

Ethyl (1r,4r)-4-aminocyclohexane-1-carboxylate (5 g, 29 mmol) was dissolved in toluene (200 mL). Triethylamine (8.8 g, 88 mmol) and isobenzofuran-1,3-dione (5.2 g, 35 mmol) were added, and the reaction solution was stirred at 140° C. for 8 hours. The reaction solution was cooled to room temperature, and concentrated to dryness by rotary evaporation. Water (50 mL) was added, and the solution was stirred for half an hour. Solids were precipitated, and the solution was filtered. The solids were collected, and concentrated to dryness by rotary evaporation to obtain ethyl (1r,4r)-4-(1,3-dioxoisoindolin-2-yl)cyclohexane-1-carboxylate (3 g).

MS m/z (ESI): 302.2 [M+H]$^+$.

Step 2: Preparation of ethyl 4-(1,3-dioxoisoindolin-2-yl)-1-methylcyclohexane-1-carboxylate

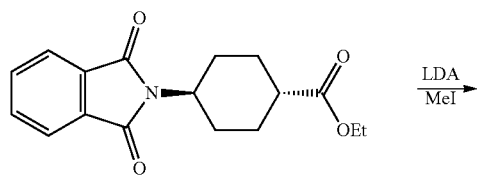

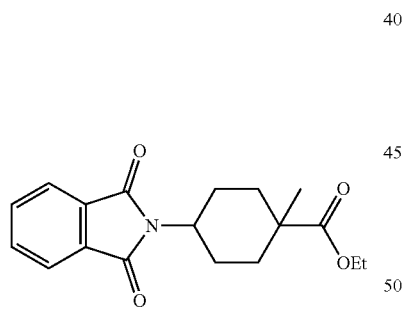

Ethyl (1r,4r)-4-(1,3-dioxoisoindolin-2-yl)cyclohexane-1-carboxylate (3 g, 10 mmol) was dissolved in tetrahydrofuran (50 mL), and cooled to −78° C. Lithium diisopropylamide (11 mL, 11 mmol) was added, and the reaction solution was stirred at −78° C. for half an hour. Iodomethane (1.7 g, 12 mmol) was added, and the reaction solution was slowly warmed up to room temperature and stirred overnight. Aqueous solution of ammonium chloride (50 mL) was added, and the solution was stirred for half an hour. The aqueous phase was extracted with ethyl acetate (100 mL×2). The organic phases were combined, dried over anhydrous sodium sulfate, filtered and concentrated to obtain ethyl 4-(1,3-dioxoisoindolin-2-yl)-1-methylcyclohexane-1-carboxylate (3.0 g, yield: 100%, crude).

Step 3: Preparation of 2-(4-(hydroxymethyl)-4-methylcyclohexyl)isoindoline-1,3-dione

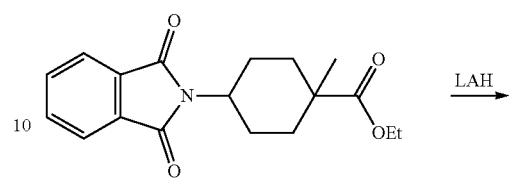

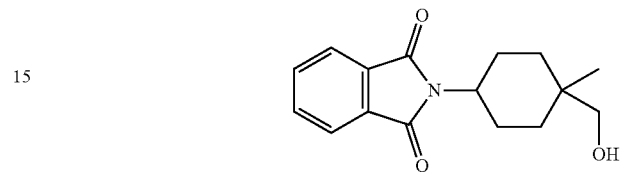

Ethyl 4-(1,3-dioxoisoindolin-2-yl)-1-methylcyclohexane-1-carboxylate (3 g, 9.5 mmol) was dissolved in tetrahydrofuran (30 mL), and cooled to 0° C. Lithium aluminum hydride (0.43 g, 11 mmol) was added, and the reaction solution was stirred at 0° C. for 2 hours. Aqueous solution of sodium hydroxide (3 M, 5 mL) was added to quench the reaction, followed by the addition of water (50 mL). The aqueous phase was extracted with ethyl acetate (100 mL×2). The organic phases were combined, dried over anhydrous sodium sulfate, filtered and concentrated to obtain 2-(4-(hydroxymethyl)-4-methylcyclohexyl)isoindoline-1,3-dione (2.6 g, yield: 100%, crude).

Step 4: Preparation of 4-(1,3-dioxoisoindolin-2-yl)-1-methylcyclohexane-1-carbaldehyde

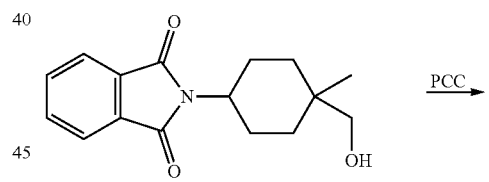

2-(4-(Hydroxymethyl)-4-methylcyclohexyl)isoindoline-1,3-dione 2.6 g, 9.5 mmol) was dissolved in dichloromethane (30 mL). PCC (4.1 g, 19 mmol) was added, and the reaction solution was stirred at room temperature for 2 hours. The reaction solution was concentrated to dryness by rotary evaporation, and the resulting crude product was purified by column chromatography (petroleum ether/ethyl acetate: 50/1~1/1) to obtain 4-(1,3-dioxoisoindolin-2-yl)-1-methylcyclohexane-1-carbaldehyde (1.5 g).

MS m/z (ESI): 272.2 [M+H]$^+$.

Step 5: Preparation of 2-(4-methyl-4-vinylcyclohexyl)isoindoline-1,3-dione

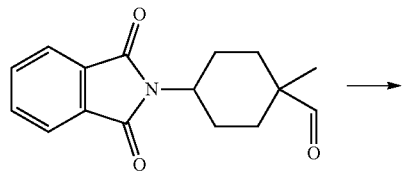

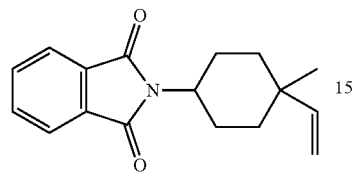

Methyltriphenylphosphonium bromide (2.9 g, 8.3 mmol) was dissolved in tetrahydrofuran (50 mL). The solution was purged with N₂, and cooled to 0° C. Potassium tert-butoxide (1.1 g, 10 mmol) was added, and the reaction solution was stirred at room temperature for 2 hours. The reaction solution was cooled to 0° C., followed by the addition of a solution of 4-(1,3-dioxoisoindolin-2-yl)-1-methylcyclohexane-1-carbaldehyde (1.5 g, 5.5 mmol) in tetrahydrofuran (10 mL). The reaction solution was stirred at room temperature for 2 hours and then at 50° C. overnight. Water (100 mL) was added to quench the reaction, and the aqueous phase was extracted with ethyl acetate (100 mL). The organic phases were combined, dried over anhydrous sodium sulfate, filtered and concentrated. The resulting crude product was purified by column chromatography (petroleum ether/ethyl acetate: 50/1~1/1) to obtain 2-(4-methyl-4-vinylcyclohexyl)isoindoline-1,3-dione (1.2 g).

MS m/z (ESI): 270.2 [M+H]⁺.

Step 6: Preparation of 2-(4-(2-hydroxyethyl)-4-methylcyclohexyl)isoindoline-1,3-dione

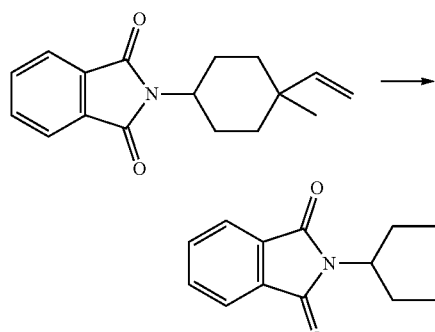

2-(4-Methyl-4-vinylcyclohexyl)isoindoline-1,3-dione (1.2 g, 4.5 mmol) was dissolved in anhydrous tetrahydrofuran (20 mL). The solution was cooled to 0° C., and BH₃/THF (13.5 mL, 13.5 mmol) was added dropwise. The reaction solution was stirred at room temperature for 3 hours, and TLC showed that the reaction was complete. The reaction solution was cooled to 0° C., aqueous solution of NaOH (3M, 4 mL) was slowly added, followed by the addition of water (3 mL). The reaction solution was stirred at room temperature for 2 hours, and TLC showed that the reaction was complete. Ethyl acetate (50 mL) was added, and the solution was washed with saturated aqueous solution of Na₂S₂O₃ (30 mL) and water (30 mL). The organic phase was dried over anhydrous sodium sulfate, filtered and concentrated to obtain the crude product (1.2 g, yield: 100%, crude), which was directly used in the next step.

MS m/z (ESI): 288.2 [M+H]⁺.

Step 7: Preparation of 2-(4-(1,3-dioxoisoindolin-2-yl)-1-methylcyclohexyl)ethyl 4-methylbenzenesulfonate

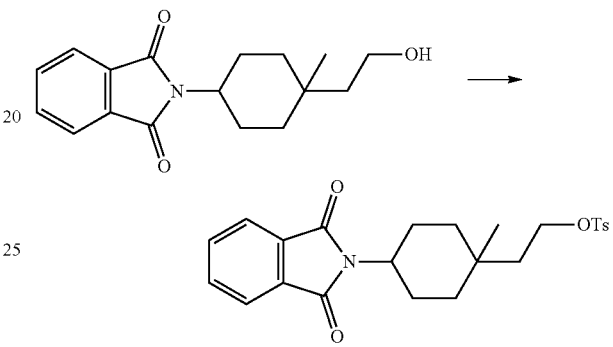

2-(4-(2-Hydroxyethyl)-4-methylcyclohexyl)isoindoline-1,3-dione (1.2 g, 4.5 mmol) was dissolved in dichloromethane (20 mL). Triethylamine (1.4 g, 13.4 mmol) and p-toluenesulfonyl chloride (1.0 g, 5.4 mmol) were added, and the reaction solution was stirred at room temperature overnight. The reaction solution was concentrated to dryness by rotary evaporation, and the resulting crude product was purified by column chromatography (petroleum ether/ethyl acetate: 50/1~1/1) to obtain 2-(4-(1,3-dioxoisoindolin-2-yl)-1-methylcyclohexyl)ethyl 4-methylbenzenesulfonate (1.5 g).

MS m/z (ESI): 442.2 [M+H]⁺.

Step 8: Preparation of 3-(4-(2-(4-(benzo[b]thiophen-4-yl)piperazin-1-yl)ethyl)-4-methylcyclohexyl)isoindoline-1,3-dione

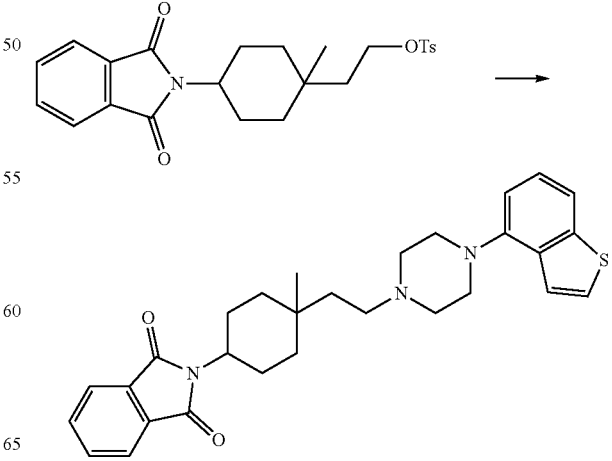

2-(4-(1,3-Dioxoisoindolin-2-yl)-1-methylcyclohexyl) ethyl 4-methylbenzenesulfonate (1.5 g, 3.4 mmol), 1-(benzo[b]thiophen-4-yl)piperazine (0.79 g, 3.4 mmol) and potassium carbonate (1.4 g, 10.2 mmol) were dissolved in acetonitrile (30 mL), and the reaction solution was stirred at 80° C. overnight. The reaction solution was filtered, and concentrated to dryness by rotary evaporation. The resulting crude product was purified by column chromatography (petroleum ether/ethyl acetate: 50/1~1/1) to obtain 3-(4-(2-(4-(benzo[b]thiophen-4-yl)piperazin-1-yl)ethyl)-4-methyl-cyclohexyl)isoindoline-1,3-dione (1.4 g).

MS m/z (ESI): 500.2 [M+H]$^+$.

Step 9: 3-(4-(2-(4-(Benzo[b]thiophen-4-yl)piperazin-1-yl)ethyl)-4-methylcyclohexan-1-amine

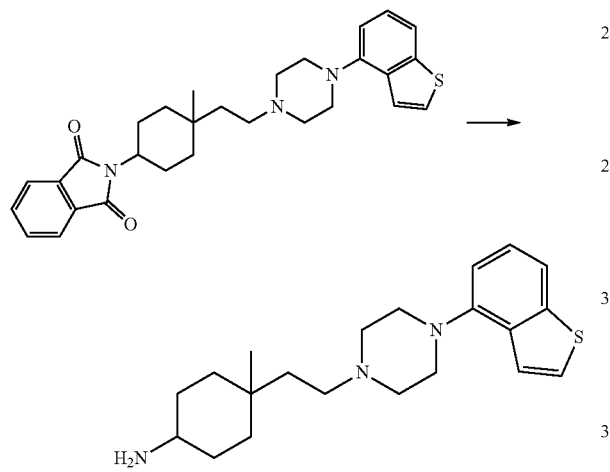

3-(4-(2-(4-(Benzo[b]thiophen-4-yl)piperazin-1-yl)ethyl)-4-methylcyclohexyl)isoindoline-1,3-dione (1.4 g, 2.8 mmol) was dissolved in ethanol (50 mL). Hydrazine hydrate (0.35 mL, 7.0 mmol) was added, and the reaction solution was stirred at 80° C. overnight. The reaction solution was concentrated to dryness by rotary evaporation, followed by the addition of water (50 mL). The aqueous phase was extracted with ethyl acetate (50 mL×2). The organic phases were combined, dried over anhydrous sodium sulfate, filtered and concentrated to obtain 3-(4-(2-(4-(benzo[b]thiophen-4-yl)piperazin-1-yl)ethyl)-4-methylcyclohexan-1-amine (0.6 g).

MS m/z (ESI): 370.2 [M+H]$^+$.

Step 10: 3-(4-(2-(4-(Benzo[b]thiophen-4-yl)piperazin-1-yl)ethyl)-4-methylcyclohexyl)-1,1-dimethyl-urea

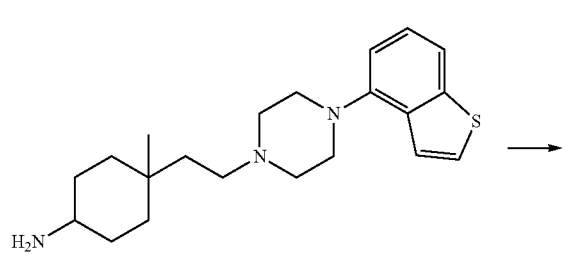

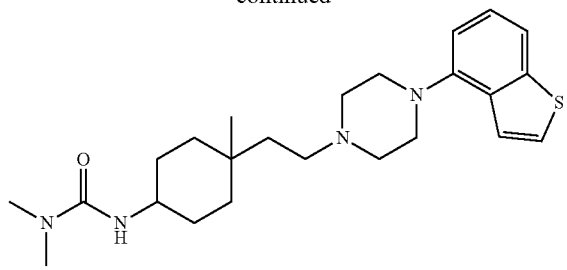

3-(4-(2-(4-(Benzo[b]thiophen-4-yl)piperazin-1-yl)ethyl)-4-methylcyclohexan-1-amine (50 mg, 0.14 mmol) was dissolved in dichloromethane (5 mL). Triethylamine (71 mg, 0.7 mmol) and dimethylcarbamic chloride (299 mg, 2.3 mmol) were added, and the reaction solution was stirred at room temperature overnight. The reaction solution was concentrated to dryness by rotary evaporation, and the resulting crude product was purified by high performance liquid chromatography by referring to Example 19 to obtain 3-(4-(2-(4-(benzo[b]thiophen-4-yl)piperazin-1-yl)ethyl)-4-methylcyclohexyl)-1,1-dimethylurea (20.0 mg).

MS m/z (ESI): 429.2 [M+H]$^+$.

Example 21

3-(4-(2-(4-(Benzo[b]thiophen-4-yl)piperazin-1-yl)ethyl)cyclohex-3-en-1-yl)-1,1-dimethylurea

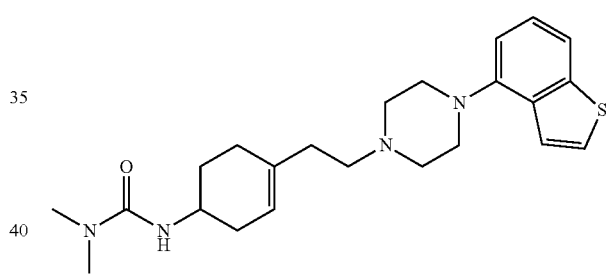

Step 1: Preparation of tert-butyl (4-(2-(4-(benzo[b]thiophen-4-yl)piperazin-1-yl)ethyl)cyclohex-3-en-1-yl)carbamate

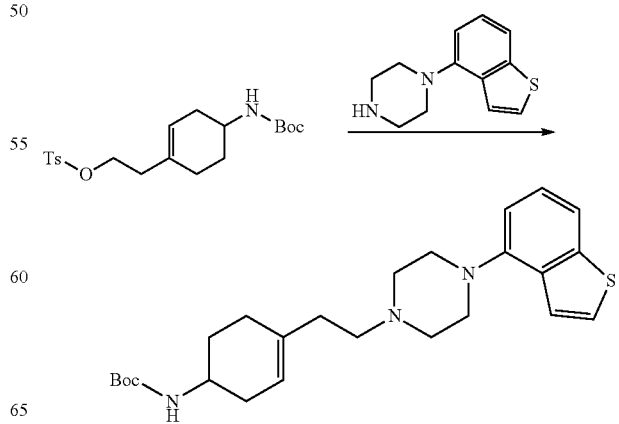

Tert-butyl (4-(2-(4-(benzo[b]thiophen-4-yl)piperazin-1-yl)ethyl)cyclohex-3-en-1-yl)carbamate (400 mg, yield: 72%) was obtained according to Step 6 of Example 12 with 2-(4-(((tert-butoxycarbonyl)amino)cyclohex-1-en-1-yl)ethyl 4-methylbenzenesulfonate and 1-(benzo[b]thiophen-4-yl) piperazine as the starting materials.

MS m/z (ESI): 442.2[M+H]$^+$.

Step 2: Preparation of 4-(2-(4-(benzo[b]thiophen-4-yl)piperazin-1-yl)ethyl)cyclohex-3-en-1-amine

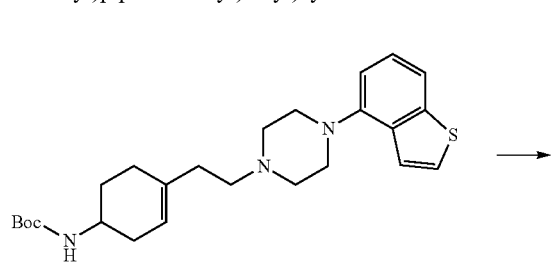

4-(2-(4-(Benzo[b]thiophen-4-yl)piperazin-1-yl)ethyl)cyclohex-3-en-1-amine (280 mg, yield: 91%) was obtained by referring to Step 7 of Example 12 with tert-butyl (4-(2-(4-(benzo[b]thiophen-4-yl)piperazin-1-yl)ethyl)cyclohex-3-en-1-yl)carbamate as the starting material.

MS m/z (ESI): 342.1[M+H]$^+$.

Step 3: Preparation of 3-(4-(2-(4-(benzo[b]thiophen-4-yl)piperazin-1-yl)ethyl)cyclohex-3-en-1-yl)-1,1-dimethylurea

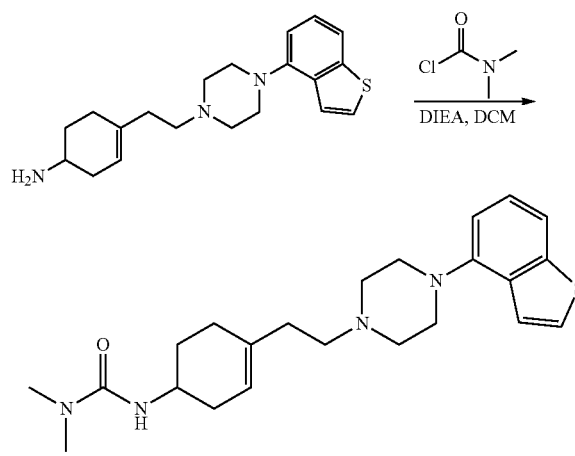

3-(4-(2-(4-(Benzo[b]thiophen-4-yl)piperazin-1-yl)ethyl)cyclohex-3-en-1-yl)-1,1-dimethylurea was obtained according to Step 8 of Example 12 with 4-(2-(4-(benzo[b]thiophen-4-yl)piperazin-1-yl)ethyl)cyclohex-3-en-1-amine as the starting material.

MS m/z (ESI): 413.2[M+H]$^+$.

Example 22

1-(4-(2-(4-(Benzo[b]thiophen-4-yl)piperazin-1-yl)ethyl)cyclohex-3-en-1-yl)-3-propylurea

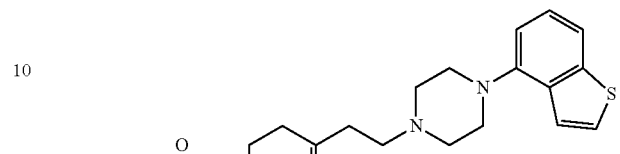

Step 1: Preparation of 1-(4-(2-(4-(benzo[b]thiophen-4-yl)piperazin-1-yl)ethyl)cyclohex-3-en-1-yl)-3-propylurea

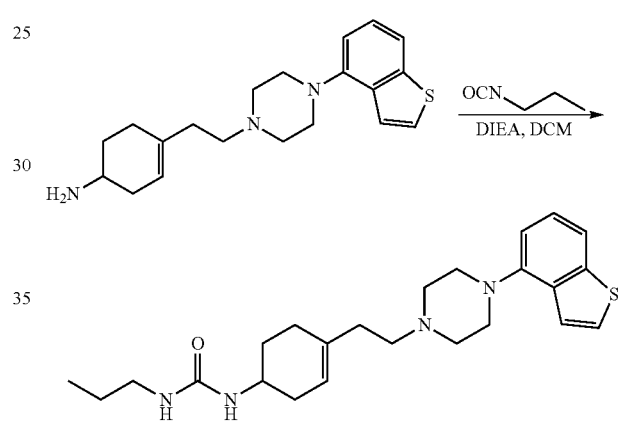

1-(4-(2-(4-(Benzo[b]thiophen-4-yl)piperazin-1-yl)ethyl)cyclohex-3-en-1-yl)-3-propylurea was obtained according to Step 8 of Example 12 or Example 16 with 4-(2-(4-(benzo[b]thiophen-4-yl)piperazin-1-yl)ethyl)cyclohex-3-en-1-amine and isocyanatopropane as the starting materials.

MS m/z (ESI): 427.2[M+H]$^+$.

Example 23

3-(4-(2-(4-(Benzo[b]thiophen-4-yl)piperazin-1-yl)ethyl)-2-fluorocyclohexyl)-1,1-dimethylurea

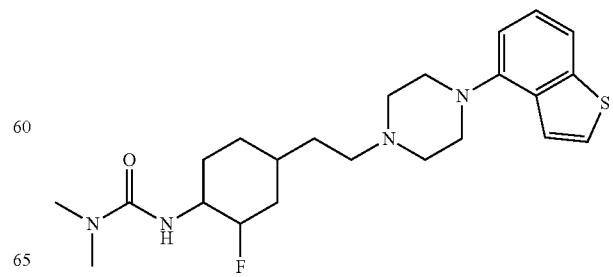

3-(4-(2-(4-(Benzo[b]thiophen-4-yl)piperazin-1-yl)ethyl)-2-fluorocyclohexyl)-1,1-dimethylurea was obtained according to Step 8 of Example 12 with 4-(2-(4-(benzo[b]thiophen-4-yl)piperazin-1-yl)ethyl)-2-fluorocyclohexane-1-amine and dimethylcarbamic chloride as the starting materials.

MS m/z (ESI): [M+H]$^+$. 433.2

Example 24

1-(4-(2-(4-(Benzo[b]thiophen-4-yl)piperazin-1-yl)ethyl)-2-fluorocyclohexyl)-3-ethylurea

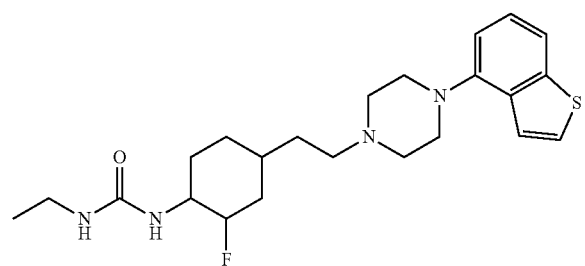 [SMILES: CCNC(=O)NC1CCC(CCN2CCN(c3cccc4sccc34)CC2)CC1F]

1-(4-(2-(4-(Benzo[b]thiophen-4-yl)piperazin-1-yl)ethyl)-2-fluorocyclohexyl)-3-eth ylurea was obtained according to Step 8 of Example 12 or Example 16 with 4-(2-(4-(benzo[b]thiophen-4-yl)piperazin-1-yl)ethyl)-2-fluorocyclohexane-1-amine and isocyanatoethane as the starting materials.

MS m/z (ESI): [M+H]$^+$ 433.2

Example 25

1-(4-(2-(4-(2,3-Dichlorophenyl)piperazin-1-yl)ethyl)-1-methylcyclohexyl)-3-ethylurea

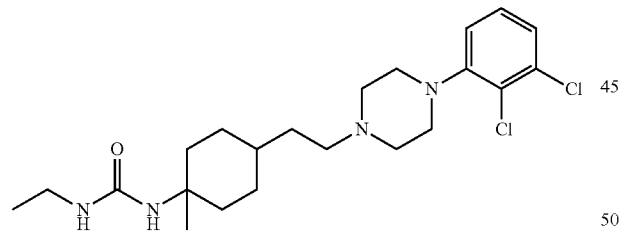

Step 1: Preparation of 1-(4-(2-(4-(2,3-dichlorophenyl)piperazin-1-yl)ethyl)-1-methylcyclohexyl)-3-ethylurea

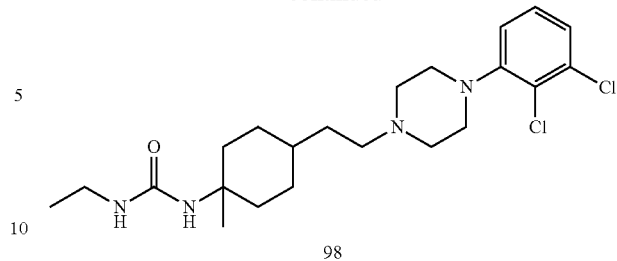

98

4-(2-(4-(2,3-Dichlorophenyl)piperazin-1-yl)ethyl)-1-methylcyclohexan-1-amine (60 mg, 0.16 mmol) was dissolved in dichloromethane (3 mL). Triethylamine (48.5 mg, 0.48 mmol) was added, and the reaction solution was stirred at room temperature for 5 minutes. Isocyanatoethane (17.3 mg, 0.24 mmol) was added, and the reaction solution was stirred at room temperature overnight. The reaction solution was concentrated to dryness by rotary evaporation, and the resulting crude product was purified by high performance liquid chromatography to obtain 1-(4-(2-(4-(2,3-dichlorophenyl)piperazin-1-yl)ethyl)-1-methylcyclohexyl)-3-ethylurea (11.9 mg, yield: 17%).

MS m/z (ESI): 441.2 [M+H]$^+$.

$^1$H NMR (400 MHz, CDCl$_3$) δ 7.21-7.11 (m, 2H), 7.01-6.95 (m, 1H), 4.25-4.00 (m, 2H), 3.26-3.13 (m, 5H), 2.91-2.52 (m, 6H), 2.19-2.11 (m, 1H), 1.94-1.86 (m, 1H), 1.69-1.55 (m, 5H), 1.37-1.10 (m, 11H).

Example 26

N-(4-(2-(4-(2,3-Dichlorophenyl)piperazin-1-yl)ethyl)-1-methylcyclohexyl)-5-fluoropyrimidin-2-amine

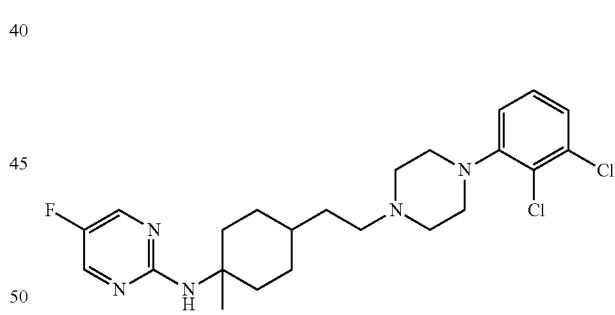

Step 1: Preparation of N-(4-(2-(4-(2,3-dichlorophenyl)piperazin-1-yl)ethyl)-1-methylcyclohexyl)-5-fluoropyrimidin-2-amine

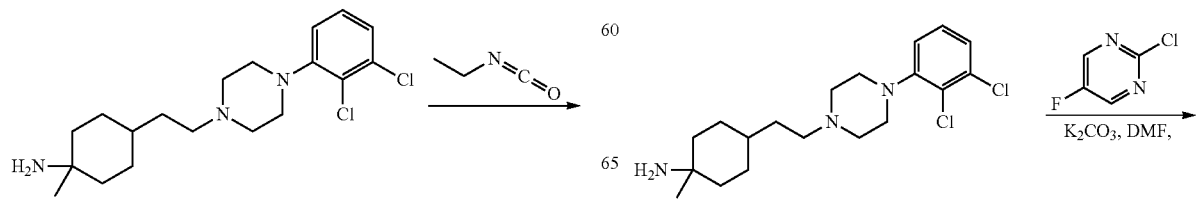

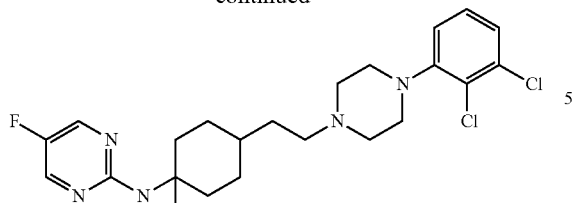

4-(2-(4-(2,3-Dichlorophenyl)piperazin-1-yl)ethyl)-1-methylcyclohexan-1-amine (50 mg, 0.14 mmol) was dissolved in N,N-dimethylformamide (3 mL). Potassium carbonate (41 mg, 0.4 mmol) and 2-chloro-5-fluoropyrimidine (40 mg, 0.3 mmol) were added, and the reaction solution was stirred at room temperature overnight. The reaction solution was concentrated to dryness by rotary evaporation, and the resulting crude product was purified by high performance liquid chromatography to obtain N-(4-(2-(4-(2,3-dichlorophenyl)piperazin-1-yl)ethyl)-1-methylcyclohexyl)-5-fluoropyrimidin-2-amine.

MS m/z (ESI): 466.1 [M+H]$^+$.

Example 27

N-(4-(2-(4-(2,3-Dichlorophenyl)piperazin-1-yl)ethyl)-1-methylcyclohexyl)-1H-indole-2-carboxamide

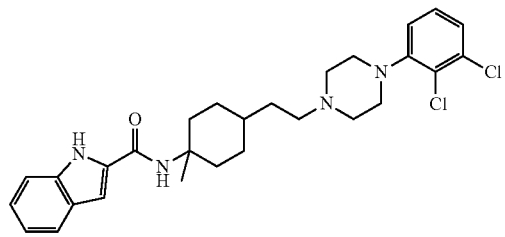 [SMILES: CC1(NC(=O)c2cc3ccccc3[nH]2)CCC(CCN2CCN(c3cccc(Cl)c3Cl)CC2)CC1]

Step 1: Preparation of N-(4-(2-(4-(2,3-dichlorophenyl)piperazin-1-yl)ethyl)-1-methylcyclohexyl)-1H-indole-2-carboxamide

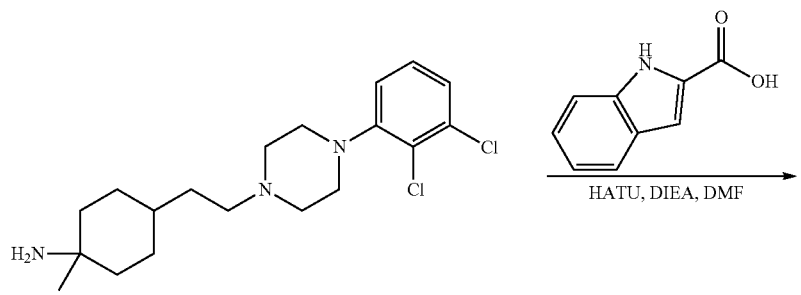

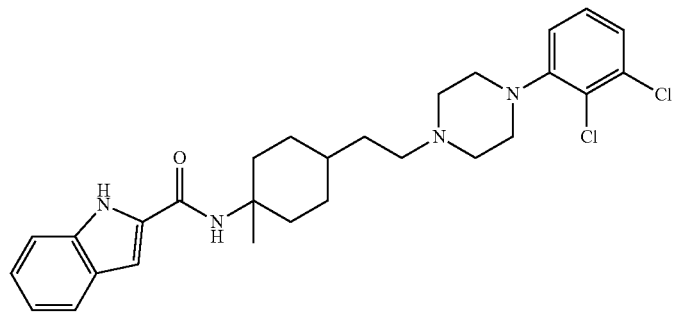

4-(2-(4-(2,3-Dichlorophenyl)piperazin-1-yl)ethyl)-1-methylcyclohexan-1-amine (50 mg, 0.14 mmol) was dissolved in N,N-dimethylformamide (3 mL). 1H-Indole-2-carboxylic acid (27 mg, 0.17 mmol), HATU (74 mg, 0.2 mmol) and diisopropylethylamine (39 mg, 0.3 mmol) were added, and the reaction solution was stirred at room temperature overnight. The reaction solution was concentrated to dryness by rotary evaporation, and the resulting crude product was purified by high performance liquid chromatography to obtain N-(4-(2-(4-(2,3-dichlorophenyl)piperazin-1-yl)ethyl)-1-methylcyclohexyl)-1H-indole-2-carboxamide.

MS m/z (ESI): 513.2 [M+H]$^+$.

Example 28

3-(4-(2-(4-(Benzo[b]thiophen-4-yl)piperazin-1-yl)ethyl)-1-methylcyclohexyl)-1,1-dimethylurea

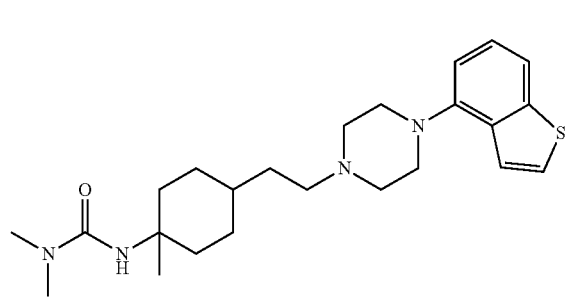 [SMILES: CN(C)C(=O)NC1(C)CCC(CCN2CCN(c3cccc4sccc34)CC2)CC1]

Step 1: Preparation of 3-(4-(2-(4-(benzo[b]thiophen-4-yl)piperazin-1-yl)ethyl)-1-methylcyclohexyl)-1,1-dimethylurea

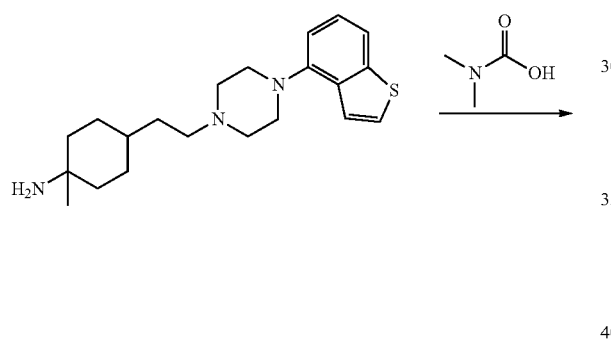

3-(4-(2-(4-(Benzo[b]thiophen-4-yl)piperazin-1-yl)ethyl)-1-methylcyclohexan)-1-amine was dissolved in N,N-dimethylformamide. Dimethylcarbamic acid, HATU and diisopropylethylamine were added, and the reaction solution was stirred at room temperature overnight. The reaction solution was concentrated to dryness by rotary evaporation, and the resulting crude product was purified by high performance liquid chromatography by referring to Example 27 to obtain 3-(4-(2-(4-(benzo[b]thiophen-4-yl)piperazin-1-yl)ethyl)-1-methylcyclohexyl)-1,1-dimethylurea.

MS m/z (ESI): 429.2 [M+H]$^+$.

Example 29

1-(4-(2-(4-(Benzo[b]thiophen-4-yl)piperazin-1-yl)ethyl)-1-methylcyclohexyl)-3-ethylurea

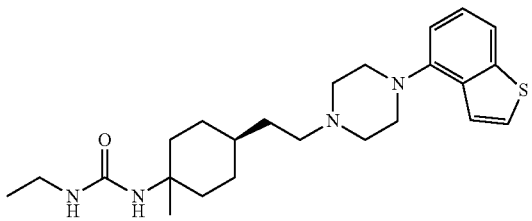

1-(4-(2-(4-(Benzo[b]thiophen-4-yl)piperazin-1-yl)ethyl)-1-methylcyclohexyl)-3-ethylurea was obtained according to Example 25.

MS m/z (ESI): 429.2 [M+H]$^+$.

Example 30

3-(Trans-4-(2-((R)-4-(2,3-dichlorophenyl)-2-methylpiperazin-1-yl)ethyl)cyclohexyl)-1, 1-dimethylurea

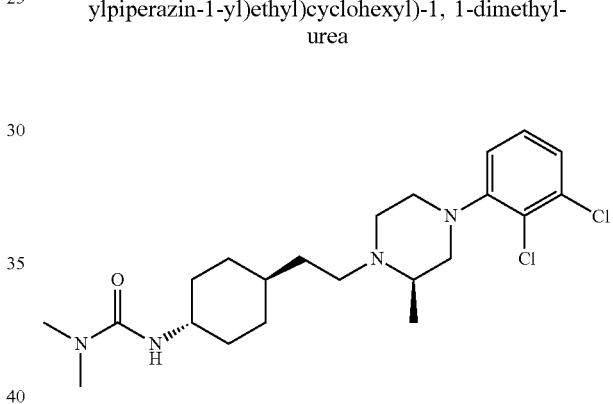

Step 1: Tert-butyl (R)-4-(2,3-dichlorophenyl)-2-methylpiperazine-1-carboxylate

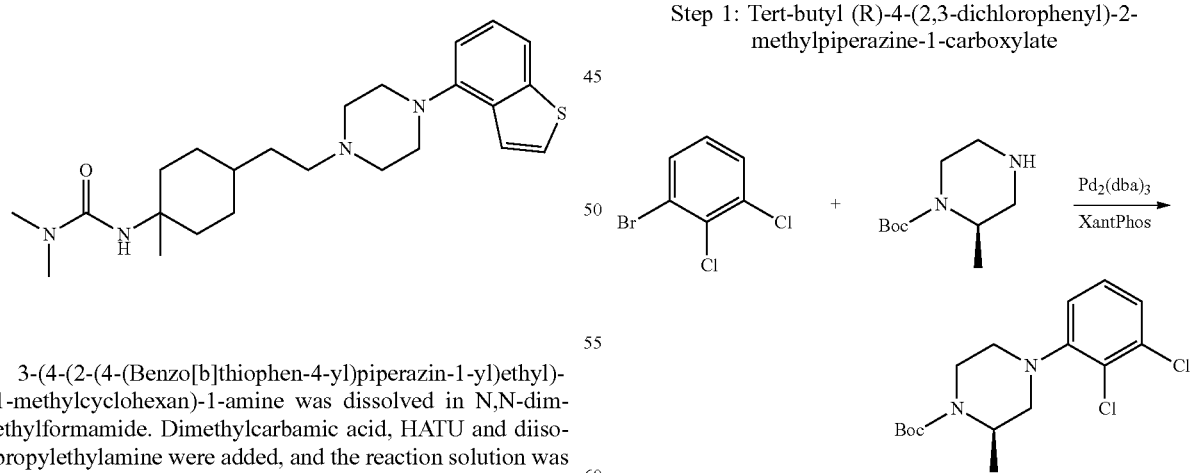

1-Bromo-2,3-dichlorobenzene (1.35 g, 6 mmol), tert-butyl (R)-2-methylpiperazine-1-carboxylate (836 mg, 5 mmol), tris(dibenzylideneacetone)dipalladium (228 mg, 0.25 mmol), 4,5-bis(diphenylphosphine)-9,9-dimethylxanthene (289 mg, 0.5 mmol) and sodium tert-butoxide (1.44 g, 15 mmol) were dissolved in 20 mL of toluene in a 50 mL round-bottom flask, and the reaction solution was purged with nitrogen. The reaction solution was stirred at 80° C. under a nitrogen atmosphere for 12 hours. After completion of the reaction, the reaction system was cooled to room temperature, quenched with water, and extracted with ethyl acetate (10 mL*3). The organic phase was washed with water and saturated brine, and dried over anhydrous sodium sulfate. The solution was filtered, and the filtrate was concentrated to dryness by rotary evaporation. The resulting crude product was purified by column chromatography (eluted with petroleum ether/ethyl acetate=4/1) to obtain tert-butyl (R)-4-(2,3-dichlorophenyl)-2-methylpiperazine-1-carboxylate (1.0 g, yellow solid, yield: 48.3%).

MS m/z (ESI): 345.1 [M+H]$^+$.

Step 2:
(R)-1-(2,3-Dichlorophenyl)-3-methylpiperazine

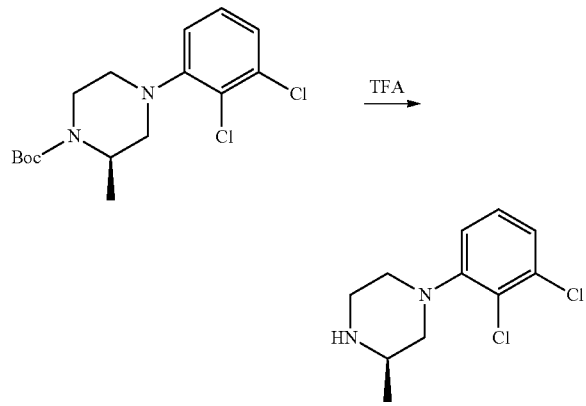

Tert-butyl (R)-4-(2,3-dichlorophenyl)-2-methylpiperazine-1-carboxylate (1 g, 2.89 mmol) was dissolved in 10 mL of dichloromethane in a 50 mL round-bottom flask, followed by the addition of trifluoroacetic acid (4 mL). The reaction solution was stirred at room temperature for 12 hours. After completion of the reaction, the reaction system was concentrated, quenched with saturated sodium bicarbonate solution, and extracted with ethyl acetate (10 mL*3). The organic phase was dried over anhydrous sodium sulfate. The solution was filtered, and the filtrate was concentrated to dryness by rotary evaporation to obtain (R)-1-(2,3-dichlorophenyl)-3-methylpiperazine (600 mg, white solid, yield: 84.7%).

MS m/z (ESI): 245.1 [M+H]$^+$.

Step 3: Tert-butyl (trans-4-(2-((R)-4-(2,3-dichlorophenyl)-2-methylpiperazin-1-yl)ethyl)cyclohexyl) carba mate

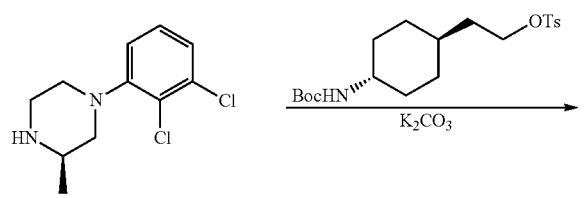

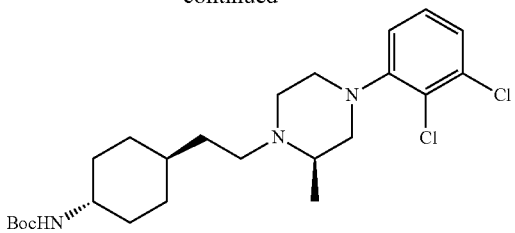

Tert-buty (trans-4-(2-((R)-4-(2,3-dichlorophenyl)-2-methylpiperazin-1-yl)ethyl)cyclohexyl)carba mate (100 mg, yellow solid, yield: 26.0%) was obtained according to Step 1 of Example 2 with (R)-1-(2,3-dichlorophenyl)-3-methylpiperazine and 2-(trans-4-((tert-butoxycarbonyl)amino)cyclohexyl)ethyl 4-methylbenzenesulfonate as the starting materials.

MS m/z (ESI): 470.1 [M+H]$^+$.

Step 4: Trans-4-(2-((R)-4-(2,3-dichlorophenyl)-2-methylpiperazin-1-yl)ethyl)cyclohexan-1-amine

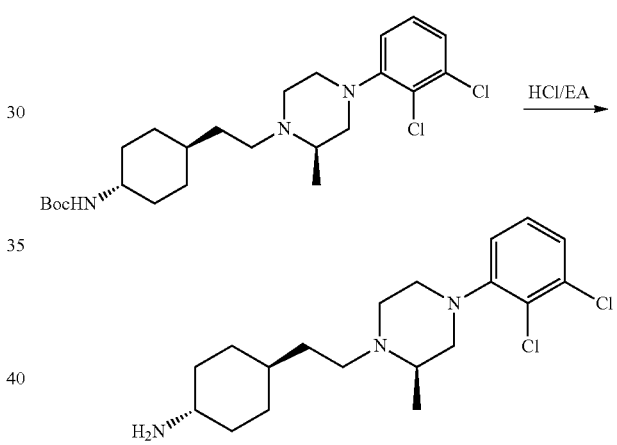

Trans-4-(2-((R)-4-(2,3-dichlorophenyl)-2-methylpiperazin-1-yl)ethyl)cyclohexan-1-amine (75 mg, yellow solid, yield: 95.2%) was obtained according to Step 2 of Example 2 with tert-butyl (trans-4-(2-((R)-4-(2,3-dichlorophenyl)-2-methylpiperazin-1-yl)ethyl)cyclohexyl)carba mate as the starting material.

MS m/z (ESI): 370.1 [M+H]$^+$.

Step 5: 3-(Trans-4-(2-((R)-4-(2,3-dichlorophenyl)-2-methylpiperazin-1-yl)ethyl)cyclohexyl)-1, 1-dimethylurea

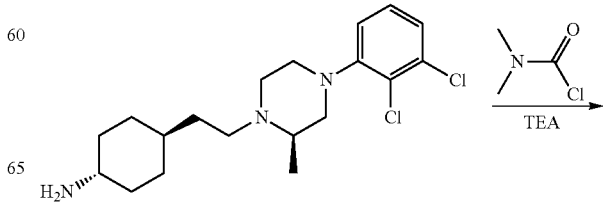

-continued

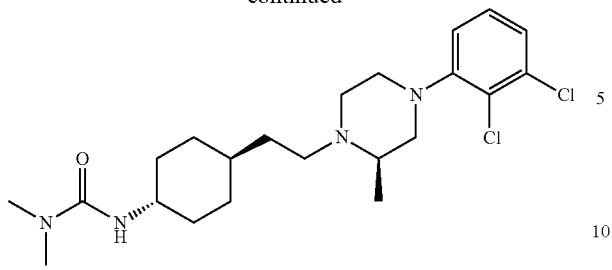

Trans-4-(2-((R)-4-(2,3-dichlorophenyl)-2-methylpiperazin-1-yl)ethyl)cyclohexan-1-amine (60 mg, 0.16 mmol) was dissolved in 3 mL of dichloromethane. Triethylamine (50 mg, 0.5 mmol) and dimethylcarbamic chloride (35 mg, 0.32 mmol) were added, and the reaction solution was reacted at room temperature for 12 hours. The reaction solution was washed with water three times (2 mL*3). The organic phase was concentrated and purified by prep-HPLC to obtain the product 3-(trans-4-(2-((R)-4-(2,3-dichlorophenyl)-2-methylpiperazin-1-yl)ethyl)cyclohexyl)-1,1-dimethylurea (8.3 mg, white solid, yield: 13.9%).

MS m/z (ESI): 441.2 [M+H]$^+$.

$^1$H NMR (400 MHz, Methanol-d$_4$) δ 7.39-7.17 (m, 2H), 7.13-7.01 (m, 1H), 3.59-3.45 (m, 2H), 3.28-3.15 (m, 2H), 3.08-2.93 (m, 2H), 2.89 (s, 6H), 2.78-2.57 (m, 3H), 2.52-2.41 (m, 1H), 1.97-1.77 (m, 4H), 1.55-1.39 (m, 2H), 1.37-1.21 (m, 3H), 1.17 (d, J=6.0 Hz, 3H), 1.13-1.03 (m, 2H).

Example 31

3-(Trans-4-(2-((R)-4-(benzo[b]thiophen-4-yl)-3-cyclopropylpiperazin-1-yl)ethyl)cyclohexyl)-1,1-dimethylurea

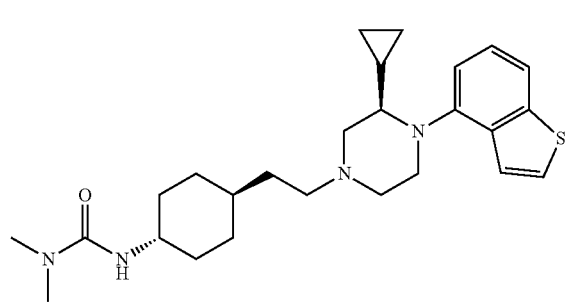 [SMILES: CN(C)C(=O)N[C@H]1CC[C@H](CCN2CCN(c3cccc4sccc34)[C@H](C3CC3)C2)CC1]

3-(Trans-4-(2-((R)-4-(benzo[b]thiophen-4-yl)-3-cyclopropylpiperazin-1-yl)ethyl)cyclohexyl)-1,1-dimethylurea was obtained according to Example 30 with 4-bromobenzo[b]thiophene and tert-butyl (R)-3-cyclopropylpiperazine-1-carboxylate as the starting materials.

MS m/z (ESI): 455.2 [M+H]f.

Example 32

Preparation of 3-(trans-4-(2-((S)-4-(benzo[b]thiophen-4-yl)-3-cyanopiperazin-1-yl)ethyl)cyclohexyl)-1,1-dimethylurea

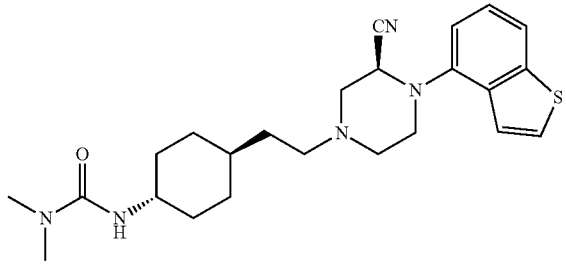 [SMILES: CN(C)C(=O)N[C@H]1CC[C@H](CCN2CCN(c3cccc4sccc34)[C@H](C#N)C2)CC1]

3-(Trans-4-(2-((S)-4-(benzo[b]thiophen-4-yl)-3-cyanopiperazin-1-yl)ethyl)cyclohexyl)-1,1-dimethylurea was obtained according to Example 30.

MS m/z (ESI): 440.2[M+H]$^+$.

Example 33

3-(Trans-4-(2-((R)-4-(benzo[b]thiophen-4-yl)-3-methylpiperazin-1-yl)ethyl)cyclohexyl)-1,1-dimethylurea

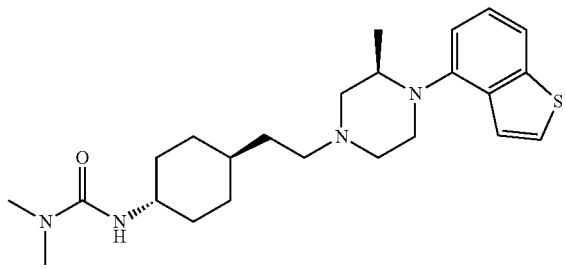 [SMILES: C[C@@H]1CN(CC[C@H]2CC[C@H](NC(=O)N(C)C)CC2)CCN1c1cccc2sccc12]

The product 3-(trans-4-(2-((R)-4-(benzo[b]thiophen-4-yl)-3-methylpiperazin-1-yl)ethyl)cyclohexyl)-1,1-dimethylurea was obtained according to Example 30 with 4-bromobenzo[b]thiophene and tert-butyl (R)-3-methylpiperazine-1-carboxylate as the starting materials.

MS m/z (ESI): 429.2 [M+H]$^+$.

Example 34

3-(Trans-4-(2-(5-(benzo[b]thiophen-4-yl)-2,5-diazabicyclo[4.2.0]octan-2-yl)ethyl)cyclohexyl)-1,1-dimethylurea

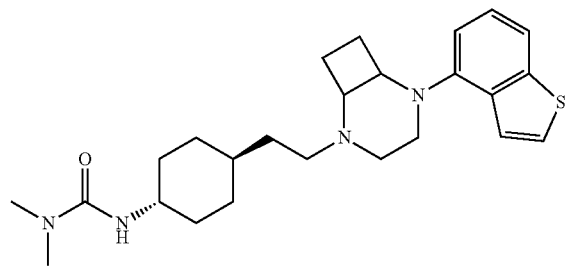 [SMILES: CN(C)C(=O)N[C@H]1CC[C@H](CCN2CCN(c3cccc4sccc34)C3CCC32)CC1]

Step 1: 2-(Benzo[b]thiophen-4-yl)-2,5-diazabicyclo[4.2.0]octane

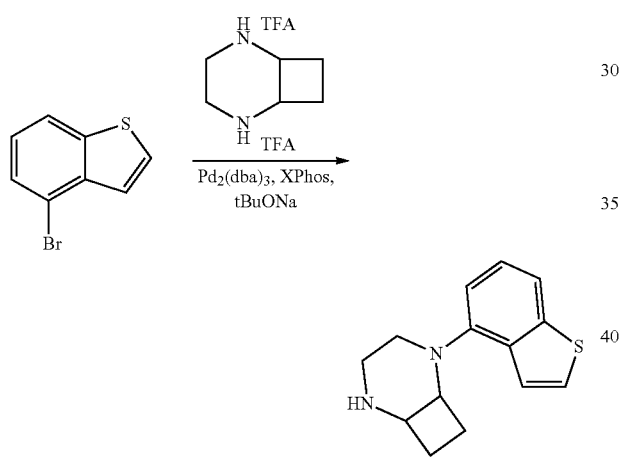

2-(Benzo[b]thiophen-4-yl)-2,5-diazabicyclo[4.2.0]octane (290 mg, white solid, yield: 48%) was obtained according to Step 1 of Example 30 with 4-bromobenzo[b]thiophene and 2,5-diazabicyclo[4.2.0]octane as the starting materials.

MS m/z (ESI): 245.1 [M+H]$^+$.

Step 2: Tert-butyl (trans-4-(2-(5-(benzo[b]thiophen-4-yl)-2,5-diazabicyclo[4.2.0]octan-2-yl)ethyl)cyclohexyl)carbamate

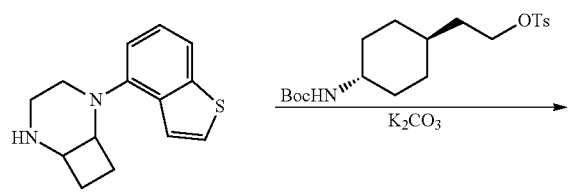

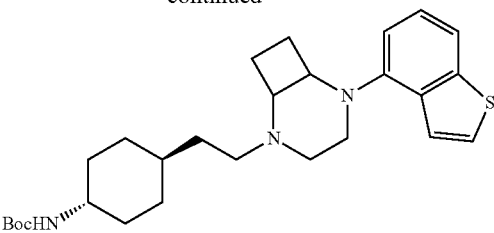

Tert-butyl (trans-4-(2-(5-(benzo[b]thiophen-4-yl)-2,5-diazabicyclo[4.2.0]octan-2-yl)ethyl)cyclohexyl)carbamate (301 mg, white solid, yield: 54%) was obtained according to Step 3 of Example 30 with 2-(benzo[b]thiophen-4-yl)-2,5-diazabicyclo[4.2.0]octane as the starting material.

MS m/z (ESI): 470.3 [M+H]$^+$.

Step 3: Trans-4-(2-(5-(benzo[b]thiophen-4-yl)-2,5-diazabicyclo[4.2.0]octan-2-yl)ethyl)cyclohexan-1-amine

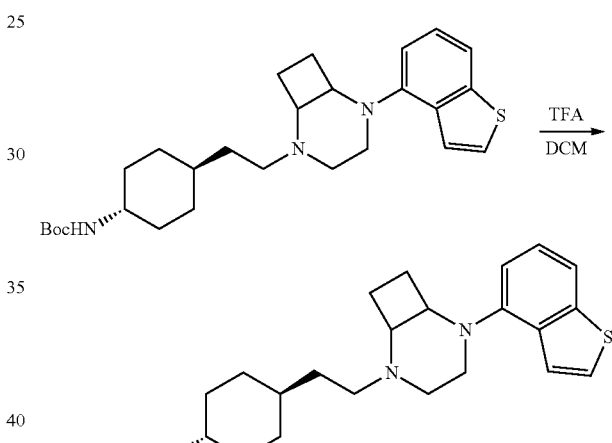

Trans-4-(2-(5-(benzo[b]thiophen-4-yl)-2,5-diazabicyclo[4.2.0]octan-2-yl)ethyl)cyclohexan-1-amine triflate (299 mg, yield: 99%) was obtained according to Step 7 of Example 12 with tert-butyl (trans-4-(2-(5-(benzo[b]thiophen-4-yl)-2,5-diazabicyclo[4.2.0]octan-2-yl)ethyl)cyclohexyl)carbamate as the starting material.

MS m/z (ESI): 370.2 [M+H]$^+$.

Step 4: 3-(Trans-4-(2-(5-(benzo[b]thiophen-4-yl)-2,5-diazabicyclo[4.2.0]octan-2-yl)ethyl)cyclohexyl)-1,1-dimethylurea

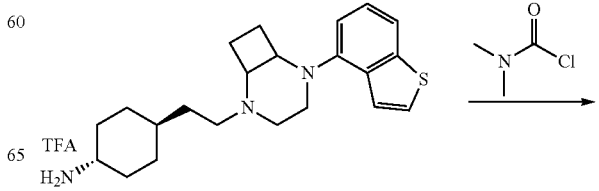

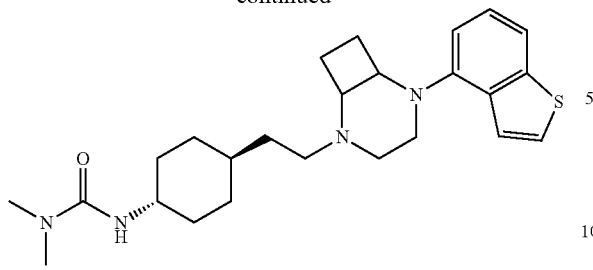

3-(Trans-4-(2-(5-(benzo[b]thiophen-4-yl)-2,5-diazabicyclo[4.2.0]octan-2-yl)ethyl) cyclohexyl)-1,1-dimethylurea (23 mg, white solid, yield: 35%) was obtained according to Step 8 of Example 12 with trans-4-(2-(5-(benzo[b]thiophen-4-yl)-2,5-diazabicyclo[4.2.0]octan-2-yl)ethyl)cyclohexan-1-amine as the starting material.

MS m/z (ESI): 441.3 [M+H]$^+$.

Example 35

3-(Trans-4-(2-((R)-4-(2,3-dichlorophenyl)-3-methylpiperazin-1-yl)ethyl)cyclohexyl)-1, 1-dimethylurea

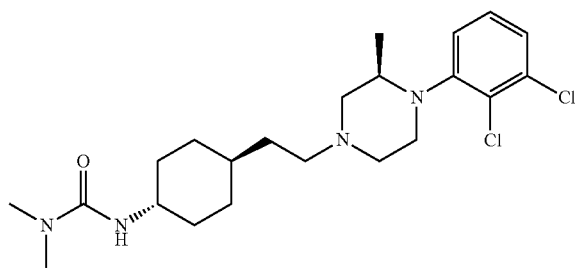 [SMILES: C[C@@H]1CN(CC[C@H]2CC[C@H](NC(=O)N(C)C)CC2)CCN1c1cccc(Cl)c1Cl]

Step 1: Tert-butyl (R)-4-(2,3-dichlorophenyl)-3-methylpiperazine-1-carboxylate

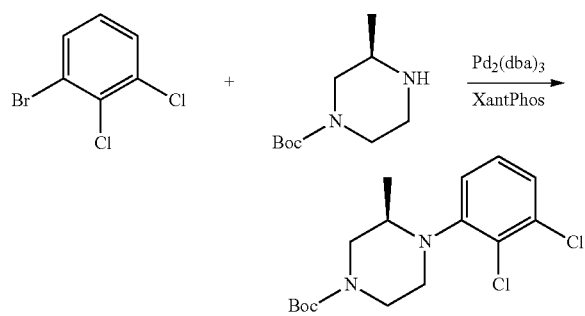

Tert-butyl (R)-4-(2,3-dichlorophenyl)-3-methylpiperazine-1-carboxylate (600 mg, yellow solid, yield: 32.6%) was obtained according to Step 1 of Example 30 with 1-bromo-2,3-dichlorobenzene and tert-butyl (R)-3-methylpiperazine-1-carboxylate as the starting materials.

MS m/z (ESI): 345.1 [M+H]$^+$.

$^1$H NMR (400 MHz, Chloroform-d) δ 7.26-7.21 (m, 1H), 7.21-7.11 (m, 1H), 7.11-6.94 (m, 1H), 3.99-3.00 (m, 7H), 1.49 (s, 9H), 0.91 (d, J=6.3 Hz, 3H).

Step 2: (R)-1-(2,3-Dichlorophenyl)-2-methylpiperazine

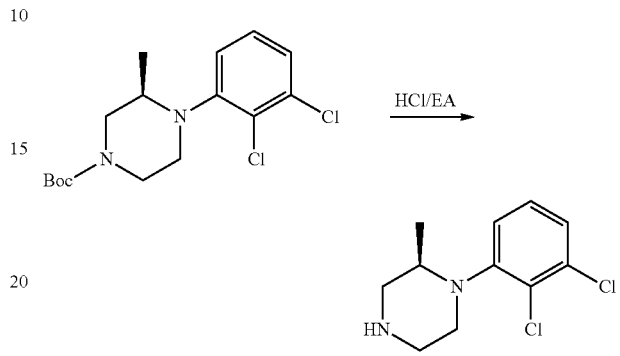

(R)-1-(2,3-Dichlorophenyl)-2-methylpiperazine (420 mg, yellow solid, yield: 98.8%) was obtained according to Step 2 of Example 30 with tert-butyl (R)-4-(2,3-dichlorophenyl)-3-methylpiperazine-1-carboxylate as the starting material.

MS m/z (ESI): 245.1 [M+H]$^+$.

1H NMR (400 MHz, Methanol-d$_4$) δ 7.36-7.29 (m, 1H), 7.27-7.16 (m, 2H), 3.60-3.44 (m, 1H), 3.42-3.27 (m, 2H), 3.21-3.13 (m, 2H), 3.02-2.81 (m, 2H), 0.88 (d, J=6.3 Hz, 3H).

Step 3: Tert-butyl (trans-4-(2-((R)-4-(2,3-dichlorophenyl)-3-methylpiperazin-1-yl)ethyl)cyclohexyl) carba mate

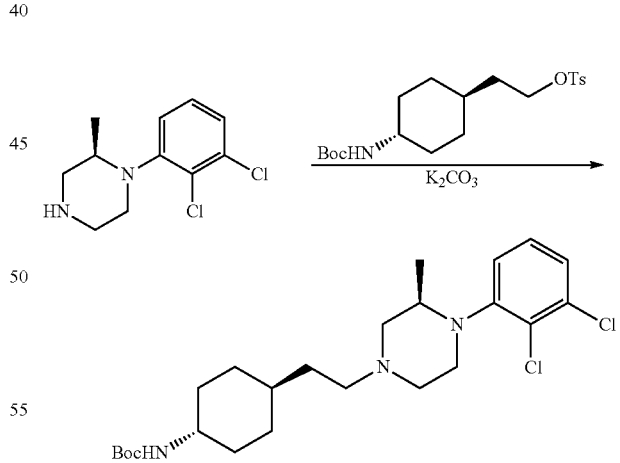

Tert-butyl (trans-4-(2-((R)-4-(2,3-dichlorophenyl)-3-methylpiperazin-1-yl)ethyl)cyclohexyl)carba mate (100 mg, yellow solid, yield: 26.0%) was obtained according to Step 1 of Example 2 with (R)-1-(2,3-dichlorophenyl)-2-methylpiperazine and 2-(trans-4-((tert-butoxycarbonyl)amino) cyclohexyl)ethyl 4-methylbenzenesulfonate as the starting materials.

MS m/z (ESI): 470.1 [M+H]$^+$.

Step 4: Trans-4-(2-((R)-4-(2,3-dichlorophenyl)-3-methylpiperazin-1-yl)ethyl)cyclohexan-1-amine

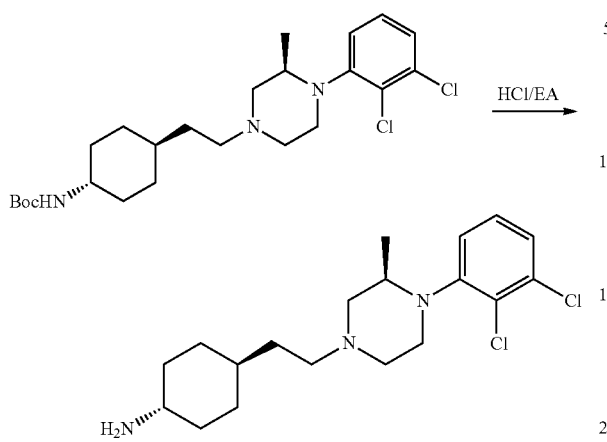

Trans-4-(2-((R)-4-(2,3-dichlorophenyl)-3-methylpiperazin-1-yl)ethyl)cyclohexan-1-amine (75 mg, yellow solid, yield: 95.2%) was obtained according to Step 2 of Example 2 with tert-butyl (trans-4-(2-((R)-4-(2,3-dichlorophenyl)-3-methylpiperazin-1-yl)ethyl)cyclohexyl)carba mate as the starting material.

MS m/z (ESI): 370.1 [M+H]$^+$.

Step 5: 3-(Trans-4-(2-((R)-4-(2,3-dichlorophenyl)-3-methylpiperazin-1-yl)ethyl)cyclohexyl)-1,1-dimethylurea

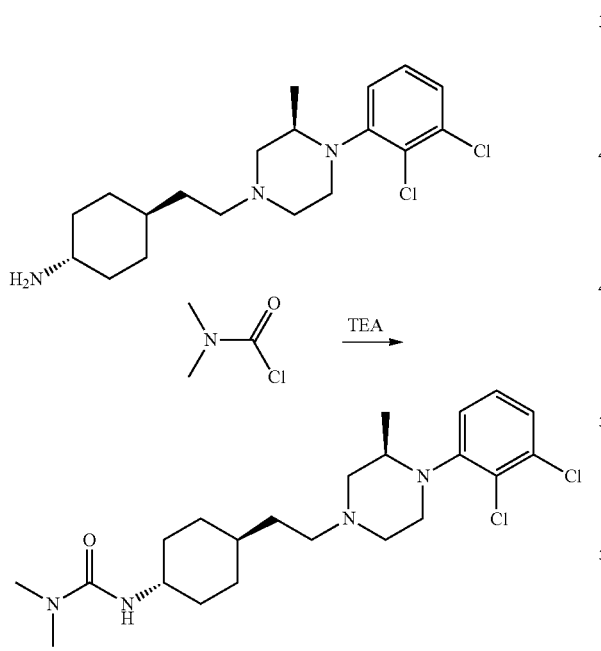

3-(Trans-4-(2-((R)-4-(2,3-dichlorophenyl)-3-methylpiperazin-1-yl)ethyl)cyclohexyl)-1,1-dimethylurea (25 mg, white solid, yield: 35.0%) was obtained according to Step 5 of Example 30 with trans-4-(2-((R)-4-(2,3-dichlorophenyl)-3-methylpiperazin-1-yl)ethyl)cyclohexan-1-amine as the starting material.

MS m/z (ESI): 441.2 [M+H]$^+$.

$^1$H NMR (400 MHz, Methanol-d$_4$) δ 7.38-7.15 (m, 3H), 3.56-3.44 (m, 1H), 3.36 (s, 2H), 3.12 (d, J=11.6 Hz, 1H), 2.93 (s, 1H), 2.87 (s, 6H), 2.77-2.67 (m, 1H), 2.52-2.34 (m, 3H), 2.17-2.02 (m, 1H), 1.96-1.75 (m, 4H), 1.57-1.42 (m, 2H), 1.37-1.21 (m, 3H), 1.15-0.99 (m, 2H), 0.87 (d, J=6.1 Hz, 3H).

Example 36

3-(Trans-4-(2-((S)-4-(benzo[b]thiophen-4-yl)-3-(trifluoromethyl)piperazin-1-yl)ethyl)cyclohexyl)-1,1-dimethylurea

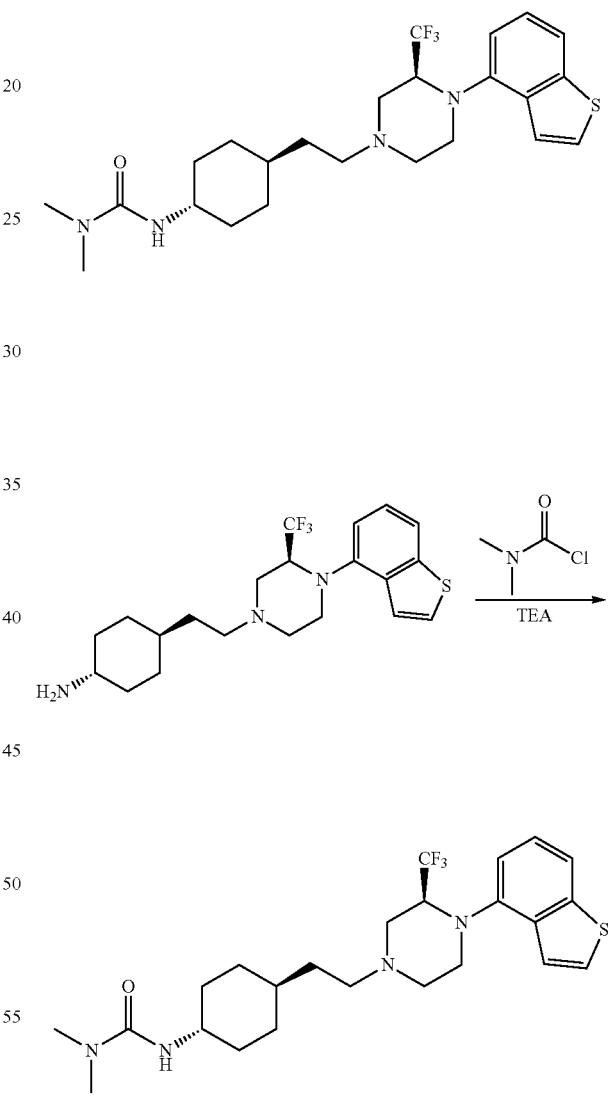

3-(Trans-4-(2-((S)-4-(benzo[b]thiophen-4-yl)-3-(trifluoromethyl)piperazin-1-yl)eth yl)cyclohexyl)-1,1-dimethylurea was obtained according to Step 5 of Example 30 with trans-4-(2-((S)-4-(benzo[b]thiophen-4-yl)-3-(trifluoromethyl)piperazin-1-yl)ethyl)cyclo hexan-1-amine as the starting material.

MS m/z (ESI): 483.2 [M+H]$^+$.

Example 37

N-(Trans-4-(2-((S)-4-(benzo[b]thiophen-4-yl)-3-(trifluoromethyl)piperazin-1-yl)ethyl)cyclohexyl)oxazole-2-carboxamide

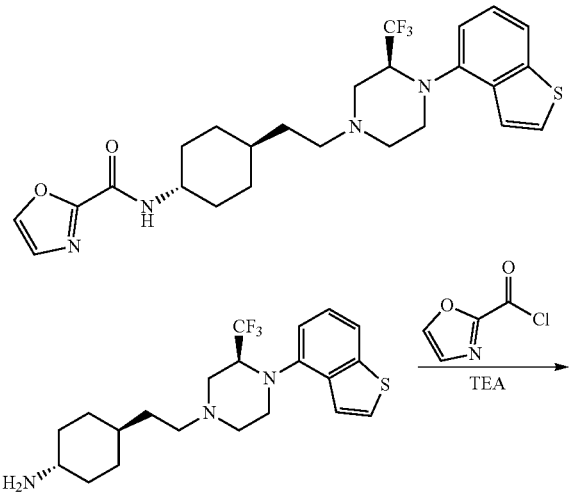

N-(Trans-4-(2-((S)-4-(benzo[b]thiophen-4-yl)-3-(trifluoromethyl)piperazin-1-yl)ethyl)cyclohexyl)oxazole-2-carboxamide was obtained according to Step 5 of Example 30 with trans-4-(2-((S)-4-(benzo[b]thiophen-4-yl)-3-(trifluoromethyl)piperazin-1-yl)ethyl)cyclo hexan-1-amine as the starting material.

MS m/z (ESI): 507.2 [M+H]$^+$.

Example 38

N-(Trans-4-(2-(4-(benzo[b]thiophen-4-yl)-1,4-diazepan-1-yl)ethyl)cyclohexyl)-3,3-difluoroazetidine-1-carboxamide

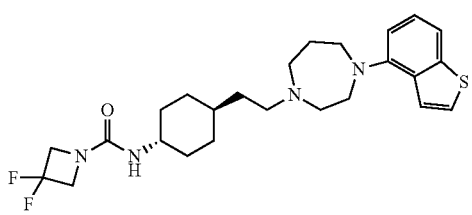 [SMILES: O=C(N[C@H]1CC[C@H](CCN2CCCN(c3cccc4sccc34)CC2)CC1)N1CC(F)(F)C1]

N-(Trans-4-(2-(4-(benzo[b]thiophen-4-yl)-1,4-diazepan-1-yl)ethyl)cyclohexyl)-3,3-difluoroazetidine-1-carboxamide was obtained according to Steps 1 to 3 of Example 2 with 1-(benzo[b]thiophen-4-yl)-1,4-diazepane as the starting material.

MS m/z (ESI): 477.2 [M+H]$^+$.

Example 39

3-(Cis-4-(2-(4-(benzo[b]thiophen-4-yl)-1,4-diazepan-1-yl)ethyl)-4-fluorocyclohexyl)-1,1-dimethylurea

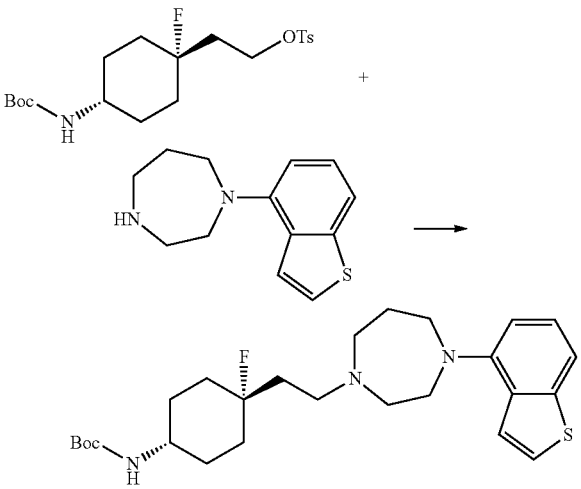

Step 1: Preparation of tert-butyl (cis-4-(2-(4-(benzo[b]thiophen-4-yl)-1,4-diazepan-1-yl)ethyl)-4-fluorocyclohexyl)carbamate Tert-butyl (cis-4-(2-(4-(benzo[b]thiophen-4-yl)-1,4-diazepan-1-yl)ethyl)-4-fluorocyclohexyl)carbamate was obtained according to Step 6 of Example 12 with 2-(cis-4-((tert-butoxycarbonyl)amino)-1-fluorocyclohexyl)ethyl 4-methylbenzenesulfonate and 1-(benzo[b]thiophen-4-yl)-1,4-diazepane as the starting materials.

MS m/z (ESI): 476.2 [M+H]$^+$.

Step 2: Preparation of cis-4-(2-(4-(benzo[b]thiophen-4-yl)-1,4-diazepan-1-yl)ethyl)-4-fluorocyclohexan-1-amine

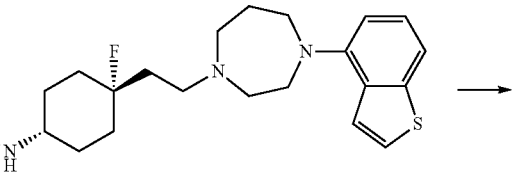

-continued

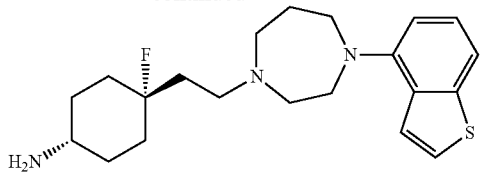

Cis-4-(2-(4-(benzo[b]thiophen-4-yl)-1,4-diazepan-1-yl)ethyl)-4-fluorocyclohexan-1-amine was obtained according to Step 7 of Example 12 with tert-butyl (cis-4-(2-(4-(benzo[b]thiophen-4-yl)-1,4-diazepan-1-yl)ethyl)-4-fluorocyclohexyl)carba mate as the starting material.

MS m/z (ESI): 376.2[M+H]$^+$.

Step 3: Preparation of 3-(cis-4-(2-(4-(benzo[b]thiophen-4-yl)-1,4-diazepan-1-yl)ethyl)-4-fluorocyclohexyl)-1,1-dimethylurea

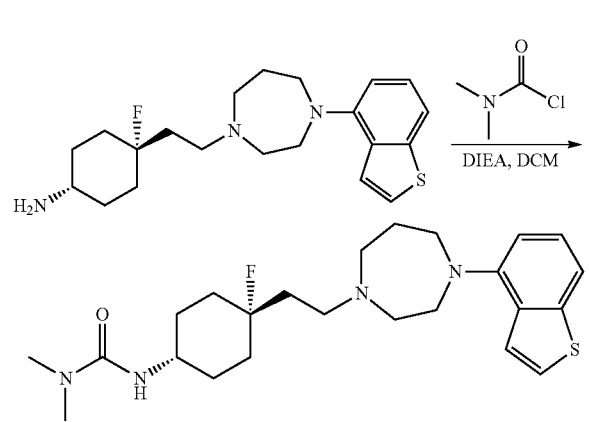

3-(Cis-4-(2-(4-(benzo[b]thiophen-4-yl)-1,4-diazepan-1-yl)ethyl)-4-fluorocyclohexyl)-1,1-dimethylurea was obtained according to Step 8 of Example 12 with cis-4-(2-(4-(benzo[b]thiophen-4-yl)-1,4-diazepan-1-yl)ethyl)-4-fluorocyclohexan-1-amine as the starting material.

MS m/z (ESI): 447.2[M+H]$^+$.

$^1$H NMR (400 MHz, DMSO-d$_6$) δ 7.63 (d, J=5.6 Hz, 1H), 7.47 (d, J=7.5 Hz, 1H), 7.44 (d, J=5.6 Hz, 1H), 7.21 (t, J=7.8 Hz, 1H), 6.83 (d, J=7.9 Hz, 1H), 5.96 (d, J=7.9 Hz, 1H), 3.55-3.37 (m, 5H), 2.90-2.78 (m, 2H), 2.75 (s, 6H), 2.71-2.51 (m, 4H), 2.58 (s, 4H), 2.05-1.90 (m, 2H), 1.89-1.71 (m, 4H), 1.66-1.58 (m, 2H), 1.58-1.40 (m, 4H).

Example 40

N-(Cis-4-(2-(4-(benzo[b]thiophen-4-yl)piperazin-1-yl)ethyl)-4-fluorocyclohexyl)furan-2-carboxamide

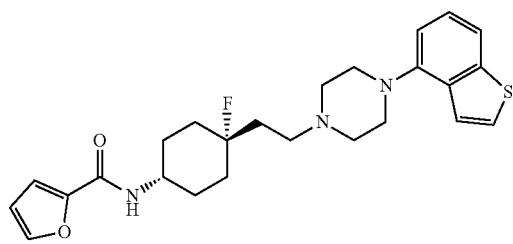 [SMILES: O=C(N[C@H]1CC[C@](F)(CCN2CCN(c3cccc4sccc34)CC2)CC1)c1ccco1]

Step 1: Preparation of tert-butyl (cis-4-(2-(4-(benzo[b]thiophen-4-yl)piperazin-1-yl)ethyl)-4-fluorocyclohexyl)carbamate

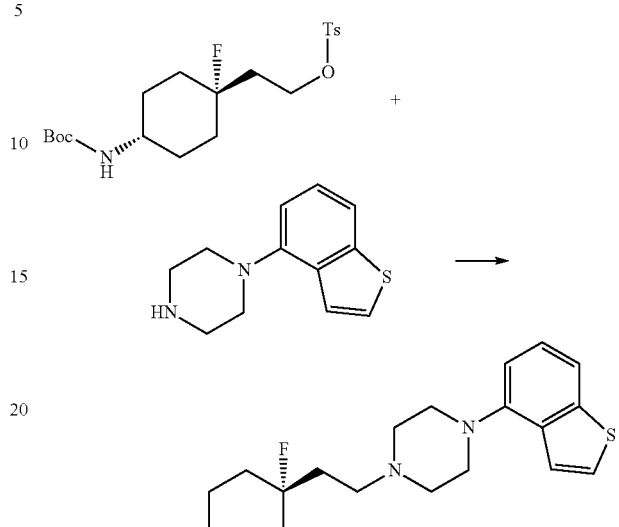

Tert-butyl (cis-4-(2-(4-(benzo[b]thiophen-4-yl)piperazin-1-yl)ethyl)-4-fluorocyclohexyl)carbamate (180 mg, yield: 70%) was obtained according to Step 6 of Example 12 with 2-(cis-4-((tert-butoxycarbonyl)amino)-1-fluorocyclohexyl)ethyl 4-methylbenzenesulfonate and 1-(benzo[b]thiophen-4-yl)piperazine as the starting materials.

MS m/z (ESI): 462.2[M+H]$^+$.

Step 2: Preparation of cis-4-(2-(4-(benzo[b]thiophen-4-yl)piperazin-1-yl)ethyl)-4-fluorocyclohexan-1-amine

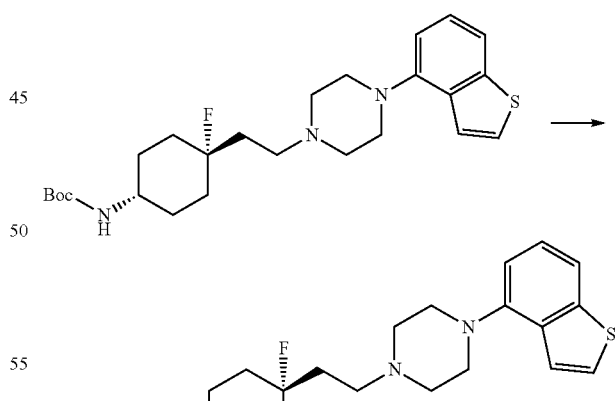

Cis-4-(2-(4-(benzo[b]thiophen-4-yl)piperazin-1-yl)ethyl)-4-fluorocyclohexan-1-amine (180 mg, as a TFA salt) was obtained according to Step 7 of Example 12 with tert-butyl (cis-4-(2-(4-(benzo[b]thiophen-4-yl)piperazin-1-yl)ethyl)-4-fluorocyclohexyl)carbamate as the starting material.

MS m/z (ESI): 362.2[M+H]$^+$.

Step 3: Preparation of N-(cis-4-(2-(4-(benzo[b]thiophen-4-yl)piperazin-1-yl)ethyl)-4-fluorocyclohexyl)furan-2-carboxamide

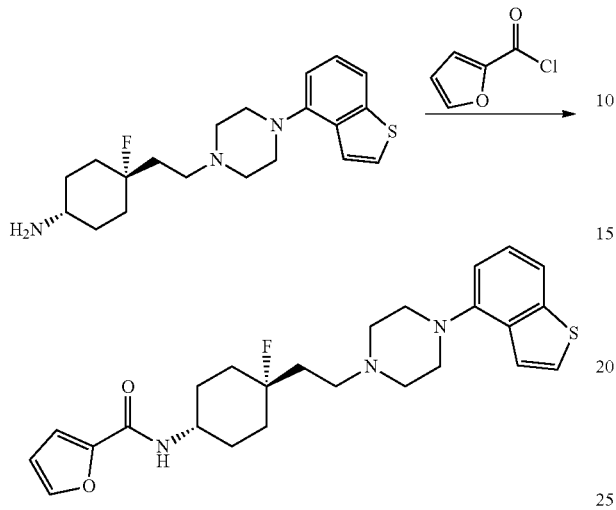

N-(Cis-4-(2-(4-(benzo[b]thiophen-4-yl)piperazin-1-yl)ethyl)-4-fluorocyclohexyl)furan-2-carboxamide (33.3 mg, yield: 56%) was obtained according to Step 8 of Example 12 with cis-4-(2-(4-(benzo[b]thiophen-4-yl)piperazin-1-yl)ethyl)-4-fluorocyclohexan-1-amine and furan-2-carbonyl chloride as the starting materials.

MS m/z (ESI): 456.2 [M+H]$^+$.

$^1$H NMR (400 MHz, DMSO) δ 8.20 (d, J=8.1 Hz, 1H), 7.81 (s, 1H), 7.70 (d, J=5.5 Hz, 1H), 7.62 (d, J=8.0 Hz, 1H), 7.40 (d, J=5.5 Hz, 1H), 7.28 (t, J=7.8 Hz, 1H), 7.11 (d, J=3.3 Hz, 1H), 6.90 (d, J=7.6 Hz, 1H), 6.66-6.57 (m, 1H), 3.86-3.72 (m, 1H), 3.15-2.97 (m, 4H), 2.74-2.57 (m, 4H), 2.50-2.43 (m, 2H), 1.98-1.75 (m, 4H), 1.72-1.48 (m, 6H).

Example 41

N-(Trans-4-(2-(4-(benzo[b]thiophen-4-yl)piperazin-1-yl)ethyl)cyclohexyl)-2-hydroxy-2-methylpropanamide

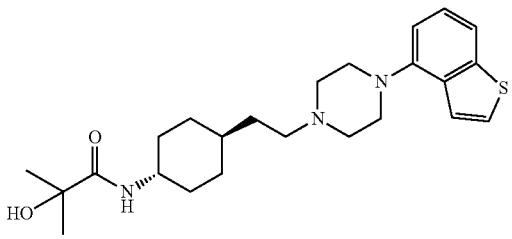 [SMILES: CC(C)(O)C(=O)N[C@H]1CC[C@H](CCN2CCN(c3cccc4sccc34)CC2)CC1]

N-(Trans-4-(2-(4-(benzo[b]thiophen-4-yl)piperazin-1-yl)ethyl)cyclohexyl)-2-hydroxy-2-methylpropanamide was obtained according to Example 27 with trans-4-(2-(4-(benzo[b]thiophen-4-yl)piperazin-1-yl)ethyl)cyclohexan-1-amine and 2-hydroxy-2-methylpropionic acid as the starting materials.

MS m/z (ESI): 430.2 [M+H]$^+$.

Example 42

N-(Trans-4-(2-(4-(benzo[b]thiophen-4-yl)piperazin-1-yl)ethyl)cyclohexyl)-1-hydroxycyclopropane-1-carboxamide

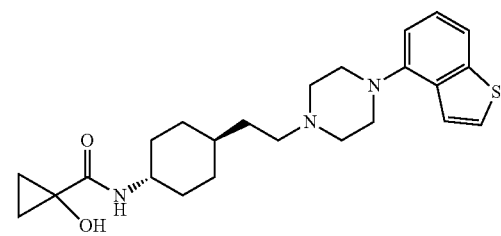 [SMILES: O=C(N[C@H]1CC[C@H](CCN2CCN(c3cccc4sccc34)CC2)CC1)C1(O)CC1]

Step 1: N-(Trans-4-(2-(4-(benzo[b]thiophen-4-yl)piperazin-1-yl)ethyl)cyclohexyl)-1-hydroxycyclopropane-1-carboxamide

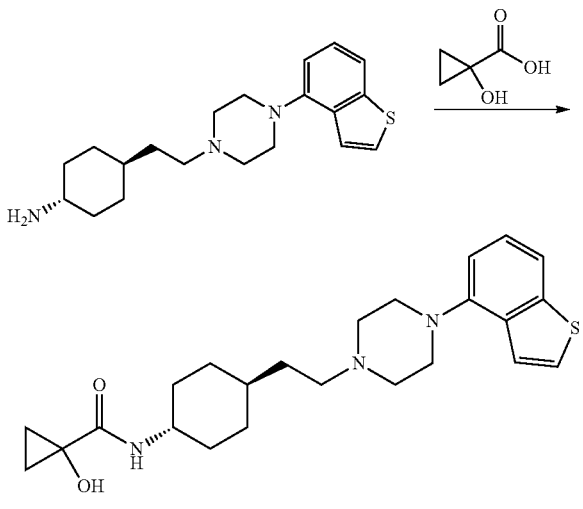

Trans-4-(2-(4-(benzo[b]thiophen-4-yl)piperazin-1-yl)ethyl)cyclohexan-1-amine (100 mg, 0.291 mmol) was dissolved in anhydrous DMF (5 mL), and 1-hydroxycyclopropane-1-carboxylic acid (59 mg, 0.582 mmol), DIEA (301 mg, 2.328 mmol) and HATU (221 mg, 0.582 mmol) were added respectively. The reaction solution was stirred at room temperature overnight. Water was added to the reaction solution, which was then extracted with ethyl acetate. The organic phase was dried and concentrated to dryness by rotary evaporation. The resulting crude product was purified by prep-HPLC to obtain N-(trans-4-(2-(4-(benzo[b]thiophen-4-yl)piperazin-1-yl)ethyl)cyclohexyl)-1-hydroxycyclopropane-1-carboxamide (38.4 mg, 31% yield).

$^1$H NMR (400 MHz, DMSO-d$_6$) δ 7.69 (d, J=5.5 Hz, 1H), 7.61 (d, J=8.0 Hz, 1H), 7.49 (d, J=8.5 Hz, 1H), 7.39 (d, J=5.5 Hz, 1H), 7.27 (t, J=7.8 Hz, 1H), 6.90 (d, J=7.6 Hz, 1H), 6.21 (s, 1H), 3.61-3.47 (m, 1H), 3.16-2.96 (m, 4H), 2.73-2.53 (m, 4H), 2.39 (t, J=7.5 Hz, 2H), 1.85-1.67 (m, 4H), 1.45-1.35 (m, 2H), 1.35-1.19 (m, 3H), 1.07-0.90 (m, 4H), 0.84-0.74 (m, 2H).

MS m/z (ESI): 428.2 [M+H]$^+$.

Example 43

N-(Trans-4-(2-(4-(benzo[b]thiophen-4-yl)piperazin-1-yl)ethyl)cyclohexyl)oxazole-2-carboxamide

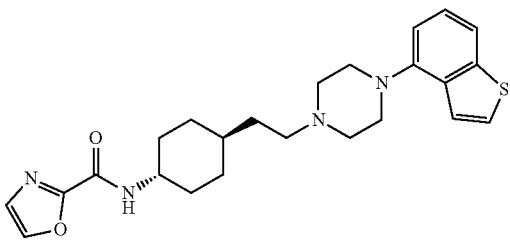 [SMILES: O=C(N[C@H]1CC[C@H](CCN2CCN(c3cccc4sccc34)CC2)CC1)c1ncco1]

N-(Trans-4-(2-(4-(benzo[b]thiophen-4-yl)piperazin-1-yl)ethyl)cyclohexyl)oxazole-2-carboxamide was obtained according to Example 27 with trans-4-(2-(4-(benzo[b]thiophen-4-yl)piperazin-1-yl)ethyl)cyclohexan-1-amine and oxazole-2-carboxylic acid as the starting materials.

MS m/z (ESI): 439.2 [M+H]⁺.

¹H NMR (400 MHz, Methanol-d₄) δ 8.05 (s, 1H), 7.55 (d, J=8.1 Hz, 1H), 7.51 (d, J=5.6 Hz, 1H), 7.42 (d, J=5.5 Hz, 1H), 7.33 (s, 1H), 7.27 (t, J=7.8 Hz, 1H), 6.94 (d, J=7.6 Hz, 1H), 3.90-3.75 (m, 1H), 3.25-3.05 (m, 4H), 2.89-2.65 (m, 4H), 2.59-2.45 (m, 2H), 2.07-1.94 (m, 2H), 1.94-1.84 (m, 2H), 1.55-1.29 (m, 6H), 1.23-1.08 (m, 1H).

Example 44

2-((Trans-4-(2-((R)-4-(benzo[b]thiophen-4-yl)-2-methylpiperazin-1-yl)ethyl)cyclohexyl)amino)pyrimidine-5-carbonitrile

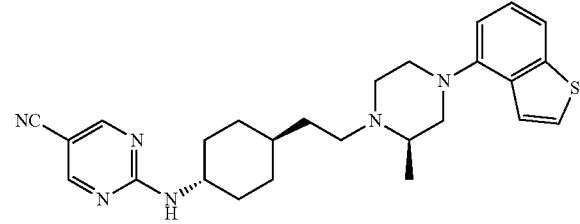 [SMILES: C[C@@H]1CN(c2cccc3sccc23)CCN1CC[C@H]1CC[C@H](Nc2ncc(C#N)cn2)CC1]

Step 1: Trans-4-(2-((R)-4-(benzo[b]thiophen-4-yl)-2-methylpiperazin-1-yl)ethyl)cyclohexan-1-amine

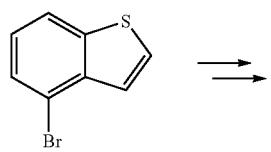

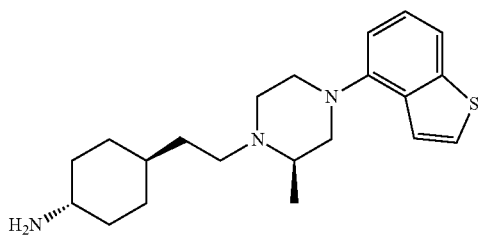

Trans-4-(2-((R)-4-(benzo[b]thiophen-4-yl)-2-methylpiperazin-1-yl)ethyl)cyclohexan-1-amine was obtained according to Steps 1 to 3 of Example 35 with 4-bromobenzo[b]thiophene as the starting material.

MS m/z (ESI): 358.2[M+H]⁺.

Step 2: (R)-4-(2-(4-(Benzo[b]thiophen-4-yl)-2-methylpiperazin-1-yl)ethyl)cyclohexan-1-amine

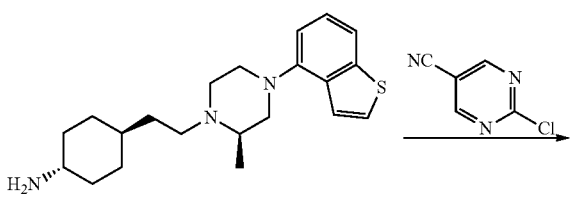

Trans-4-(2-((R)-4-(benzo[b]thiophen-4-yl)-2-methylpiperazin-1-yl)ethyl)cyclohexan-1-amine was dissolved in N,N-dimethylformamide. Potassium carbonate and 2-chloropyrimidine-5-carbonitrile were added, and the reaction solution was stirred at room temperature overnight. The reaction solution was concentrated to dryness by rotary evaporation, and the resulting crude product was purified by high performance liquid chromatography according to Example 26 to obtain 2-((trans-4-(2-((R)-4-(benzo[b]thiophen-4-yl)-2-methylpiperazin-1-yl)ethyl)cyclohexyl)amino)pyrimidine-5-carbonitrile.

MS m/z (ESI): 461.2 [M+H]⁺.

¹H NMR (400 MHz, CDCl₃) δ 8.62 (s, 1H), 8.43 (s, 1H), 7.55 (d, J=8.0 Hz, 1H), 7.40 (dd, J=11.2, 5.5 Hz, 2H), 7.29-7.26 (m, 1H), 6.89 (d, J=7.6 Hz, 1H), 5.59 (d, J=8.0 Hz, 1H), 3.86-3.83 (m, 1H), 3.37-3.30 (m, 2H), 3.06-3.04 (m, 2H), 2.88-2.80 (m, 3H), 2.65 (s, 1H), 2.48 (s, 1H), 2.11 (d, J=11.1 Hz, 2H), 1.88 (s, 2H), 1.51 (d, J=6.4 Hz, 2H), 1.30-1.13 (m, 8H).

Example 45

N-(Trans-4-(2-(4-(benzo[b]thiophen-4-yl)piperazin-1-yl)ethyl)cyclohexyl)furan-2-carboxamide

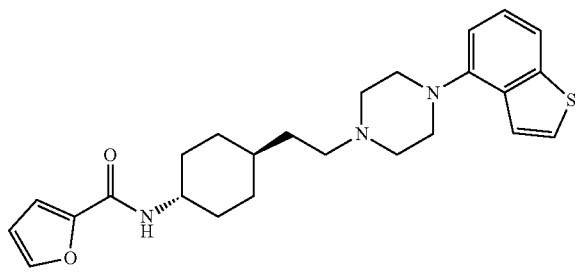 [SMILES: O=C(N[C@H]1CC[C@H](CCN2CCN(c3cccc4sccc34)CC2)CC1)c1ccco1]

The product N-(trans-4-(2-(4-(benzo[b]thiophen-4-yl)piperazin-1-yl)ethyl)cyclohexyl)furan-2-carboxamide was obtained according to Example 27 with trans-4-(2-(4-(benzo[b]thiophen-4-yl)piperazin-1-yl)ethyl)cyclohexan-1-amine as the starting material.

MS m/z (ESI): 438.2 [M+H]$^+$.

$^1$H NMR (400 MHz, Methanol-d$_4$) δ 7.64 (dd, J=1.8, 0.8 Hz, 1H), 7.56 (d, J=8.0 Hz, 1H), 7.51 (d, J=5.5 Hz, 1H), 7.42 (dd, J=5.6, 0.8 Hz, 1H), 7.27 (t, J=7.8 Hz, 1H), 7.09 (dd, J=3.5, 0.8 Hz, 1H), 6.94 (d, J=7.6 Hz, 1H), 6.56 (dd, J=3.5, 1.8 Hz, 1H), 3.89-3.74 (m, 1H), 3.26-3.08 (m, 4H), 2.90-2.67 (m, 4H), 2.61-2.49 (m, 2H), 2.02-1.81 (m, 4H), 1.58-1.48 (m, 2H), 1.47-1.26 (m, 4H), 1.23-1.06 (m, 2H).

Example 46

N-(Trans-4-(2-(4-(benzo[b]thiophen-4-yl)piperazin-1-yl)ethyl)cyclohexyl)-5-methylfuran-2-carboxamide

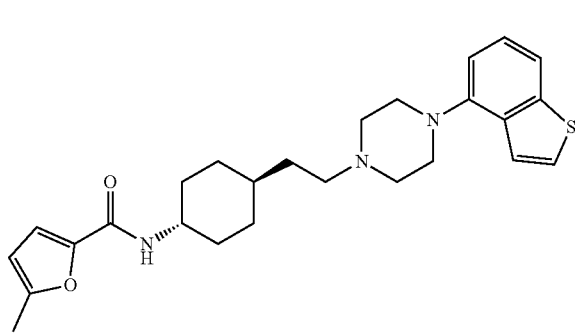 [SMILES: Cc1ccc(C(=O)N[C@H]2CC[C@H](CCN3CCN(c4cccc5sccc45)CC3)CC2)o1]

The product N-(trans-4-(2-(4-(benzo[b]thiophen-4-yl)piperazin-1-yl)ethyl)cyclohexyl)-5-methylfuran-2-carboxamide was obtained according to Example 27 with trans-4-(2-(4-(benzo[b]thiophen-4-yl)piperazin-1-yl)ethyl)cyclohexan-1-amine as the starting material.

MS m/z (ESI): 452.2 [M+H]$^+$.

$^1$H NMR (400 MHz, Methanol-d$_4$) δ 7.62-7.47 (m, 2H), 7.42 (dd, J=5.6, 0.8 Hz, 1H), 7.27 (t, J=7.9 Hz, 1H), 7.06-6.88 (m, 2H), 6.17 (dd, J=3.3, 1.1 Hz, 1H), 3.91-3.70 (m, 1H), 3.26-3.07 (m, 4H), 2.90-2.65 (m, 4H), 2.62-2.47 (m, 2H), 2.36 (s, 3H), 2.00-1.79 (m, 4H), 1.67-1.49 (m, 2H), 1.47-1.25 (m, 4H), 1.23-1.05 (m, 2H).

Example 47

N-(Trans-4-(2-(4-(benzo[b]thiophen-4-yl)piperazin-1-yl)ethyl)cyclohexyl)-2-methoxyacetamide

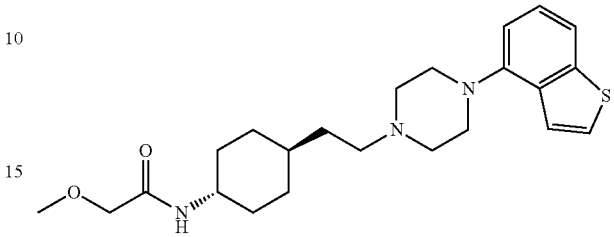

N-(Trans-4-(2-(4-(benzo[b]thiophen-4-yl)piperazin-1-yl)ethyl)cyclohexyl)-2-meth oxyacetamide (21 mg) was obtained according to Step 8 of Example 12.

MS m/z (ESI): 416.2 [M+H]$^+$.

$^1$H NMR (400 MHz, Chloroform-d) δ 7.56 (d, J=8.0 Hz, 1H), 7.33-7.24 (m, 2H), 6.91 (d, J=7.6 Hz, 1H), 6.34 (d, J=8.6 Hz, 1H), 3.87 (s, 2H), 3.83-3.72 (m, 1H), 3.41 (s, 3H), 3.35-3.18 (m, 4H), 2.91-2.67 (m, 4H), 2.66-2.51 (m, 2H), 2.00 (d, J=10.9 Hz, 2H), 1.82 (d, J=11.8 Hz, 2H), 1.61-1.50 (m, 2H), 1.35-1.23 (m, 2H), 1.20-1.12 (m, 3H).

Example 48

N-(Trans-4-(2-(4-(benzo[b]thiophen-4-yl)piperazin-1-yl)ethyl)cyclohexyl)-3-hydroxy-3-methylbutanamide

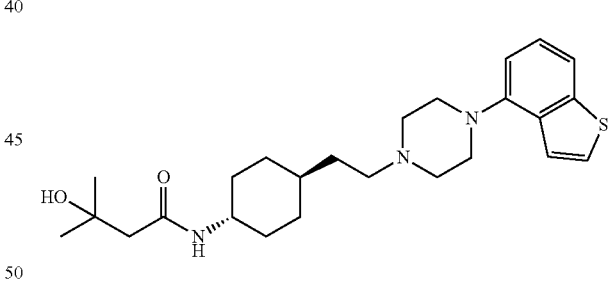

The product N-(trans-4-(2-(4-(benzo[b]thiophen-4-yl)piperazin-1-yl)ethyl)cyclohexyl)-3-hydroxy-3-methylbutanamide was obtained according to Example 27 with trans-4-(2-(4-(benzo[b]thiophen-4-yl)piperazin-1-yl)ethyl)cyclohexan-1-amine as the starting material.

MS m/z (ESI): 444.2 [M+H]$^+$.

$^1$H NMR (400 MHz, Methanol-d$_4$) δ 7.55 (d, J=8.1 Hz, 1H), 7.50 (d, J=5.6 Hz, 1H), 7.42 (d, J=5.5 Hz, 1H), 7.26 (t, J=7.9 Hz, 1H), 6.93 (d, J=7.6 Hz, 1H), 3.71-3.54 (m, 1H), 3.24-3.06 (m, 4H), 2.86-2.64 (m, 4H), 2.57-2.46 (m, 2H), 2.30 (s, 2H), 1.99-1.80 (m, 4H), 1.55-1.45 (m, 2H), 1.39-1.18 (m, 10H), 1.17-1.03 (m, 2H).

Example 49

N-(Trans-4-(2-(4-(benzo[b]thiophen-4-yl)piperazin-1-yl)ethyl)cyclohexyl)-5-fluoropyrimidin-2-amine

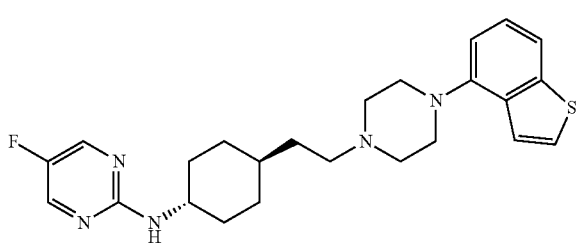 [SMILES: Fc1cnc(N[C@H]2CC[C@H](CCN3CCN(c4cccc5sccc45)CC3)CC2)nc1]

The product N-(trans-4-(2-(4-(benzo[b]thiophen-4-yl)piperazin-1-yl)ethyl)cyclohexyl)-5-fluoropyrimidin-2-amine was obtained according to Example 26 with trans-4-(2-(4-(benzo[b]thiophen-4-yl)piperazin-1-yl)ethyl)cyclohexan-1-amine as the starting material.

MS m/z (ESI): 440.2 [M+H]$^+$.

$^1$H NMR (400 MHz, Methanol-$d_4$) δ 8.19 (s, 2H), 7.59-7.48 (m, 2H), 7.42 (d, J=5.6 Hz, 1H), 7.27 (t, J=7.8 Hz, 1H), 6.94 (d, J=7.6 Hz, 1H), 3.70-3.60 (m, 1H), 3.23-3.15 (m, 4H), 2.84-2.70 (m, 4H), 2.59-2.50 (m, 2H), 2.22-2.16 (m, 1H), 2.10-1.98 (m, 3H), 1.91-1.82 (m, 2H), 1.65-1.49 (m, 3H), 1.21-1.10 (m, 2H).

Example 50

3-(Trans-4-(2-(4-(benzo[b]thiophen-4-yl)piperazin-1-yl)ethyl)cyclohexyl)-1-methoxy-1-methylurea

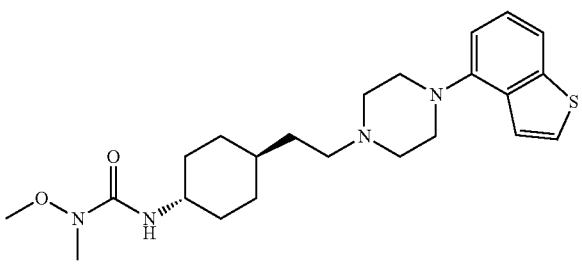 [SMILES: CON(C)C(=O)N[C@H]1CC[C@H](CCN2CCN(c3cccc4sccc34)CC2)CC1]

The product 3-(trans-4-(2-(4-(benzo[b]thiophen-4-yl)piperazin-1-yl)ethyl)cyclohexyl)-1-methoxy-1-methylurea was obtained according to Step 3 of Example 1 with trans-4-(2-(4-(benzo[b]thiophen-4-yl)piperazin-1-yl)ethyl)cyclohexan-1-amine as the starting material.

MS m/z (ESI): 431.2 [M+H]$^+$.

$^1$H NMR (400 MHz, Methanol-$d_4$) δ 7.62-7.48 (m, 2H), 7.42 (dd, J=5.6, 0.8 Hz, 1H), 7.26 (t, J=7.9 Hz, 1H), 6.93 (dd, J=7.7, 0.8 Hz, 1H), 3.63 (s, 3H), 3.57-3.41 (m, 1H), 3.26-3.10 (m, 4H), 3.03 (s, 3H), 2.86-2.65 (m, 4H), 2.60-2.46 (m, 2H), 1.97-1.80 (m, 4H), 1.56-1.42 (m, 2H), 1.40-1.25 (m, 4H), 1.20-1.02 (m, 2H).

Example 51

N-(4-(2-(4-(Benzo[b]thiophen-4-yl)piperazin-1-yl)ethyl)-2-fluorocyclohexyl)furan-2-carboxamide

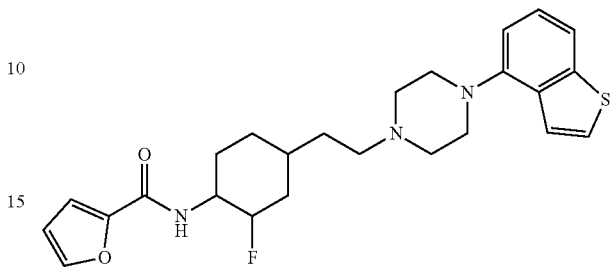

N-(4-(2-(4-(Benzo[b]thiophen-4-yl)piperazin-1-yl)ethyl)-2-fluorocyclohexyl)furan-2-carboxamide was obtained according to Step 1 of Example 14 with 4-(2-(4-(benzo[b]thiophen-4-yl)piperazin-1-yl)ethyl)-2-fluorocyclohexane-1-amine and furan-2-carboxylic acid as the starting materials.

MS m/z (ESI): 456.2 [M+H]$^+$.

$^1$H NMR (400 MHz, CDCl$_3$) δ 7.56 (d, J=8.0 Hz, 1H), 7.46-7.42 (m, 1H), 7.29 (d, J=7.9 Hz, 1H), 7.14-7.09 (m, 1H), 6.91 (d, J=7.6 Hz, 1H), 6.65-6.54 (m, 1H), 6.50 (d, J=5.1 Hz, 1H), 6.33-6.16 (m, 1H), 4.93-4.73 (m, 1H), 4.38-3.96 (m, 1H), 3.24 (s, 4H), 2.78 (s, 4H), 2.13-1.95 (m, 2H), 1.88-1.83 (m, 2H), 1.75-1.54 (m, 4H), 1.34-1.12 (m, 3H).

Biological Assay and Evaluation

The present invention is further illustrated below in combination with the following test examples, which are not intended to limit the scope of the present invention.

I. Radioligand-Receptor Binding Assay

Test Example 1. Determination of the Binding Ability of the Compounds of the Present Invention to Dopamine D3 Receptor 1. Experimental Objective:

The objective of this test example is to determine the affinity of the compounds for dopamine D3 receptor.

2. Experimental Instruments and Reagents:

2.1 Experimental instruments:

Vortex mixer (IKA; MS3 basic);
Electric heating constant temperature incubator (Shanghai Yiheng Scientific Instruments Co., Ltd; DHP-9032);
Microplate shaker (VWR; 12620-928);
TopCount (PerkinElmer; NTX);
Universal Harvester (PerkinElmer; UNIFILTER-96).

2.2 Experimental reagents and materials:

[$^3$H]-methylspiperone (PerkinElmer; NET856250UC);
Human Dopamine D3 Receptor membrane (PerkinElmer; ES-173-M400UA);
GR 103691 (Sigma; 162408-66-4);
ULTIMA GOLD (Perkin Elmer; 77-16061);
96 round deep well plate 1.1 mL (Perkin Elmer; P-DW-11-C);
UNIFILTER-96 GF/B filter plate (PerkinElmer; 6005174);

Polyethyleneimine, branched (Sigma; 408727);
Centrifuge tubes (BD, 352096; 352070);
Loading slot (JET BIOFIL; LTT001050);
Pipette tips (Axygen; T-300-R-S, T-200-Y-R-S, T-1000-B-R-S);
Magnesium chloride (Sigma, 7786-30-3);
Tris-base (Sigma, 77-86-1);
HCl (Beijing Xingling Precision Chemical Technology CO., LTD).

3. Experimental Method:

Assay buffer: 50 mM Tris-HCl pH 7.4, 10 mM $MgCl_2$; wash solution: 50 mM Tris-HCl pH 7.4, stored at 4° C.; 0.5% PEI solution: 0.5 g PEI dissolve in 100 mL $ddH_2O$, 4° C. storage of spare.

5 μL of the test compounds (0.005 nM to 100 nM, 10 concentrations in total) and 100 μL of buffer were added to a 96-well assay plate. 1 μL of cell membrane and 300 μL of buffer were added to each well, and the plate was shaken at 600 rpm for 5 min. A mixed solution of 100 μL of buffer and [$^3$H]-methylspiperone (the final concentration was 0.5 nM) was added to each well. The plate was shaken at 600 rpm for 5 min, and incubated at 27° C. for 30 min. The UNIFILTER-96 GF/B filter plate pre-incubated with 0.5% PEI for 1 h was washed twice with the buffer (1 mL/well). The cell membrane suspension was added to the UNIFILTER-96 GF/B filter plate, washed 4 times, and incubated at 55° C. for 10 min. 40 μL of ULTIMA GOLD was added to each well, and liquid scintillation counting was carried out.

4. Processing Method of the Experimental Data:

The CPM (Counts per minute) values were determined by TopCount. The percent inhibition rate of [$^3$H]-methylspiperone binding was calculated from the values of the High control (DMSO control) experimental group and Low control (100 nM positive compound) experimental group {% inhibition rate=($CPM_{sample}$−$CPM_{low\ control}$)/($CPM_{high\ control}$−$CPM_{low\ control}$)×100}. The 10 concentrations of the compound were from 100 nM to 0.005 nM after 3-fold dilution of the reaction system. The percent inhibition rate and ten-point concentration data were fitted to the parametric nonlinear logistic equation by using GraphPad prism to calculate the $IC_{50}$ values of the compound.

5. Experimental Results:

The binding activity of the compounds of the present invention to D3 was determined by the above assay, and the resulting $IC_{50}$ values are shown in Table 1.

TABLE 1

| $IC_{50}$ of the binding activity of the compounds of the present invention to D3 | |
|---|---|
| Example No. | D3 binding activity $IC_{50}$ (nM) |
| Cariprazine | 0.89 |
| 2 | 0.76 |
| 3 | 1.59 |
| 4 | 1.52 |
| 15 | 4.25 |
| 16 | 0.57 |
| 23 | 2.69 |
| 40 | 0.83 |
| 41 | 1.03 |
| 42 | 0.20 |
| 43 | 0.43 |
| 44 | 1.58 |
| 45 | 0.12 |
| 46 | 0.60 |
| 47 | 0.47 |
| 48 | 0.36 |

TABLE 1-continued

| $IC_{50}$ of the binding activity of the compounds of the present invention to D3 | |
|---|---|
| Example No. | D3 binding activity $IC_{50}$ (nM) |
| 49 | 2.43 |
| 50 | 1.29 |
| 51 | 0.76 |

6. Experimental Conclusion:

The compounds of the present invention have good affinity for dopamine receptor D3.

Test Example 2. Determination of the Binding Ability of the Compounds of the Present Invention to 5-HT2A Receptor 1. Experimental Objective:

The objective of this test example is to determine the affinity of the compounds for 5-HT2A receptor.

2. Experimental Instruments and Reagents:

2.1 Experimental instruments:
Vortex mixer (IKA; MS3 basic);
Electric heating constant temperature incubator (Shanghai Yiheng Scientific Instruments Co., Ltd; DHP-9032);
Microplate shaker (VWR; 12620-928);
TopCount (PerkinElmer; NTX);
Universal Harvester (PerkinElmer; UNIFILTER-96).

2.2 Experimental reagents and materials:
[$^3$H]-Ketanserin (PerkinElmer NET791);
Human Dopamine 5-HT2A Receptor membrane (PerkinElmer);
ULTIMA GOLD (Perkin Elmer; 77-16061);
96 round deep well plate 1.1 mL (Perkin Elmer; P-DW-11-C);
UNIFILTER-96 GF/B filter plate (PerkinElmer; 6005174);
Polyethyleneimine, branched (Sigma; 408727);
Centrifuge tubes (BD, 352096; 352070);
Loading slot (JET BIOFIL; LTT001050);
Pipette tips (Axygen; T-300-R-S, T-200-Y-R-S, T-1000-B-R-S);
Calcium chloride (Sigma);
Tris-base (Sigma, 77-86-1);
HCl (Beijing Xingling Precision Chemical Technology CO., LTD);
L-Ascorbic acid (Tianjin Guangfu).

3. Experimental Method:

Assay buffer: 50 mM Tris-HCl pH 7.4, 4 mM $CaCl_2$); wash solution: 50 mM Tris-HCl pH 7.4, stored at 4° C.; 0.5% PEI solution: 0.5 g PEI dissolve in 100 mL $ddH_2O$, 4° C. storage of spare.

5 μL of the test compounds (0.005 nM to 100 nM, 10 concentrations in total) and 100 μL of buffer were added to a 96-well assay plate. 1.5 μL of cell membrane and 300 L of buffer were added to each well. The plate was shaken at 600 rpm for 5 min. A mixed solution of 100 μL of buffer and [$^3$H]-Ketanserin (the final concentration was 2 nM) was added to each well. The plate was shaken at 600 rpm for 5 min, and incubated at 27° C. for 30 min. The UNIFILTER-96 GF/B filter plate pre-incubated with 0.5% PEI for 1 h was washed twice with the buffer (1 mL/well). The cell membrane suspension was added to the UNIFILTER-96 GF/B filter plate, washed 4 times, and incubated at 55° C. for 10 min. 40 μL of ULTIMA GOLD was added to each well, and liquid scintillation counting was carried out.

4. Experimental Data Processing Method:

The CPM (Counts per minute) values were determined by TopCount. The percent inhibition rate of [$^3$H]-Ketanserin binding was calculated from the values of the High control (DMSO control) experimental group and Low control (100 nM positive compound) experimental group {% inhibition rate=(CPM$_{sample}$−CPM$_{low\ control}$)/(CPM$_{high\ control}$−CPM$_{low\ control}$)×100}. The 10 concentrations of the compound were from 100 nM to 0.005 nM after 3-fold dilution of the reaction system. The percent inhibition rate and ten-point concentration data were fitted to the parametric nonlinear logistic equation by using GraphPad prism to calculate the IC$_{50}$ values of the compound.

5. Experimental Results:

The binding activity of the compounds of the present invention to 5-HT2A was determined by the above assay, and the resulting IC$_{50}$ values are shown in Table 2.

TABLE 2

IC$_{50}$ of the binding activity of the compounds of the present invention to 5-HT2A

| Example No. | 5HT-2A binding activity IC$_{50}$ (nM) |
|---|---|
| Cariprazine | 191.28 |
| 2 | 3.4 |
| 4 | 0.26 |
| 16 | 2.07 |
| 23 | 6.45 |
| 40 | 0.43 |
| 41 | 0.43 |
| 42 | 0.26 |
| 43 | 0.37 |
| 44 | 2.59 |
| 45 | 0.63 |
| 46 | 0.91 |
| 47 | 0.96 |
| 48 | 0.83 |
| 49 | 0.34 |
| 50 | 2.16 |
| 51 | 0.90 |

6. Experimental conclusion:

The compounds of the present invention have good affinity for 5-HT2A.

II. Cell Function Assay

Test Example 1. Determination of the Effect of the Compounds of the Present Invention on cAMP Content in Cells Stably Expressing D3 Receptors 1. Experimental Objective:

To determine the activation effect of the compounds on D3 receptor.

2. Experimental Instruments and Reagents:

2.1 Experimental instruments:

384-well assay plate (Perkin Elmer; 6007680);

96-well conical btm PP Plt nature RNASE/Dnase-free plate (ThermoFisher; 249944);

EnVision (Perkin Elmer).

2.2 Experimental reagents:

Fetal Bovine Serum (Gibco, 10999141);

Ham's F-12K (Kaighn's) Medium (Hyclone; SH30526.01);

Penicillin-Streptomycin, Liquid (Gibco; 15140122);

G418 (invitrogen; 0131-027);

Forskolin (Selleck, S2449);

BSA stabilizer (Perkin Elmer; CR84-100);

cAMP kit (Cisbio; 62AM4PEC);

IBMX (Sigma; I5879);

HEPES (Gibco; 15630080);

HBSS (Gibco; 14025076);

TrypLE (ThermoFisher; 12604021).

3. Experimental Method:

1. Preparation of the buffer: 1*HBSS+20 mM HEPES+0.1% BSA+500 μM IBMX.

Complete medium: Ham's F12K+10% fetal bovine serum+1* penicillin-streptomycin+400 μg/mL G418.

2. CHO-D3 cells were cultured in the complete medium at 37° C., 5% CO$_2$. After TrypLE digestion, the cells were resuspended in the experimental buffer, and seeded into a 384-well cell culture plate at a seeding density of 8000 cells per well.

3. The experimental buffer (1*HBSS, 0.1% BSA, 20 mM HEPES and 500 μM IBMX) was prepared. The compound was diluted with the buffer. 2.5 μL of the compound solution was added to each well, and the plate was incubated at 37° C. for 10 minutes. The forskolin was diluted to 8 μM (8*) with the experimental buffer. 2.5 μL of the diluted 8* forskolin was added, and the plate was incubated at 37° C. for 30 minutes. cAMP-d2 and Anti-cAMP-Eu3+ were thawed, and diluted by 20-fold with the lysis buffer. 10 μL of cAMP-d2 was added to the experimental well, followed by the addition of 10 μL of Anti-cAMP-Eu3+. The reaction plate was centrifuged at 200 g for 30 s at room temperature, and left to stand at 25° C. for 1 h. Data was collected using Envision.

4. Processing method of the experimental data:

1) Z' factor=1−3*(SDMax+SDMin)/(MeanMax−MeanMin);

2) CVMax=(SDMax/MeanMax)*100%;

3) CVMin=(SDMin/MeanMin)*100%;

4) S/B=Singal/Background;

5) EC$_{50}$ of the compound was calculated using the GraphPad nonlinear fitting equation:

$$Y=\text{Bottom}+(\text{Top}-\text{Bottom})/(1+10\textasciicircum((\text{Log } EC_{50}-X)\ *\text{HillSlope}))$$

X: log value of compound concentration; Y: Activation %

5. Experimental Results:

TABLE 3

EC$_{50}$ values of the compounds on cAMP content in cells stably expressing D3 receptors

| Example No. | EC$_{50}$ (nM) |
|---|---|
| Cariprazine | 1.7 |
| 42 | 1.1 |
| 43 | 0.1 |

6. Experimental Conclusion:

It can be seen from the data in the table that the compounds of the Examples of the present invention show good agonistic activity in the cAMP effect assay in cells stably expressing D3 receptors.

Test Example 2. Determination of the Effect of the Compounds of the Present Invention on Calcium Ion Mobility in Cells Stably Expressing 5-HT2A Receptors 1. Experimental Objective:

To determine the inhibitory effect of the compounds on 5-HT2A receptor.

2. Experimental Instruments and Reagents:

2.1 Experimental instruments:
384-well assay plate (Corning; 3712);
Pipette (Axygen);
FLIPR (Molecular Devices).

2.2 Experimental reagents:
DMEM (Invitrogen; 11965);
Fetal bovine serum (Biowest; S1810-500);
Dialysis serum (S-FBS-AU-065; Serana);
Penicillin-Streptomycin (Biowest; L0022-100);
Hygromycin B (CABIOCHEM, 400052);
Matrigel (BD; 354230);
DMSO (Sigma; D2650);
HBSS (Invitrogen; 14065);
HEPES (Invitrogen; 15630080);
Probenecid (Sigma; P8761);
BSA (renview; FA016);
TrypLE (ThermoFisher; 12604021).

3. Experimental Method:

1) Preparation of the buffer: 1×HBSS, 20 mM HEPES, 2.5 mM probenecid (400 mM stock in 1 M NaOH), 0.1% BSA. Probenecid and BSA were added fresh on the day of the experiment. Experimental buffers include dye buffer and compound dilution buffer.

2) Cell culture medium: Ham's F-12K+10% fetal bovine serum+600 μg/ml hygromycin B+1* penicillin-streptomycin. Seeding medium: Ham's F-12K+10% dialysis serum. Assay buffer: 1×HBSS+20 mM HEPES. Cell line: Flp-In-CHO-5HT2A stable pool.

3) The cells were cultured in the complete medium at 37° C., 5% $CO_2$ to 70%-90% confluency. The cells were digested with TrypLE trypsin, seeded to the 384-well assay plate at a density of $1\times10^4$ cells/well, and incubated for 16 to 24 hours (at least overnight).

4) 20× Component A was thawed to room temperature, diluted to 2× working concentration (containing 5 mM Probenecid) with the assay buffer, and placed at room temperature for later use.

5) The cell culture plate was taken out and left to stand at room temperature for 10 min. FBS was diluted to a concentration of 0.03% with Apricot and the assay buffer, and 20 μL of the solution was finally remained in the 3764 culture plate. 20 μL of 2× Component A (containing 5 mM Probenecid) was added to each assay well, centrifuged at 200 g at RT for 3 to 5 sec, and incubated at 37° C. for 2 hr. 6) The medium was discarded, and 20 μL of the dye was added. The plate was incubated at 37° C. in the dark for 60 min, and the calcium signal was determined.

7) The antagonist was obtained before the experiment: the working solution of the test compound (6×) was formulated with DMSO. The cell culture plate was taken out and left to stand at room temperature for 10 min. 6× test compound was added to the 384-well assay plate (10 μL/well), which was then incubated at room temperature in the dark for 35 min.

8) 5HT was diluted to 6 nM (6×) with the assay buffer. 50 μL of the solution was transferred to a 384-well assay plate (Corning, 3657), and placed at room temperature for later use. The assay plate was transferred to the FLIPR, followed by the addition of agonist compound at 6× concentration (5 μL/well). 10 μL of diluted 5HT was added to each experimental well using FLIPR, and the values were determined and saved. The total assay volume was 30 μL, including 20 μL/well of the dye buffer, 5 μL/well of the test compound at 5× concentration and 5 μL/well of the agonist compound at 6× concentration.

4. Processing Method of the Experimental Data:

The calcium signal values were determined by FLIPR. The ratio of the 340/510 nm wavelength signals to 380/510 nm wavelength signals was used as the calculated results for each sampling time point in the experiment. The calculation of maximum minus minimum was derived from the ratio signal curve. The percent inhibition rate and ten-point concentration data were fitted to the parametric nonlinear logistic equation by using GraphPad prism to calculate the $IC_{50}$ values of the compound.

5. Experimental results:

TABLE 4

$IC_{50}$ values of the compounds on calcium ion mobility in cells stably expressing 5-HT2A receptors

| Example No. | $IC_{50}$ (nM) |
|---|---|
| Cariprazine | 551.0 |
| 40 | 3.16 |
| 42 | 3.42 |

6. Experimental Conclusion:

It can be seen from the data in the table that the compounds of the Examples of the present invention show good inhibitory activity in the calcium ion mobility assay in cells stably expressing 5-HT2A receptors.

III. Pharmacokinetic Assay in Balb/c Mice

1. Study Objective:

Balb/c mice were used as test animals. The pharmacokinetic behavior of the compounds of Examples of the present invention was studied in mouse body (plasma and brain tissue) by orally administration at a dose of 5 mg/kg.

2. Experimental Protocol:

2.1 Test compounds:
Compounds of the Examples of the present invention, prepared by the applicant.

2.2 Test animals:
Male Balb/c mice (12 mice per group), purchased from Shanghai Jiesijie Laboratory Animal Co., LTD, with Certificate No.: SCXK (Shanghai) 2013-0006 N0.311620400001794.

2.3 Formulation of the preparation:
The test compound was dissolved in 0.5% CMC-Na (1% Tween80) by sonication to formulate a clear solution or homogeneous suspension.

2.4 Administration:
After an overnight fast, male Balb/c mice (12 mice per group) were administered p.o. with the test compound at a dose of 5 mg/kg and a volume of 10 mL/kg.

2.5 Sample collection:
0.2 mL of blood was taken from the heart of the mouse before administration and at 1, 2, 4, 8 and 24 hours after administration, and the mice were sacrificed with $CO_2$. The samples were stored in EDTA-$K_2$ tubes, and centrifuged for 6 minutes at 4° C., 6000 rpm to separate the plasma. The plasma samples were stored at −80° C. Whole brain tissue was taken out, weighed, placed in a 2 mL centrifuge tube, and stored at −80° C.

2.6 Sample process:
1) 160 μL of acetonitrile was added to 40 μL of the plasma sample for precipitation, and then the mixture was centrifuged at 3500×g for 5 to 20 minutes.
2) 90 μL of acetonitrile containing internal standard (100 ng/mL) was added to 30 μL of the plasma and brain homogenate sample for precipitation, and then the mixture was centrifuged at 13000 rpm for 8 minutes.
3) 70 μL of water was added to 70 μL of the treated supernatant and mixed by vortex for 10 minutes. 20 μL of the solution was taken to analyze the concentration of the test compound by LC/MS/MS. LC/MS/MS analytical instrument: AB Sciex API 4000 Qtrap.

2.7 Liquid chromatography analysis:
  Liquid chromatography condition: Shimadzu LC-20AD pump
  Chromatographic column: Agilent ZORBAX XDB-C18 (50×2.1 mm, 3.5 μm); Mobile phase: Eluent A was 0.1% formic acid in water, and Eluent B was acetonitrile
  Flow rate: 0.4 mL/min
  Elution time: 0-4.0 minutes the eluent is as follows:

| Time/minute | Eluent A | Eluent B |
|---|---|---|
| 0.01 | 90% | 10% |
| 0.5 | 90% | 10% |
| 0.8 | 5% | 95% |
| 2.4 | 5% | 95% |
| 2.5 | 90% | 10% |
| 4.0 | | Stop |

3. Experimental Results and Analysis:
The main parameters of pharmacokinetics were calculated by WinNonlin 6.1. The results of pharmacokinetic test in mice are shown in the following Table 5:

TABLE 5

Results of pharmacokinetic test in mice

Pharmacokinetic test (5 mg/kg)

| Example No. | Peak time $t_{max}$ (ng/mL) | Plasma concentration $C_{max}$ (ng/mL) | Area under curve $AUC_{0-t}$ (ng/mL × h) | Area under curve $AUC_{0-\infty}$ (ng/mL × h) | Half life $t_{1/2}$ (h) | Average residence time MRT (h) |
|---|---|---|---|---|---|---|
| 40 Plasma | 6.0 | 192.0 | 3073.3 | 3391.3 | 7.3 | 9.21 |
| 40 Brain | 1.0 | 328.0 | 4594.4 | 4961.0 | NA | NA |
| 41 Plasma | 1.0 | 452.3 | 5209.9 | 6370.8 | 10.2 | 13.5 |
| 41 Brain | 1.0 | 730.7 | 8119.8 | 13005.7 | NA | NA |
| 42 Plasma | 1.0 | 476.7 | 4240.5 | 4369.6 | 4.84 | 6.84 |
| 42 Brain | 1.0 | 330.0 | 3611.0 | 3890.8 | NA | NA |
| 43 Plasma | 1.0 | 403.0 | 4139.7 | 4859.6 | 8.9 | 11.8 |
| 43 Brain | 1.0 | 1392.0 | 14103.7 | 16534.3 | NA | NA |

4. Experimental Conclusion:
It can be seen from the results of pharmacokinetic test in mice in the table that the compounds of the Examples of the present invention show good pharmacokinetic properties, both the exposure AUC and maximum plasma concentration $C_{max}$ are good.

IV. Stability Assay in Liver Microsome In Vitro

1. Experimental Objective:
  To evaluate the metabolic stability of the compounds of the present invention in liver microsome in vitro.
2. Experimental Instruments and Reagents:
  2.1 Instruments:

| Instrument | Brand | Model |
|---|---|---|
| Vortex mixer | IKA | Vortex |
| Thermostatic mixer | SpecificAction | Incubation-micro mixer |
| Centrifuge | Eppendorf | Centrifuge 5804R |
| Liquid chromatograph | Shimadzu | LC-30AD |
| Mass spectrometer | AB Sciex | API5500 |

2.2 Reagents:

| Reagent | Brand | Article number |
|---|---|---|
| 7-Hydroxy coumarin | J&K Scientific | 153384 |
| DMSO | Sigma | 34869 |
| PBS | Gibco | 10010-023 |
| CD-1 mouse liver microsome | BD | M1000 |
| NADPH | Bide | BD11658 |
| UDPGA | Sigma | U6751 |
| Avermectin | J&K Scientific | 622045 |

3. Experimental Procedure:
  3.1. Formulation of the working solution of the compound
  Formulation of the working solution of the compound: 2 μL of the stock solution of the compound was added to 998 μL of phosphate buffer, and the final concentration was 20 μM.
  Formulation of the working solution of the control compound (7-hydroxycoumarin): The formulation was consistent with that of the compound.

3.2. Formulation of the working solution of liver microsome
  78.1 μL of 20 mg/mL microsome was diluted to 2.5 mL with 100 mM phosphate buffer and mixed well, and the final concentration was 0.625 mg/mL.

3.3. Formulation of NADPH and UDPGA 33.3 mg of NADPH and 25.8 mg of UDPGA were weighed respectively, followed by the addition of 2 mL of 100 mM phosphate buffer. The final concentrations were 20 mM.

3.4. Formulation of the channel-forming reagent (Alamethicin)

1 mg of Alamethicin was weighed, to which 200 μL of DMSO was added to obtain a 5 mg/mL solution. 10 μL of this solution was added to 990 μL of phosphate buffer (pH 7.4), and the final concentration was 50 μg/mL.

3.5. Formulation of the reaction stop solution

Stop solution: Cold acetonitrile containing 100 ng/mL labetalol hydrochloride and 400 ng/mL tolbutamide was used as internal standards, and stored in a refrigerator at 2 to 8° C.

3.6. Incubation procedure

400 μL of the formulated liver microsome, 25 μL of the working solution of the compound (10 μM) and 25 μL of Alamethicin (50 μg/mL) were added to a 96-well plate successively, which was then pre-incubated at 37° C. for 10 min. 50 μL of the formulated NADPH/UDPGA was added to initiate the reaction, and the plate was incubated at 37° C. The total volume of the reaction system was 500 μL. The final contents of the components were as follows:

| Components | Content |
| --- | --- |
| Liver microsome | 0.5 mg/mL |
| Compound | 1 μM |
| NADPH | 2 mM |
| UDPGA | 2 mM |
| Alamethicin | 2.5 μg/mL |

50 μL of the sample was taken out at time points of 0 min, 5 min, 10 min, 20 min, 30 min and 60 min respectively, followed by the addition of 200 μL of the cold stop solution containing the internal standards to stop the reaction in the samples. The resulting sample was centrifuged at 4000 g for 10 min, and the supernatant was collected for LC-MS/MS analysis.

4. Experimental Results:

TABLE 6

Stability in liver microsome in vitro

| Species | No. | Half life ($t_{1/2}$) min | Intrinsic clearance rate ($CL_{int}$) (μL/min/mg protein) | Remaining (%, 120 min) |
| --- | --- | --- | --- | --- |
| Mouse | Cariprazine | 65.8 | 21.1 | 30.5 |
|  | Example 41 | 163.0 | 21.3 | 80.6 |

Note:

| Type of clearance rate | Intrinsic clearance rate (uL/min/mg protein) Mouse |
| --- | --- |
| Slow | <8.8 |
| Rapid | >48.0 |

5. Experimental Conclusion:

The above data show that the compounds of the Examples of the present invention are moderately metabolized in mouse liver microsome.

V. Pharmacodynamic Model of Active Escape Experiment in Rats

1. Experimental Objective:

To evaluate the anti-schizophrenic effect of the compounds using the pharmacodynamic model of the active escape experiment in rats.

2. Experimental Instruments and Reagents:

2.1 Instruments:

| No. | Instrument name | Instrument model | Source | Manufacturer |
| --- | --- | --- | --- | --- |
| 1 | Active and passive shuttle device | MED-APA-D1R | Imported | Med Associates, Inc. |
| 2 | Thermostatic magnetic stirrer | 85-2 | Domestic | Shanghai Sile Instrument Co., Ltd. |
| 3 | Vortex mixer | H-101 | Domestic | Shanghai Kanghe Photoelectric Instrument Co., Ltd. |
| 4 | Ultrasonic cleaner | KQ3200DE | Domestic | Kunshan Ultrasonic Instruments Co., Ltd |

2.2 Reagents:

| No. | Name | Purity | Batch number | Storage condition | Manufacturer |
| --- | --- | --- | --- | --- | --- |
| 1 | CMC-Na | 100% | SLBV9664 | RT | Sigma |
| 2 | Tween 80 | 100% | BCBV8843 | RT | Sigma |

2.3 Test Compounds:

Compounds of the Examples of the present invention, prepared by the applicant.

3. Test Animals:

| Animal species | Strain | Age | Gender | Supplier |
|---|---|---|---|---|
| Rats | F344 | 6-8 weeks | Male | Beijing Vital River Laboratory Animal Technology Co., Ltd. |

4. Formulation of the Vehicle and Compounds:
  4.1 Vehicle (0.5% CMC-Na+1% Tween80)
  A certain mass (such as 1.0 g) of CMC-Na was weighed into a glass bottle, a certain volume (such as 200 mL) of purified water was added, and the resulting mixture was stirred to disperse evenly. 1% (v/v) Tween 80 was added according to the solution volume, and the resulting mixture was stirred overnight to obtain a homogeneous clear solution, which was stored at 2 to 8° C. for later use.
  4.2 Formulation of the compounds:
  A formula amount of the compound was weighed, followed by the addition of a formula volume of 0.5% CMC-Na+1% Tween 80 solution. The compound solution was formulated before the administration, stored at 2 to 8° C., and used within 4 days.
  The actual sample amount needs to be calculated during the formulation and administration of the compound solution. The calculation equation is as follows: the actual sample amount of the compound=theoretical weighing sample amount*purity/salt coefficient.
5. Experimental Protocol:
  After arriving at the experimental facility, the animals were acclimatized for one week before starting the experiment.
  5.1 Establishment of the pharmacodynamic model:
    5.1.1 The animal was put into the shuttle box and adapted for 5 seconds, followed by subjecting to 10 seconds of sound and light stimulation;
    5.1.2 If the animal avoided to the other side during the 10 seconds of sound and light stimulation, then no electric shock would be given, which would be recorded as avoids, and the single training ended;
    5.1.3 If the animal failed to move to the other side after the 10 seconds of sound and light stimulation, then an electric shock would be given with the current intensity of 0.6 mA and the duration of 10 seconds. If the animal avoided to the other side during the 10 seconds of electric shock, then the electric shock would stop, which would be recorded as escapes, and the single training ended;
    5.1.4 If the animal failed to avoid during the 10 seconds of electric shock, then the electric shock would stop, which would be recorded as escape failures, and the single training ended;
    5.1.5 Each animal was trained 30 times a day for a total of 6 days, and returned to the cage after the training.
  5.2 Baseline test and grouping
  The day before the compound screening test, a baseline test was performed. The test procedure was the same as 5.1.1 to 5.1.3, and the number of the baseline test was 20. The animals whose number of avoids reached 16 (80%) were grouped according to the number of avoids, 10 animals per group. The first group was administered with the vehicle orally, and the other groups were administered with the corresponding test compounds according to the experimental design.
  5.3 Compound screening test
  The compound was administered orally (5 mL/kg) one hour before the test;
  The test procedure was the same as 5.1.1 to 5.1.4, and the number of the test was 20.
6. Data Process:
  The following data was collected by the software for data analysis:
  Number of avoids of the animal;
  Number of escape failures of the animal;
  Escape latency of the animal;
  All measurement data were expressed as mean±standard error (Mean±SEM), and analyzed by Graphpad 6 statistical software. The difference was considered to be significant when $p<0.05$.
7. Experimental Results:

TABLE 7

| Example No. | Dose (mg/kg) | CAR value (%) | EF (%) |
|---|---|---|---|
| Vehicle | — | 91 | 0 |
| Cariprazine | 1 | 45.5 | 5.5 |
| 42 | 1 | 46.5 | 0 |

8. Experimental Conclusion:
  It can be seen from the above data that the compounds of the Examples of the present invention show good effects in the pharmacodynamic model of the active escape experiment in rats, indicating that they have anti-schizophrenia effect.

VI. Toxicity Test by Repeated Intragastric Administration for 14 Days in SD Rats 6.1 Experimental objective
  The objective of this study was to investigate the possible toxicity of compounds after repeated intragastric administration to SD rats for 14 days.
6.2 Experimental materials and instruments:
  6.2.1 Test compound
  Test compound 1: the compound of Example 42.
  6.2.2 Vehicle:
  Name: 0.5% CMC-Na (1% tween80) aqueous solution
  6.2.3 Animal information:
  Species & strain: Sprague-Dawley (SD) rats
  Animal grade: SPF grade
  Number and sex of animals: 60, half male and half female
  6.3 Experimental method:
  60 rats (30 rats/sex) were divided into 20 groups according to their sex and body weight. 40 rats were used for toxicology study (groups 1 to 4, 5 rats/sex/group), and 24 rats were used for toxicokinetics study (groups 5 to 8, 3 rats/sex/group). The animals in groups 1 and 5 were intragastrically administered with 0.5% CMC-Na (1% tween80) aqueous solution as the vehicle control groups. The animals in groups 2 and 6, 3 and 7, 4 and 8 were intragastrically administered with the compound of Example 42 at a dose of 2, 10 and 30 mg/kg, respectively. The animals were administered once a day for 14 consecutive days. The administration volumes were 10 mL/kg. During the experiment, clinical observation, body weight, food intake, body temperature, clinicopathological indicators (blood cell count, coagulation function, blood biochemistry) and toxicokinetics were monitored. All animals were euthanized on D15. During the experiment, the animals in groups 1 to 4 were subjected to gross anatomical observation. Histopathological examination was carried out on abnormal tissue and brain, kidney, adrenal gland, lung and bronchi, prostate, testis and epididymis.

6.4 List of test data 6.4.1 Dying/death

During the experiment, there was no death/dying in each group of animals.

6.4.2 Toxokinetics

The mean systemic exposure (as $AUC_{last}$) ratios of female animals to male animals in each dose group of the compound of Example 42 on D1 and D14 were between 0.83 and 2.52, indicating that the exposure of the compound of Example 42 in female animals was overall higher than that in male animals. Two-sided t-test and one-sided t-test were carried out on the mean systemic exposure (as $AUC_{last}$) of female animals and male animals in each dose group on D1 and D14, respectively. The results showed that there was no statistical significance between female animals and male animals ($P>0.05$).

On D1 and D14, the average exposure of the compound of Example 42 in both female and male animals increased with the increase of the dose, and the extent of the increase of the average exposure was greater than that of the dose.

After 14 days of intragastric administration at a dose of 2, 10 or 30 mg/kg respectively, the ratio of average $AUC_{last}$ of female and male animals in each dose group of the compound of Example 42 at the last dose (D14) to that at the first dose (D1) was between 1.03 and 2.12, and no accumulation was observed.

6.5 Experimental conclusion:

In this experiment, the compound of Example 42 was intragastrically administered to SD rats at a dose of 2, 10 or 30 mg/kg for two weeks (once a day). The main toxic responses are: body weight, food intake and body temperature are decreased; regarding to blood counts, WBC, Lymph, Retic and PLT are decreased; regarding to coagulation function, FIB wis decreased, and APTT is shortened; the main target organs for toxicity are the lungs and adrenal glands. Under this experimental condition, the maximum tolerated dose (MTD) of the compound of Example 42 is 30 mg/kg.

What is claimed is:

1. A compound of formula (IV-A), a stereoisomer thereof or a pharmaceutically acceptable salt thereof:

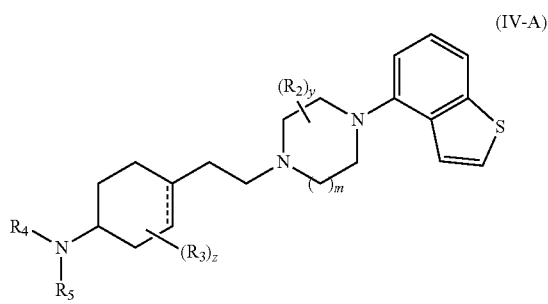

(IV-A)

wherein:

⚌ is selected from the group consisting of single bond and a double bond;

$R_2$ is selected from the group consisting of hydrogen, cyano, halogen, $C_{1-6}$ alkyl, $C_{1-6}$ haloalkyl and $C_{3-6}$ cycloalkyl;

or, two $R_2$ on the same or different carbon atoms are bonded to form a $C_{3-8}$ cycloalkyl or 3 to 8 membered heterocyclyl, wherein the $C_{3-8}$ cycloalkyl or 3 to 8 membered heterocyclyl is optionally further substituted by one or more substituents selected from the group consisting of deuterium, $C_{1-6}$ alkyl, halogen, amino, oxo, thioxo, cyano, hydroxy, $C_{3-8}$ alkoxy, $C_{3-8}$ haloalkoxy and $C_{3-8}$ hydroxyalkyl;

$R_3$ is selected from the group consisting of hydrogen, halogen, $C_{1-6}$ alkyl, $C_{1-6}$ haloalkyl, $C_{1-6}$ alkoxy, $C_{1-6}$ haloalkoxy, hydroxy, cyano, $C_{2-6}$ alkenyl and $C_{2-6}$ alkynyl;

$R_4$ is selected from the group consisting of hydrogen and $C_{1-6}$ alkyl;

$R_5$ is selected from the group consisting of $C_{1-6}$ alkyl, $C_{3-8}$ cycloalkyl, 3 to 8 membered heterocyclyl, $C_{6-14}$ aryl, 5 to 14 membered heteroaryl, —$(CH_2)_{n1}R_{aa}$, —$C(O)R_{aa}$, —$C(O)NR_{aa}R_{bb}$, —$C(O)(CH_2)_{n1}R_{aa}$, —$C(O)NR_{aa}(CH_2)_{n1}R_{bb}$, —$S(O)_2R_{aa}$, —$(CH_2)_{n1}S(O)(=NR_{aa})R_{bb}$, —$S(O)_{m1}NR_{aa}R_{bb}$ and —$C(O)OR_{aa}$, wherein the $C_{1-6}$ alkyl, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of cyano, halogen, $C_{1-6}$ alkyl and $C_{1-6}$ alkoxy;

or, $R_4$ and $R_5$ are bonded to form a 3 to 8 membered heterocyclyl or 5 to 14 membered heteroaryl, which is optionally further substituted by one or more substituents selected from the group consisting of $C_{1-6}$ alkyl, halogen, amino, oxo, thioxo, cyano, hydroxy, $C_{3-8}$ alkoxy, $C_{3-8}$ haloalkoxy, $C_{3-8}$ hydroxyalkyl, —$C(O)R_{cc}$ and —$C(O)NR_{cc}R_{dd}$;

$R_{aa}$ and $R_{bb}$ are each independently selected from the group consisting of hydrogen, amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl, wherein the amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of halogen, hydroxy, cyano, oxo, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl;

or, $R_{aa}$ and $R_{bb}$ together with the adjacent nitrogen atom are bonded to form a 4 to 10 membered heterocyclyl, which is optionally further substituted by one or more substituents selected from the group consisting of halogen, hydroxy, cyano, oxo, $C_{1-6}$ alkyl, $C_{1-6}$ haloalkyl, $C_{1-6}$ alkoxy and $C_{1-6}$ hydroxyalkyl;

$R_{cc}$ and $R_{dd}$ are each independently selected from the group consisting of hydrogen, amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl, wherein the amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of halogen, hydroxy, cyano, oxo, $C_{1-6}$ alkyl, $C_{1-6}$ haloalkyl and $C_{1-6}$ alkoxy;

y is 0, 1, 2, 3 or 4;

z is 0, 1, 2, 3 or 4;

m is 1 or 2; and n1 is 0, 1, 2 or 3;

wherein the compound of formula (IV-A) does not comprise compounds

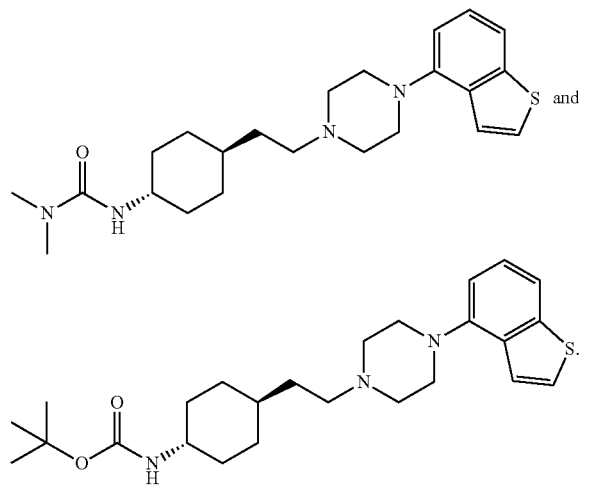

2. The compound, a stereoisomer thereof or a pharmaceutically acceptable salt thereof according to claim 1, wherein the compound is further shown as formula (IX-B):

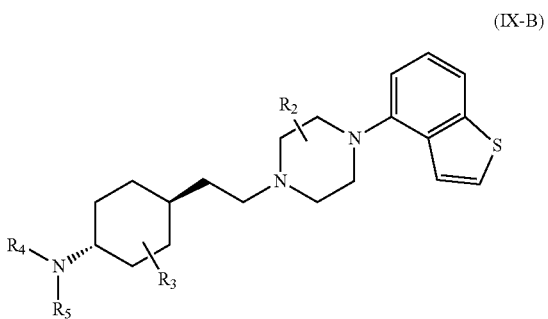

(IX-B)

$R_2$ is selected from the group consisting of hydrogen, cyano, halogen, $C_{1-6}$ alkyl, $C_{1-6}$ haloalkyl and $C_{3-6}$ cycloalkyl;

$R_3$ is selected from the group consisting of hydrogen, halogen, hydroxy, cyano, $C_{1-6}$ alkyl, $C_{1-6}$ haloalkyl, $C_{1-6}$ alkoxy and $C_{1-6}$ haloalkoxy;

$R_3$ is selected from the group consisting of hydrogen and $C_{1-6}$ alkyl;

$R_4$ is selected from the group consisting of hydrogen and $C_{1-6}$ alkyl;

$R_5$ is selected from the group consisting of $C_{1-6}$ alkyl, $C_{3-8}$ cycloalkyl, 3 to 8 membered heterocyclyl, $C_{6-14}$ aryl, 5 to 14 membered heteroaryl, —$(CH_2)_{n1}R_{aa}$, —$C(O)R_{aa}$, —$C(O)NR_{aa}R_{bb}$, —$C(O)(CH_2)_{n1}R_{aa}$, —$C(O)NR_{aa}(CH_2)_{n1}R_{bb}$, —$S(O)_2R_{aa}$, —$(CH_2)_{n1}S(O)(=NR_{aa})R_{bb}$, —$S(O)_{m1}NR_{aa}R_{bb}$ and —$C(O)OR_{aa}$, wherein the $C_{1-6}$ alkyl, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of cyano, halogen, $C_{1-6}$ alkyl and $C_{1-6}$ alkoxy;

or, $R_4$ and $R_5$ are bonded to form a 3 to 8 membered heterocyclyl or 5 to 10 membered heteroaryl, which is optionally further substituted by one or more substituents selected from the group consisting of $C_{1-6}$ alkyl, halogen, amino, oxo, thioxo, cyano, hydroxy, $C_{3-8}$ alkoxy, $C_{3-8}$ haloalkoxy and $C_{3-8}$ hydroxyalkyl, $R_{aa}$ and $R_{bb}$ are each independently selected from the group consisting of hydrogen, amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 10 membered heteroaryl containing 1 to 2 heteroatom selected from the group consisting of N, O and S, which are each optionally further substituted by one or more substituents selected from the group consisting of halogen, hydroxy, cyano, oxo, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl;

or, $R_{aa}$ and $R_{bb}$ together with the adjacent nitrogen atom are bonded to form a 4 to 6 membered heterocyclyl, which is optionally further substituted by one or more substituents selected from the group consisting of halogen, hydroxy, cyano, oxo, $C_{1-6}$ alkyl, $C_{1-6}$ haloalkyl, $C_{1-6}$ alkoxy and $C_{1-6}$ hydroxyalkyl.

3. The compound, a stereoisomer thereof or a pharmaceutically acceptable salt thereof according to claim 1, wherein $R_2$ is selected from the group consisting of hydrogen, cyano, halogen, $C_{1-3}$ alkyl, $C_{1-3}$ haloalkyl and $C_{3-6}$ cycloalkyl;

$R_3$ is selected from the group consisting of hydrogen, halogen and $C_{1-3}$ alkyl, $R_4$ is selected from the group consisting of hydrogen and $C_{1-3}$ alkyl;

$R_5$ is selected from the group consisting of —$(CH_2)_{n1}R_{aa}$, —$C(O)R_{aa}$, —$C(O)NR_{aa}R_{bb}$, —$S(O)_2R_{aa}$ and —$S(O)_{m1}NR_{aa}R_{bb}$;

$R_{aa}$ and $R_{bb}$ are each independently selected from the group consisting of hydrogen, amino, $C_{1-3}$ alkyl, $C_{1-3}$ haloalkyl, $C_{1-3}$ alkoxy, $C_{3-6}$ cycloalkyl and 5 to 6 membered heteroaryl containing 1 to 2 heteroatom selected from the group consisting of N, O and S, which are each optionally further substituted by one or more substituents selected from the group consisting of halogen, hydroxy, cyano, oxo, $C_{1-3}$ alkyl, $C_{1-3}$ haloalkyl, $C_{1-3}$ alkoxy and $C_{3-6}$ cycloalkyl;

or, $R_{aa}$ and $R_{bb}$ together with the adjacent nitrogen atom are bonded to form a 4 to 6 membered nitrogen-containing heterocyclyl, which is optionally further substituted by one or more substituents selected from the group consisting of halogen, hydroxy, $C_{1-3}$ alkyl, $C_{1-3}$ haloalkyl and $C_{1-3}$ alkoxy.

4. The compound, a stereoisomer thereof or a pharmaceutically acceptable salt thereof according to claim 1, wherein $R_2$ is selected from the group consisting of hydrogen, cyano, fluorine, chlorine, bromine, methyl, ethyl, trifluoromethyl, trifluoromethyl and cyclopropyl;

$R_3$ is selected from the group consisting of hydrogen, fluorine, chlorine, bromine, methyl and ethyl;

$R_4$ is selected from the group consisting of hydrogen and methyl;

$R_5$ is selected from the group consisting of —$R_{aa}$, $C(O)R_{aa}$ and —$C(O)NR_{aa}R_{bb}$;

$R_{aa}$ and $R_{bb}$ are each independently selected from the group consisting of hydrogen, $C_{1-3}$ alkyl, $C_{1-3}$ fluoroalkyl, $C_{1-3}$ alkoxy, cyclopropyl, cyclobutyl, cyclopentyl, furyl, oxazolyl and isoxazolyl, which are each optionally further substituted by one or more substituents selected from the group consisting of halogen, hydroxy, cyano, $C_{1-3}$ alkyl and $C_{1-3}$ alkoxy;

or, $R_{aa}$ and $R_{bb}$ together with the adjacent nitrogen atom are bonded to form an azetidinyl, pyrrolidinyl or piperidinyl, which is optionally further substituted by one or more substituents selected from the group consisting of halogen, hydroxy, $C_{1-3}$ alkyl, $C_{1-3}$ haloalkyl and $C_{1-3}$ alkoxy.

5. The compound, a stereoisomer thereof or a pharmaceutically acceptable salt thereof according to claim 1, wherein

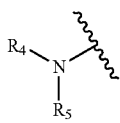

is selected from the group consisting of:

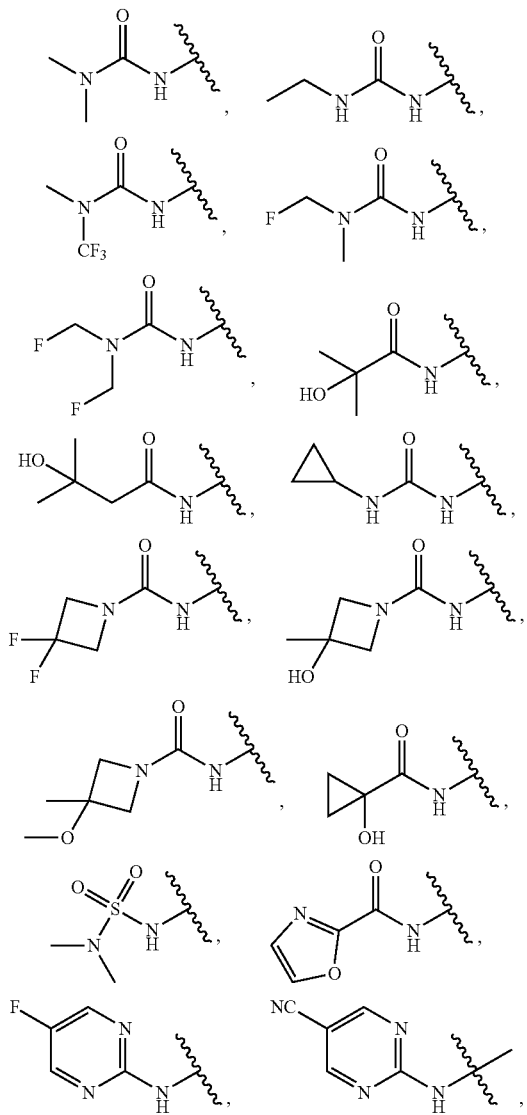

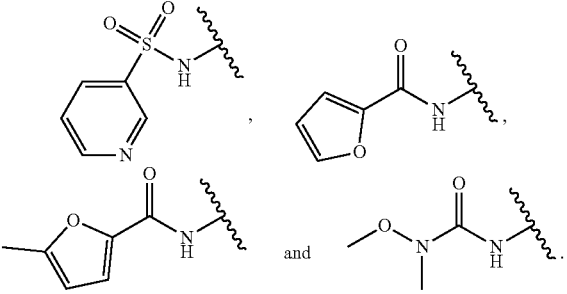

6. The compound, a stereoisomer thereof or a pharmaceutically acceptable salt thereof according to claim 1, wherein $R_2$ is selected from the group consisting of hydrogen, cyano, halogen, $C_{1-6}$ alkyl, $C_{1-6}$ haloalkyl and $C_{3-6}$ cycloalkyl;

or, two $R_2$ on the same or different carbon atoms are bonded to form a $C_{3-8}$ cycloalkyl or 3 to 8 membered heterocyclyl, wherein the $C_{3-8}$ cycloalkyl or 3 to 8 membered heterocyclyl is optionally further substituted by one or more substitutes selected from the group consisting of hydrogen, deuterium atom, $C_{1-6}$ alkyl, halogen, amino, oxo, thioxo, cyano, hydroxy, $C_{3-8}$ alkoxy, $C_{3-8}$ haloalkoxy and $C_{3-8}$ hydroxyalkyl;

$R_3$ is selected from the group consisting of hydrogen atom, halogen, hydroxy, $C_{1-6}$ alkyl and $C_{1-6}$ alkoxy;

$R_4$ is selected from the group consisting of hydrogen and $C_{1-6}$ alkyl;

$R_5$ is selected from the group consisting of $C_{1-6}$ alkyl, $C_{3-8}$ cycloalkyl, 3 to 8 membered heterocyclyl, $C_{6-14}$ aryl, 5 to 14 membered heteroaryl, $-(CH_2)_{n1}R_{aa}$, $-C(O))R_{aa}$, $-C(O)NR_{aa}R_{aa}$, $C(O)NR_{aa}(CH_2)_{n1}R_{bb}$, $-S(O)_2R_{aa}$, $-(CH_2)_{n1}S(O(=NR_{aa})R_{bb}$, $-S(O)_{m1}NR_{aa}R_{bb}$ and $-C(O)OR_{aa}$, wherein the $C_{1-6}$ alkyl, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of hydrogen, cyano, halogen, $C_{1-6}$ alkyl and $C_{1-6}$ alkoxy, or, $R_4$ and $R_5$ are bonded to form a 3 to 8 membered heterocyclyl, wherein the 3 to 8 membered heterocyclyl is optionally further substituted by one or more substituents selected from the group consisting of hydrogen, $C_{1-6}$ alkyl, halogen, amino, oxo, thioxo, cyano, hydroxy, $C_{3-8}$ alkoxy, $C_{3-8}$ haloalkoxy and $C_{3-8}$ hydroxyalkyl;

$R_{aa}$ is selected from the group consisting of hydrogen, amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl, wherein the amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of halogen, hydroxy, cyano, oxo, $C_{1-6}$ alkyl, $C_{1-6}$ haloalkyl and $C_{1-6}$ alkoxy;

$R_{bb}$ is selected from the group consisting of hydrogen, amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl, wherein the amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of hydrogen atom, halogen, hydroxy, cyano, oxo, $C_{1-6}$ alkyl, $C_{1-6}$ haloalkyl and $C_{1-6}$ alkoxy;

or, $R_{aa}$ and $R_{bb}$ are bonded to form a 4 to 10 membered heterocyclyl, wherein the 4 to 10 membered heterocyclyl is optionally further substituted by one or more substituents selected from the group consisting of $C_{1-6}$ alkyl, halogen, amino, oxo, cyano, hydroxy, $C_{1-6}$ haloalkyl, $C_{1-6}$ alkoxy and $C_{1-6}$ hydroxyalkyl.

7. The compound, a stereoisomer thereof or a pharmaceutically acceptable salt thereof according to claim 1, wherein the compound is further shown as formula (XII):

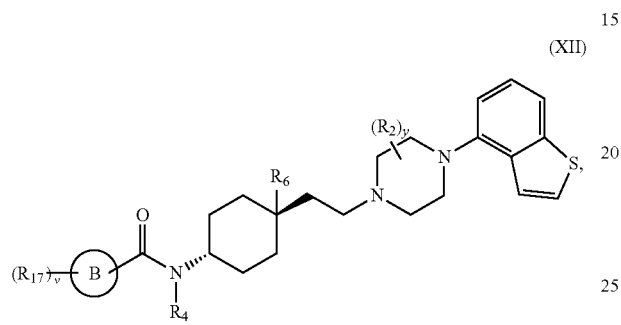

(XII)

wherein:

ring B is selected from the group consisting of $C_{3-8}$ cycloalkyl, 3 to 8 membered heterocyclyl and 5 to 10 membered heteroaryl;

$R_2$ is selected from the group consisting of hydrogen, cyano, halogen, $C_{1-6}$ alkyl, $C_{1-6}$ haloalkyl and $C_{3-5}$ cycloalkyl;

$R_4$ is selected from the group consisting of hydrogen and $C_{1-6}$ alkyl;

$R_6$ is selected from the group consisting of hydrogen, halogen, $C_{1-6}$ alkyl, $C_{1-6}$ haloalkyl, $C_{1-6}$ alkoxy, $C_{1-6}$ haloalkoxy, hydroxy, cyano, $C_{2-6}$ alkenyl and $C_{2-6}$ alkynyl;

$R_{17}$ is selected from the group consisting of hydrogen, halogen, hydroxy, cyano, $C_{1-6}$ alkyl, $C_{1-6}$ haloalkyl, $C_{1-6}$ alkoxy, $C_{3-8}$ cycloalkyl, 3 to 8 membered heterocyclyl, and $C_{6-14}$ aryl and 5 to 14 membered heteroaryl; and v is an integer from 0 to 5.

8. The compound, a stereoisomer thereof or a pharmaceutically acceptable salt thereof according to claim 1, wherein the specific structure of the compound is as follows:

1

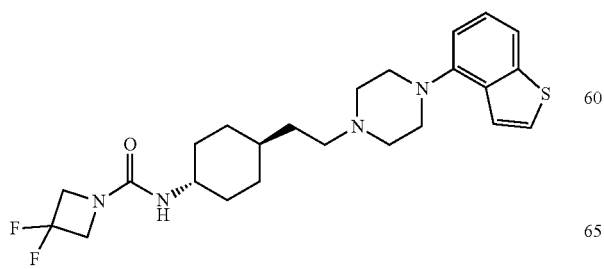

-continued

2

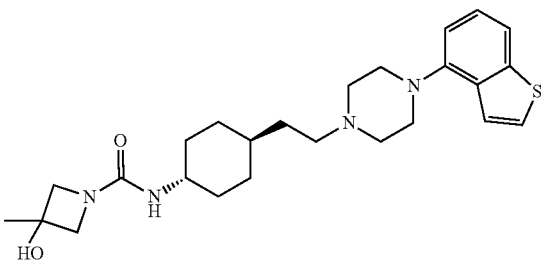

3

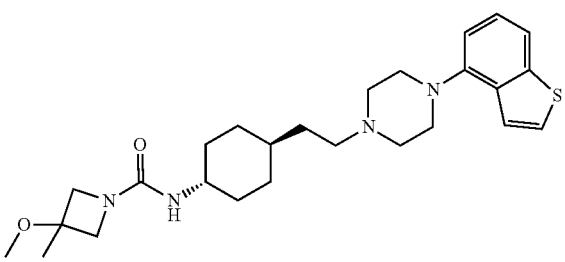

4

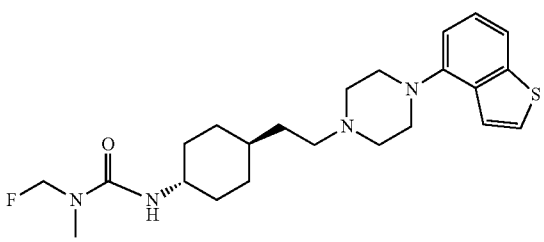

5

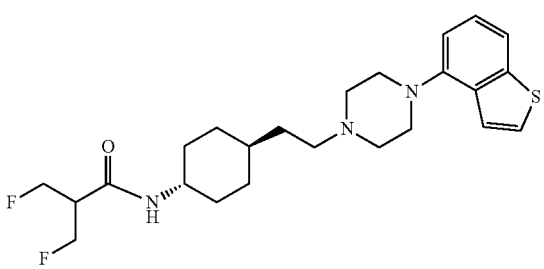

6

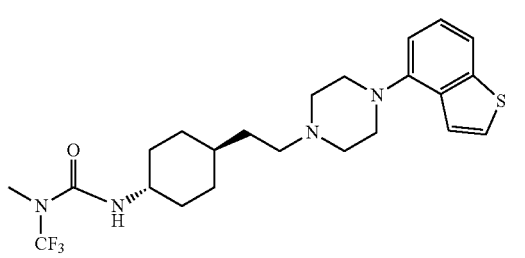

7

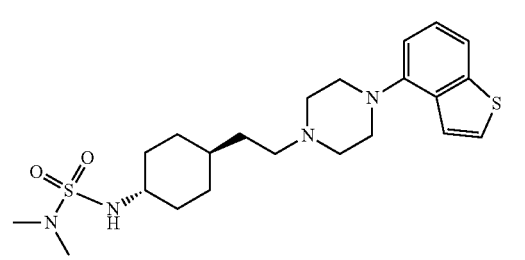

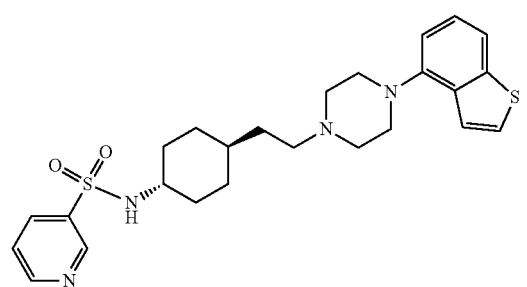
8
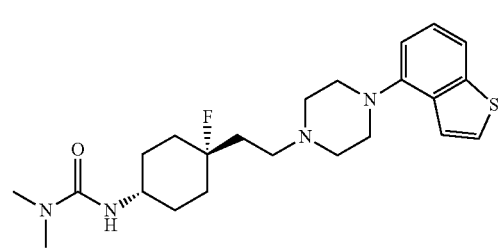
9
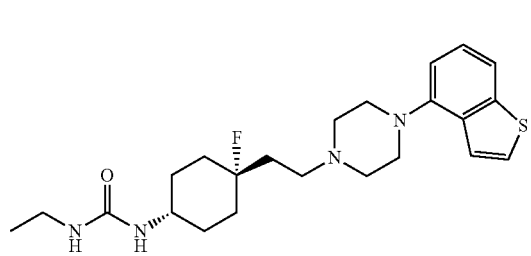
10
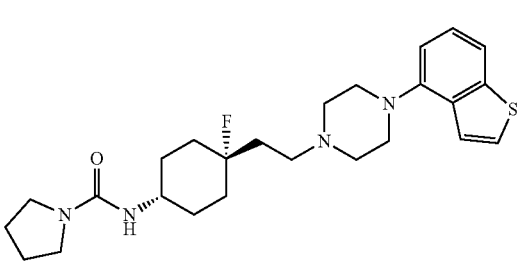
11
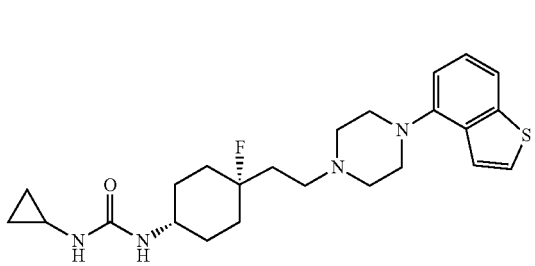
12
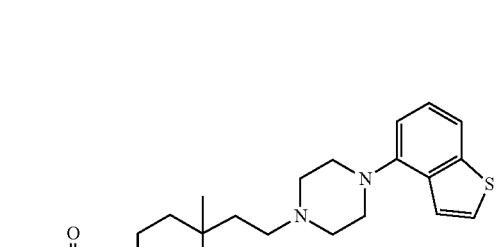
13
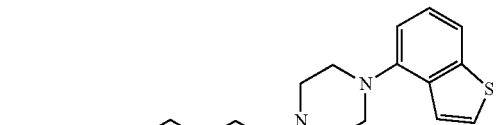
14
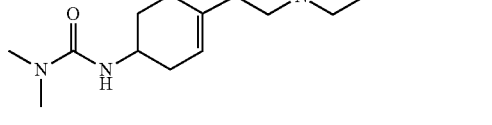
15
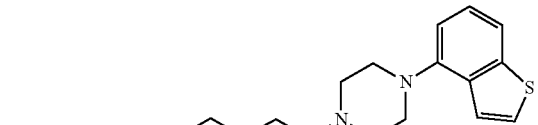
16
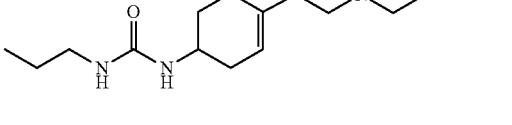
17
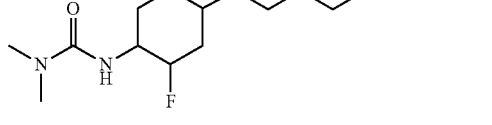
18
19
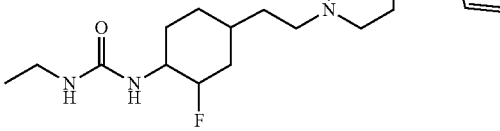
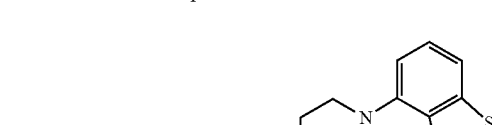
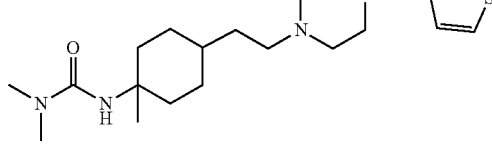
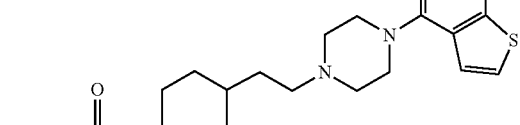

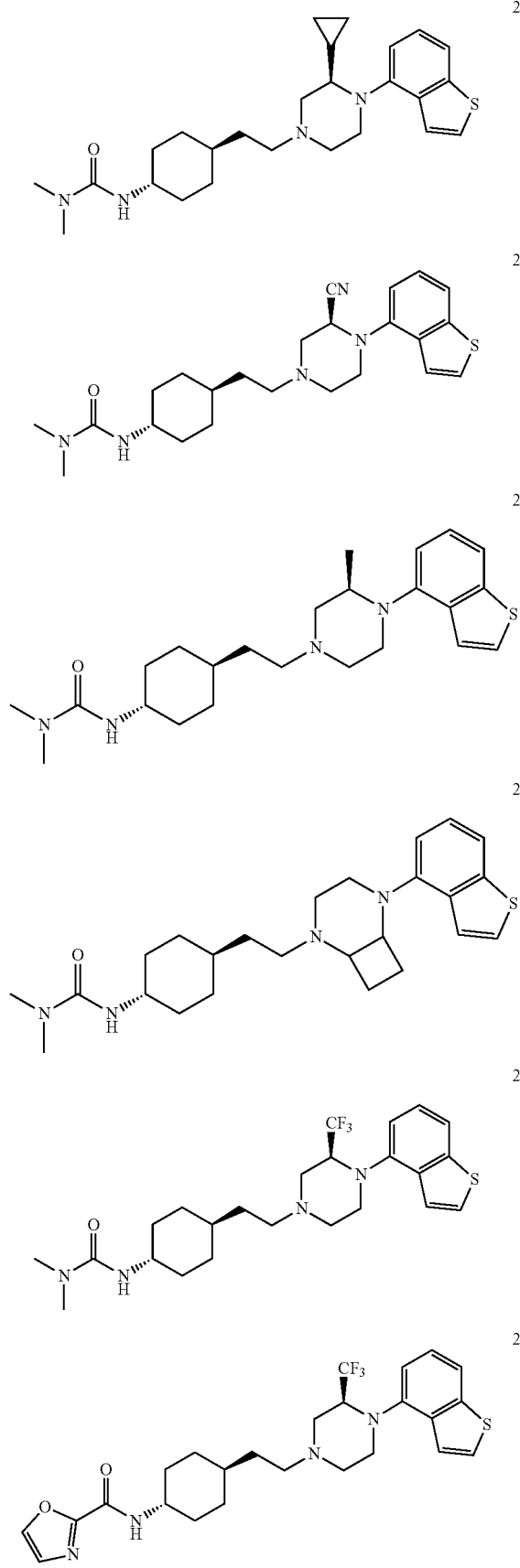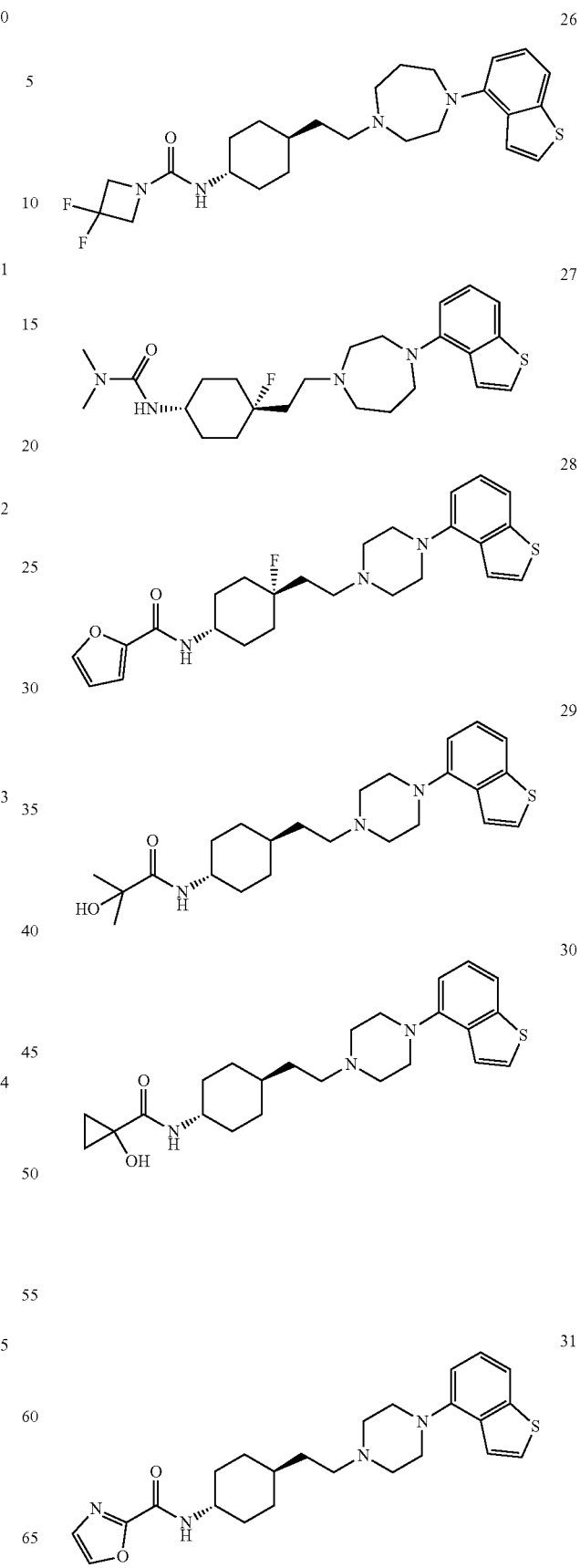

-continued

32
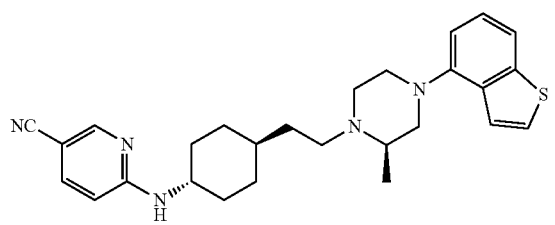

33
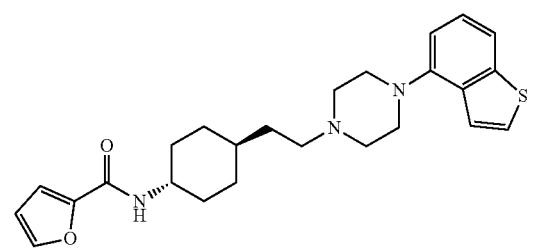

34
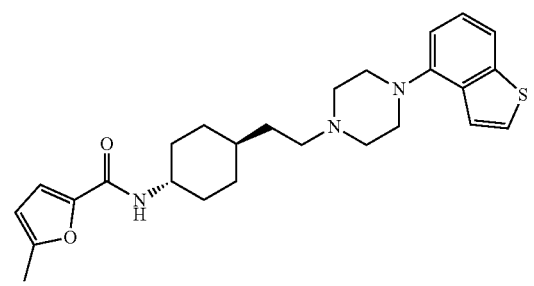

35
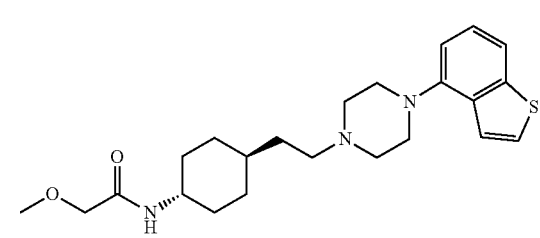

36
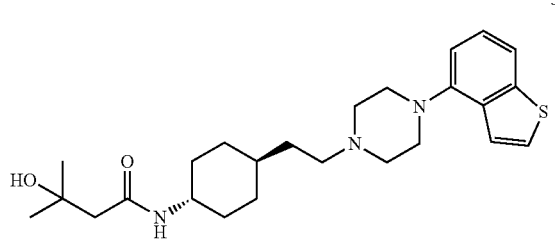

38
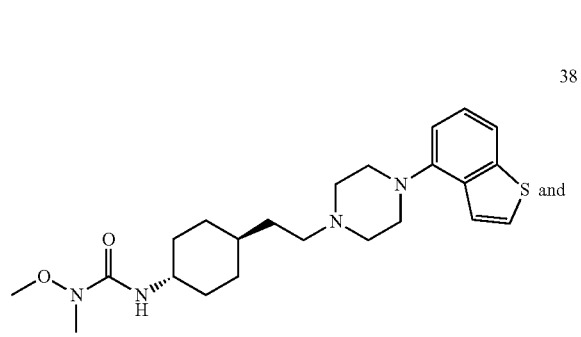 and

-continued

39
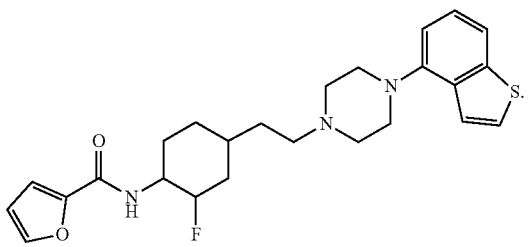

9. A pharmaceutical composition comprising a therapeutically effective dose of the compound, a stereoisomer thereof or a pharmaceutically acceptable salt thereof according to claim 1, and one or more pharmaceutically acceptable carriers or excipients.

10. The compound, a stereoisomer thereof or a pharmaceutically acceptable salt thereof according to claim 7, wherein,
   ring B is selected from the group consisting of cyclopropyl, azetidinyl, pyrrolidonyl, furyl, oxazolyl and isoxazolyl;
   $R_2$ is selected from the group consisting of hydrogen and $C_{1-6}$ haloalkyl;
   $R_4$ is selected from the group consisting of hydrogen and methyl;
   $R_6$ is selected from the group consisting of hydrogen and halogen;
   $R_{17}$ is selected from the group consisting of hydrogen, halogen, hydroxy, cyano, $C_{1-3}$ alkyl, $C_{1-3}$ haloalkyl and $C_{1-3}$ alkoxy;
   v is 0, 1, 2 or 3.

11. The compound, a stereoisomer thereof or a pharmaceutically acceptable salt thereof according to claim 7, wherein,
   $R_2$ is selected from the group consisting of hydrogen and trifluoromethyl;
   $R_6$ is selected from the group consisting of hydrogen and fluorine;
   $R_{17}$ is selected from the group consisting of hydrogen, fluorine, chlorine, hydroxy, cyano, methyl and methoxy.

12. The compound, a stereoisomer thereof or a pharmaceutically acceptable salt thereof according to claim 1, wherein,
   $R_2$ is selected from the group consisting of hydrogen, cyano, halogen, $C_{1-6}$ alkyl, $C_{1-6}$ haloalkyl and $C_{3-6}$ cycloalkyl;
   or, two $R_2$ on the same or different carbon atoms are bonded to form a $C_{3-8}$ cycloalkyl;
   $R_3$ is selected from the group consisting of hydrogen, halogen, $C_{1-6}$ alkyl, $C_{1-6}$ haloalkyl, $C_{1-6}$ alkoxy, $C_{1-6}$ haloalkoxy, hydroxyl and cyano;
   $R_4$ is selected from the group consisting of hydrogen;
   $R_5$ is selected from the group consisting of 5 to 14 membered heteroaryl, —C(O)NR$_{aa}$R$_{bb}$, —C(O)(CH$_2$)$_{n1}$R$_{aa}$ and —S(O)$_2$R$_{aa}$, wherein the 5 to 14 membered heteroaryl are each optionally further substituted by one or more substituents selected from the group consisting of cyano, halogen, $C_{1-6}$ alkyl and $C_{1-6}$ alkoxy;
   R$_{aa}$ and R$_{bb}$ are each independently selected from the group consisting of hydrogen, amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl, wherein the amino, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl are each optionally further substituted by one or more substituents selected from the group consisting of halogen, hydroxy, cyano, oxo, $C_{1-6}$ alkyl, $C_{1-6}$ haloalkyl, $C_{1-6}$ alkoxy, $C_{3-8}$ cycloalkyl, 3 to 8 membered heterocyclyl, $C_{6-14}$ aryl and 5 to 14 membered heteroaryl;

or, $R_{aa}$ and $R_{bb}$ together with the adjacent nitrogen atom are bonded to form a 4 to 10 membered heterocyclyl, which is optionally further substituted by one or more substituents selected from the group consisting of halogen, hydroxy, cyano, oxo, $C_{1-6}$ alkyl, $C_{1-6}$ haloalkyl, $C_{1-6}$ alkoxy and $C_{1-6}$ hydroxyalkyl;

m is 1 or 2; and n1 is 0, 1, 2 or 3.

13. The compound, a stereoisomer thereof or a pharmaceutically acceptable salt thereof according to claim 2, wherein, $R_2$ is selected from the group consisting of hydrogen, cyano, halogen, $C_{1-3}$ alkyl, $C_{1-3}$ haloalkyl and $C_{3-6}$ cycloalkyl;

$R_3$ is selected from the group consisting of hydrogen, halogen and $C_{1-3}$ alkyl;

$R_4$ is selected from the group consisting of hydrogen;

$R_5$ is selected from the group consisting of —C(O)$R_{aa}$, —C(O)N$R_{aa}R_{bb}$ and —S(O)$_2R_{aa}$;

$R_{aa}$ and $R_{bb}$ are each independently selected from the group consisting of hydrogen, amino, $C_{1-3}$ alkyl, $C_{1-3}$ haloalkyl, $C_{1-3}$ alkoxy, $C_{3-8}$ cycloalkyl and 5 to 6 membered heteroaryl containing 1 to 2 heteroatom selected from the group consisting of N, O and S, which are each optionally further substituted by one or more substituents selected from the group consisting of halogen, hydroxy, cyano, oxo, $C_{1-3}$ alkyl, $C_{1-3}$ haloalkyl, $C_{1-3}$ alkoxy and $C_{3-6}$ cycloalkyl.

14. The compound, a stereoisomer thereof or a pharmaceutically acceptable salt thereof according to claim 1, wherein, $R_2$ is selected from the group consisting of hydrogen, cyano, halogen, $C_{1-3}$ alkyl, $C_{1-3}$ haloalkyl and $C_{3-6}$ cycloalkyl;

$R_3$ is selected from the group consisting of hydrogen, halogen and $C_{1-3}$ alkyl;

$R_4$ is selected from the group consisting of hydrogen;

$R_5$ is selected from the group consisting of —C(O)$R_{aa}$;

$R_{aa}$ is selected from the group consisting of $C_{3-6}$ cycloalkyl and 5 to 6 membered heteroaryl containing 1 to 2 heteroatom selected from the group consisting of N, O and S, which are each optionally further substituted by one or more substituents selected from the group consisting of halogen, hydroxy, cyano, $C_{1-3}$ alkyl, $C_{1-3}$ haloalkyl and $C_{1-3}$ alkoxy.

15. The compound, a stereoisomer thereof or a pharmaceutically acceptable salt thereof according to claim 1, wherein, $R_2$ is selected from the group consisting of hydrogen, cyano, fluorine, chlorine, bromine, methyl, ethyl, trifluoromethyl, trifluoromethyl and cyclopropyl;

$R_3$ is selected from the group consisting of hydrogen, fluorine, chlorine, bromine, methyl and ethyl;

$R_4$ is selected from the group consisting of hydrogen;

$R_5$ is selected from the group consisting of —C(O)$R_{aa}$;

$R_{aa}$ is selected from the group consisting of cyclopropyl, cyclobutyl, cyclopentyl, furyl, oxazolyl and isoxazolyl, which are each optionally further substituted by one or more substituents selected from the group consisting of halogen, hydroxy, cyano, $C_{1-3}$ alkyl and $C_{1-3}$ alkoxy.

16. The compound, a stereoisomer thereof or a pharmaceutically acceptable salt thereof according to claim 15, wherein

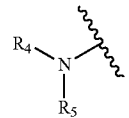

is selected from the group consisting of:

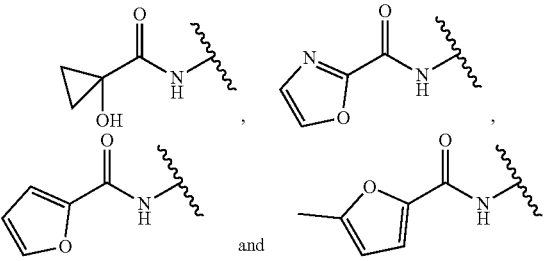

* * * * *